(12) United States Patent
Scalisi et al.

(10) Patent No.: US 9,769,435 B2
(45) Date of Patent: Sep. 19, 2017

(54) MONITORING SYSTEMS AND METHODS

(71) Applicant: SkyBell Technologies, Inc., Irvine, CA (US)

(72) Inventors: Joseph Frank Scalisi, Yorba Linda, CA (US); Desiree Mejia, Yorba Linda, CA (US)

(73) Assignee: SkyBell Technologies, Inc., Irvine, CA (US)

(*) Notice: Subject to any disclaimer, the term of this patent is extended or adjusted under 35 U.S.C. 154(b) by 126 days.

(21) Appl. No.: 14/714,577

(22) Filed: May 18, 2015

(65) Prior Publication Data

US 2016/0044287 A1 Feb. 11, 2016

Related U.S. Application Data

(63) Continuation-in-part of application No. 14/612,376, filed on Feb. 3, 2015, now Pat. No. 9,058,738, and a
(Continued)

(51) Int. Cl.
| | | |
|---|---|---|
| H04N 9/47 | (2006.01) | |
| H04N 7/18 | (2006.01) | |
| H04W 4/16 | (2009.01) | |
| H04M 1/725 | (2006.01) | |
| H04N 5/33 | (2006.01) | |
(Continued)

(52) U.S. Cl.
CPC ......... *H04N 7/188* (2013.01); *G06K 9/00771* (2013.01); *G08B 13/19684* (2013.01); *H04M 1/0291* (2013.01); *H04M 1/72533* (2013.01); *H04M 11/025* (2013.01); *H04N 5/2252* (2013.01); *H04N 5/332* (2013.01); *H04N 7/186* (2013.01); *H04W 4/16* (2013.01); *H04M 1/72536* (2013.01)

(58) Field of Classification Search
CPC ...... H04N 7/188; H04N 5/2252; H04N 7/186; H04N 5/332; H04M 11/025; H04M 1/0291; H04M 1/72533; H04M 1/72536; G08B 13/19684; H04W 4/16; G06K 9/00771
USPC ........................................................ 348/143
See application file for complete search history.

(56) References Cited

U.S. PATENT DOCUMENTS

| | | | |
|---|---|---|---|
| 3,708,742 | A | 1/1973 | Gunn |
| 4,523,193 | A | 6/1985 | Levinson |

(Continued)

FOREIGN PATENT DOCUMENTS

| | | |
|---|---|---|
| CN | 1902609 | 5/2010 |
| CN | 202872976 | 4/2013 |

(Continued)

OTHER PUBLICATIONS iDoorCam—A Wi-Fi Enabled, Webcam Doorbell—Downloaded on Sep. 3, 2013 from http://www.idoorcam.com/.
(Continued)

*Primary Examiner* — Jared Walker

(57) ABSTRACT

Cameras can be used to detect if a visitor enters a field of view. Cameras can be mounted in many different areas, including outside buildings, inside buildings, and near other items such as pools. Cameras can send alerts to remote computing devices regarding visitors. Thus, a user of a camera can see and even speak with visitors who are located far away from the user.

20 Claims, 23 Drawing Sheets

Related U.S. Application Data continuation-in-part of application No. 14/623,741, filed on Feb. 17, 2015, now Pat. No. 9,113,051, and a continuation-in-part of application No. 14/566,690, filed on Dec. 10, 2014, now Pat. No. 9,049,352, and a continuation-in-part of application No. 14/621,132, filed on Feb. 12, 2015, now Pat. No. 9,055,202, which is a continuation of application No. 14/529,334, filed on Oct. 31, 2014, now Pat. No. 9,013,575, which is a continuation-in-part of application No. 14/463,548, filed on Aug. 19, 2014, now Pat. No. 8,941,736.

(60) Provisional application No. 62/035,646, filed on Aug. 11, 2014.

(51) Int. Cl.

| | |
|---|---|
| H04N 5/225 | (2006.01) |
| G06K 9/00 | (2006.01) |
| G08B 13/196 | (2006.01) |
| H04M 1/02 | (2006.01) |
| H04M 11/02 | (2006.01) |

(56) References Cited

U.S. PATENT DOCUMENTS

| | | |
|---|---|---|
| D283,130 S | 3/1986 | Boenning |
| D297,222 S | 8/1988 | Rauch |
| 4,843,461 A | 6/1989 | Tatsumi |
| 5,210,520 A | 5/1993 | Housley |
| 5,428,388 A | 6/1995 | Von Bauer |
| 5,493,618 A | 2/1996 | Stevens |
| 5,521,578 A | 5/1996 | Delvalle |
| D371,086 S | 6/1996 | Collins |
| D381,638 S | 7/1997 | Kruse |
| 5,784,446 A | 7/1998 | Stuart |
| D404,673 S | 1/1999 | Gordon |
| 5,907,352 A | 5/1999 | Gilley |
| 5,995,139 A | 11/1999 | Lee |
| 6,028,626 A | 2/2000 | Aviv |
| D421,727 S | 3/2000 | Pierson |
| D422,521 S | 4/2000 | Morrow |
| 6,073,192 A | 6/2000 | Clapp |
| 6,094,213 A | 7/2000 | Mun |
| 6,185,294 B1 | 2/2001 | Chornenky |
| 6,226,031 B1 | 5/2001 | Barraclough |
| 6,429,893 B1 | 8/2002 | Xin |
| 6,590,604 B1 | 7/2003 | Tucker |
| 6,661,340 B1 | 12/2003 | Saylor |
| 6,727,811 B1 | 4/2004 | Fendis |
| 6,753,899 B2 | 6/2004 | Lapalme |
| 6,778,084 B2 | 8/2004 | Chang |
| D500,751 S | 1/2005 | Yukikado |
| D501,652 S | 2/2005 | Pierson |
| 7,015,943 B2 | 3/2006 | Chiang |
| D519,100 S | 4/2006 | Shioya |
| D522,490 S | 6/2006 | Yukikado |
| D525,963 S | 8/2006 | Yukikado |
| 7,113,578 B2 | 9/2006 | Unger |
| D531,160 S | 10/2006 | Yukikado |
| 7,193,644 B2 | 3/2007 | Carter |
| D562,306 S | 2/2008 | Jeong |
| 7,330,649 B2 | 2/2008 | Finizio |
| 7,375,492 B2 | 5/2008 | Calhoon |
| D577,301 S | 9/2008 | Johnson |
| 7,429,924 B2 | 9/2008 | Langer |
| 7,440,025 B2 | 10/2008 | Cheng |
| 7,477,134 B2 | 1/2009 | Langer |
| 7,492,303 B1 | 2/2009 | Levitan |
| D588,574 S | 3/2009 | Takahata |
| D595,260 S | 6/2009 | Takahata |
| 7,583,191 B2 | 9/2009 | Zinser |
| 7,701,171 B2 | 4/2010 | Defant |
| 7,738,917 B2 | 6/2010 | Ryley |
| 7,746,223 B2 | 6/2010 | Howarter |
| 7,752,070 B2 | 7/2010 | Hatcher |
| 7,956,576 B2 | 6/2011 | Neu |
| 8,016,676 B2 | 9/2011 | Carter |
| 8,125,329 B1 | 2/2012 | Hirou |
| 8,139,098 B2 | 3/2012 | Carter |
| 8,144,183 B2 | 3/2012 | Carter |
| 8,144,184 B2 | 3/2012 | Carter |
| 8,154,581 B2 | 4/2012 | Carter |
| 8,164,614 B2 | 4/2012 | Carter |
| D660,819 S | 5/2012 | Chen |
| 8,193,919 B2 | 6/2012 | Langer |
| 8,334,656 B2 | 12/2012 | Weiss |
| 8,354,914 B2 | 1/2013 | Buckingham |
| 8,504,103 B2 | 8/2013 | Ficquette |
| D689,828 S | 9/2013 | Pierson |
| 8,562,158 B2 | 10/2013 | Chien |
| 8,565,399 B2 | 10/2013 | Siminoff |
| D692,847 S | 11/2013 | Barley |
| 8,665,333 B1 | 3/2014 | Sharma |
| 8,669,876 B2 | 3/2014 | Anderson |
| D707,147 S | 6/2014 | Crippa |
| 8,780,201 B1 | 7/2014 | Scalisi et al. |
| D710,727 S | 8/2014 | Siminoff |
| D710,728 S | 8/2014 | Siminoff |
| D711,275 S | 8/2014 | Scalisi |
| 8,823,795 B1 | 9/2014 | Scalisi et al. |
| 8,842,180 B1 | 9/2014 | Kasmir et al. |
| 8,872,915 B1 | 10/2014 | Scalisi et al. |
| 8,937,659 B1 | 1/2015 | Scalisi et al. |
| 8,941,736 B1 | 1/2015 | Scalisi |
| 8,947,530 B1 | 2/2015 | Scalisi |
| 8,953,040 B1 | 2/2015 | Scalisi et al. |
| 9,013,575 B2 | 4/2015 | Scalisi |
| 9,049,352 B2 | 6/2015 | Scalisi et al. |
| 9,053,622 B2 | 6/2015 | Scalisi |
| 9,055,202 B1 | 6/2015 | Scalisi et al. |
| 9,058,738 B1 | 6/2015 | Scalisi |
| 9,060,103 B2 | 6/2015 | Scalisi |
| 9,060,104 B2 | 6/2015 | Scalisi |
| 9,065,987 B2 | 6/2015 | Kasmir et al. |
| 2001/0022627 A1 | 9/2001 | Bernhardt |
| 2003/0025599 A1 | 2/2003 | Monroe |
| 2004/0085205 A1 | 5/2004 | Yeh |
| 2004/0085449 A1 | 5/2004 | Millet |
| 2004/0086093 A1 | 5/2004 | Schranz |
| 2004/0178889 A1 | 9/2004 | Buckingham |
| 2004/0229569 A1 | 11/2004 | Franz |
| 2004/0257336 A1 | 12/2004 | Hershkovitz |
| 2005/0007451 A1 | 1/2005 | Chiang |
| 2005/0071879 A1 | 3/2005 | Haldavnekar |
| 2005/0097248 A1 | 5/2005 | Kelley |
| 2005/0116480 A1 | 6/2005 | Deng |
| 2005/0267605 A1 | 12/2005 | Lee |
| 2005/0285934 A1 | 12/2005 | Carter |
| 2005/0285944 A1 | 12/2005 | Watanabe |
| 2006/0010504 A1 | 1/2006 | Sharma |
| 2006/0038663 A1 | 2/2006 | Steinetz |
| 2006/0063517 A1 | 3/2006 | Oh |
| 2006/0093187 A1 | 5/2006 | Mittal |
| 2006/0100002 A1 | 5/2006 | Luebke |
| 2006/0139449 A1 | 6/2006 | Cheng |
| 2006/0152365 A1 | 7/2006 | Kim |
| 2006/0156361 A1 | 7/2006 | Wang |
| 2006/0271678 A1 | 11/2006 | Jessup |
| 2007/0008081 A1 | 1/2007 | Tylicki |
| 2007/0046442 A1 | 3/2007 | Bartorelli |
| 2007/0109441 A1 | 5/2007 | Cheng |
| 2007/0126574 A1 | 6/2007 | Langer |
| 2007/0146115 A1 | 6/2007 | Roosli |
| 2007/0194945 A1 | 8/2007 | Atkinson |
| 2007/0216764 A1 | 9/2007 | Kwak |
| 2008/0036862 A1 | 2/2008 | Lang |
| 2008/0128586 A1 | 6/2008 | Johnson |
| 2008/0157956 A1 | 7/2008 | Radivojevic |
| 2008/0167072 A1 | 7/2008 | Berstis |
| 2008/0198225 A1 | 8/2008 | Gal |
| 2008/0297339 A1 | 12/2008 | Mathews |
| 2009/0059002 A1 | 3/2009 | Kim |

(56) References Cited

U.S. PATENT DOCUMENTS

| | | |
|---|---|---|
| 2009/0072963 A1 | 3/2009 | Langer |
| 2009/0093235 A1 | 4/2009 | Grealish |
| 2009/0141939 A1 | 6/2009 | Chambers |
| 2009/0207249 A1 | 8/2009 | Erel |
| 2009/0273670 A1 | 11/2009 | Tamayo |
| 2009/0284578 A1 | 11/2009 | Carter |
| 2009/0296641 A1 | 12/2009 | Bienas |
| 2010/0087161 A1 | 4/2010 | Young |
| 2010/0103300 A1 | 4/2010 | Jones |
| 2010/0134072 A1 | 6/2010 | Neu |
| 2010/0195810 A1 | 8/2010 | Mota |
| 2010/0245060 A1 | 9/2010 | Tylicki |
| 2010/0276570 A1 | 11/2010 | Moser |
| 2011/0025852 A1 | 2/2011 | Tanaka |
| 2011/0121940 A1 | 5/2011 | Jones |
| 2011/0156566 A1 | 6/2011 | Chen |
| 2011/0207509 A1 | 8/2011 | Crawford |
| 2011/0287718 A1 | 11/2011 | Abel |
| 2012/0011559 A1 | 1/2012 | Miettinen |
| 2012/0027248 A1 | 2/2012 | Feris |
| 2012/0044049 A1 | 2/2012 | Vig |
| 2012/0044050 A1 | 2/2012 | Vig |
| 2012/0044085 A1 | 2/2012 | Hung |
| 2012/0098439 A1 | 4/2012 | Recker |
| 2012/0108215 A1 | 5/2012 | Kameli |
| 2012/0113253 A1 | 5/2012 | Slater |
| 2012/0162416 A1 | 6/2012 | Su |
| 2012/0229282 A1 | 9/2012 | Zagami |
| 2012/0230203 A1 | 9/2012 | Casey |
| 2012/0262581 A1 | 10/2012 | Carter |
| 2012/0267962 A1 | 10/2012 | Hanchett |
| 2012/0280783 A1 | 11/2012 | Gerhardt |
| 2012/0280789 A1 | 11/2012 | Gerhardt |
| 2012/0280790 A1 | 11/2012 | Gerhardt |
| 2012/0287123 A1 | 11/2012 | Starner |
| 2012/0327225 A1 | 12/2012 | Barley |
| 2012/0327246 A1 | 12/2012 | Senior |
| 2013/0020875 A1 | 1/2013 | Wozniak |
| 2013/0045763 A1 | 2/2013 | Ruiz |
| 2013/0057695 A1 | 3/2013 | Huisking |
| 2013/0091213 A1 | 4/2013 | Diab |
| 2013/0094444 A1 | 4/2013 | Lai |
| 2013/0128050 A1 | 5/2013 | Aghdasi |
| 2013/0130749 A1 | 5/2013 | Andersen |
| 2013/0136033 A1 | 5/2013 | Patil |
| 2013/0147964 A1 | 6/2013 | Frank |
| 2013/0169809 A1 | 7/2013 | Grignan |
| 2013/0169814 A1 | 7/2013 | Liu |
| 2013/0173477 A1 | 7/2013 | Cairns |
| 2013/0208123 A1 | 8/2013 | Lakhani |
| 2013/0223279 A1 | 8/2013 | Tinnakornsrisuphap |
| 2013/0293722 A1 | 11/2013 | Chen |
| 2014/0009609 A1 | 1/2014 | Webster |
| 2014/0015967 A1 | 1/2014 | Moore |
| 2014/0088761 A1 | 3/2014 | Shamlian |
| 2014/0125754 A1 | 5/2014 | Haywood |
| 2014/0149706 A1 | 5/2014 | Shim |
| 2014/0167676 A1 | 6/2014 | Mack |
| 2014/0253725 A1 | 9/2014 | Hsu |
| 2014/0260449 A1 | 9/2014 | Uyeda |
| 2014/0266669 A1 | 9/2014 | Fadell |
| 2014/0267716 A1 | 9/2014 | Child |
| 2014/0285672 A1* | 9/2014 | Hogasten ............... H04N 5/33 348/164 |
| 2015/0022618 A1 | 1/2015 | Siminoff |
| 2015/0022620 A1 | 1/2015 | Siminoff |
| 2015/0029335 A1 | 1/2015 | Kasmir et al. |
| 2015/0049191 A1 | 2/2015 | Scalisi et al. |
| 2015/0054949 A1 | 2/2015 | Scalisi |
| 2015/0061859 A1 | 3/2015 | Matsuoka |
| 2015/0063559 A1 | 3/2015 | Siminoff |
| 2015/0070495 A1 | 3/2015 | Scalisi |
| 2015/0092055 A1 | 4/2015 | Scalisi et al. |
| 2015/0112885 A1 | 4/2015 | Fadell |
| 2015/0120598 A1 | 4/2015 | Fadell |
| 2015/0145991 A1 | 5/2015 | Russell |
| 2015/0156031 A1 | 6/2015 | Fadell |
| 2015/0194839 A1 | 7/2015 | Wojcik |

FOREIGN PATENT DOCUMENTS

| | | |
|---|---|---|
| CN | 202939738 | 5/2013 |
| EP | 684743 | 11/1995 |
| GB | 2400958 | 10/2004 |
| WO | 01/93220 | 12/2001 |
| WO | WO2007111802 | 10/2007 |

OTHER PUBLICATIONS

Sguaritz IDS—Intelligent Doorbell System—Downloaded on Aug. 15, 2013 from http://www.indiegogo.com/projects/squaritz-ids-intelligent-doorbell-system.
Wireless Video Doorbell Pager—Downloaded on Aug. 9, 2013 from http://www.indiegogo.com/projects/wireless-video-doorbell-pager-4.
Lockitron—Downloaded on Jul. 24, 2013 from https://lockitron.com/preorder.
Eyetalk for Home—Downloaded May 24, 2013 from http://www.revolutionaryconceptsinc.com/forhome.html.
DoorBot—Downloaded on Jul. 26, 2013 from http://www.getdoorbot.com.
Langer Doorbell Button Sized Light—Downloaded on Sep. 16, 2013 from http://www.youtube.com/watch?v=u9nNCm4tSYI.
Langer Doorbell Light—Downloaded on Sep. 16, 2013 from http://www.youtube.com/watch?v=6dbU-Gyjgx8.
SmartBell on Kickstarter—Downloaded on Feb. 28, 2014 from http://www.kickstarter.com/projects/1256599792/smartbell-wi-fi-doorbell-for-video-chats-to-ios-an.
DefenDoor by Glate LLC—Downloaded on Dec. 11, 2014 from https://www.kickstarter.com/projects/85455040/defendoor-a-home-security-system-that-syncs-with-y.
Notifi by Chamberlain—Downloaded on Jan. 9, 2015 from http://www.cnet.com/products/chamberlain-notifi-video-door-chime/.
i-Bell—Downloaded on Jan. 13, 2015 from https://www.kickstarter.com/projects/729057054/i-bell.
Dropcam—Downloaded on Jan. 19, 2015 from https://www.dropcam.com/dropcam-pro.
DoorBird—Downloaded on Jan. 23, 2015 from http://www.doorbird.com/.
Chui Doorbell—Downloaded on Jan. 23, 2015 from http://www.getchui.com/.
Chui Doorbell—Downloaded on Jan. 23, 2015 from http://techcrunch.com/2014/04/18/214-technologies-is-crowdfunding-a-smart-doorbell-called-chui/.
GoPano—Downloaded on Jan. 23, 2015 from http://www.gizmag.com/gopano-micro-captures-360-degree-video-on-iphone/18542/.
Sengled Snap Light Camera—Downloaded on Mar. 9, 2015 from http://www.sengled.com/product/snap.
Alarm.com Garage Door Camera—Downloaded on Mar. 9, 2015 from http://www.cnet.com/au/products/alarm-com-for-apple-watch/.
Rollup iHome Peephole Doorbell—Downloaded on May 7, 2015 from http://www.rollupcn.com.
Ring Chime—Smart Chime—Downloaded on May 13, 2015 from http://techcrunch.com/2015/05/13/rings-smart-doorbell-gets-a-smart-speaker/#.y0xlqx:SpqY.
Peeple—Peephole Camera—Downloaded on May 14, 2015 from https://www.kickstarter.com/projects/1544392549/peeple-caller-id-for-your-front-door/video_share.
Vivant Doorbell Camera—Downloaded on May 20, 2015 from http://www.vivint.com/company/newsroom/press/Vivint-Introduces-Wi-Fi-Enabled-Doorbell-Camera-into-Its-Smart-Home-Platform.
MyInterCom Video System—Downloaded on Jun. 8, 2015 from http://myintercom.de/en/funktionsweise.
Kochhi's Cobell Wi-Fi Doorbell—Downloaded on Sep. 14, 2015 from http://www.kocchis.com/Cobell_Manual.pdf.

(56) References Cited

OTHER PUBLICATIONS

August Doorbell Cam—Downloaded on Nov. 12, 2015 from http://august.com/products/august-doorbell/.
Nest Home Index—Downloaded on Nov. 12, 2015 from https://nest.com/blog/2015/11/09/the-tirst-nest-home-index/?utm_medium=paid%20social&utm_source=Facebook&utm_campaign=Nest%20Home%20Index&utm_content=Launch%20post.
DOORBOT—Downloaded on Nov. 18, 2013 from http://www.craigncompany.com/home-tech-doorbot/; prior art publication at least as of Jun. 10, 2013.
DOORBOT—Downloaded on Nov. 18, 2013 from http://thenextweb.com/insider/2012/12/10/satisfaction-lies-in-hardware-for-siminoffs-christie-street-plafform-and-doorbot-video-streaming-doorbell/; prior art publication at least as of Dec. 10, 2012.
DOORBOT—Downloaded on Nov. 18, 2013 from http://www.digitaltrends.com/lifestyle/doorbot-camera-see-visitors-smartphone/; prior art publication at least as of Dec. 9, 2012.
DOORBOT website—Downloaded on Nov. 18, 2013 from http://www.getdoorbot.com/.
DOORBOT users manual—Downloaded on Nov. 18, 2013 from http://static.mydoorbot.com/DoorBot%20Users%20Manual%201.0.pdf.
DOORBOT "fact sheet"—Downloaded on Nov. 18, 2013 from http://cdn.shopify.com/s/files/1/0247/6501/files/DoorBotMediaKit.pdf?17037.
DOORBOT "features kit"—Downloaded on Nov. 18, 2013 from http://cdn.shopify.com/s/files/1/0247/6501/files/DoorBot_Features_Kit.pdf?17037.
CellNock index page—Originally downloaded on Sep. 23, 2013 from http://cellnock.com/index.html; The website says CellNock is "patent pending".
CellNock about founder page—downloaded on Nov. 18, 2013 from http://cellnock.com/index.html; The website says CellNock is "patent pending".
CellNock learn more page—Downloaded on Nov. 18, 2013 from http://cellnock.com/learn_more.htm; The website says CellNock is "patent pending".
CellNock product page—Downloaded on Nov. 18, 2013 from http://cellnock.com/products.htm; The website says CellNock is "patent pending".
Philips InSight Baby Monitor—Originally downloaded on Jul. 24, 2013 from http://www.amazon.com/Philips-B120-37-InSight-Wireless/dp/B00AALO9Z6/ref=sr_1_3?ie=UTF8&qid=1384808431&sr=8-3&keywords=philips+insight.
MySkyBell.com—Part 1 (previously iDoorCam.com)—Downloaded on Nov. 18, 2013 from http://www.myskybell.com/.
MySkyBell.com—Part 2 (previously iDoorCam.com)—Downloaded on Nov. 18, 2013 from http://www.myskybell.com/.
MySkyBell.com—Part 3 (previously iDoorCam.com)—Downloaded on Nov. 18, 2013 from http://www.myskybell.com/.
MySkyBell.com—Part 4 (previously iDoorCam.com)—Downloaded on Nov. 18, 2013 from http://www.myskybell.com/.
MySkyBell.com—Part 5 (previously iDoorCam.com)—Downloaded on Nov. 18, 2013 from http://www.myskybell.com/.
Squaritz IDS Doorbell System—Downloaded on Aug. 15, 2013 from http://www.indiegogo.com/projects/squaritz-ids-intelligent-doorbell-system.
MyBells—Downloaded on Nov. 18, 2013 from http://www.indiegogo.com/projects/mybells-the-smart-bells.
EyeTalk for home—Downloaded on May 24, 2013 from http://www.revolutionaryconceptsinc.com/forhome.html.
EyeTalk Product—Downloaded on Nov. 18, 2013 from http://www.revolutionaryconceptsinc.com/eyetalk.html.
Langer Doorbell Light—Downloaded on Nov. 18, 2013 from http://www.youtube.com/watch?v=u9nNCm4tSYI; published at least as early as Apr. 2013.
SmartBell—Downloaded on Dec. 5, 2013 from http://smartbell.co/This_is_smartbell.html.
SmartBell—Downloaded on Dec. 5, 2013 from http://smartbell.co/Tech_specs.html.
SmartBell—Downloaded on Dec. 5, 2013 from http://smartbell.co/FAQ.html.
SmartBell—A Doorbell for Smartphones, published by Scrambled Brains Tech, LLC., Oct. 1, 2013.
August Smart Lock—Part 1—Downloaded on Jun. 10, 2014 from www.August.com.
August Smart Lock—Part 2—Downloaded on Jun. 10, 2014 from www.August.com.
August Smart Lock—Part 3—Downloaded on Oct. 10, 2014 from www.August.com.
Kevo Lock—User guide—Downloaded on Jun. 10, 2014 from http://s7d5.scene7.com/is/content/BDHHI/Kwikset/Website%20Content/Kevo/kevo-userguide-kwikset_eng.pdf.
Kevo Lock—Installation guide—Downloaded on Oct. 10, 2014 from http://s7d5.scene7.com/is/content/BDHHI/Kwikset/Website%20Content/Kevo/installation_guide.pdf.
Schlage Electronic Lock—User guide—Downloaded on Jun. 10, 2014 from www.schlage.com.
Lock-Style Solenoid—Downloaded on Aug. 22, 2014 from www.AdaFruit.com.
Power Matters Alliance—Downloaded on Aug. 23, 2014 from www.wikipedia.com.
Push-Pull Solenoid—Downloaded on Aug. 22, 2014 from www.AdaFruit.com.
Push-Pull Solenoid—Technical Details—Downloaded on Aug. 22, 2014 from www.AdaFruit.com.
Qi—Downloaded on Aug. 23, 2014 from www.wikipedia.com.
TP-Link—Website—Downloaded on Jul. 15, 2014 from www.tp-link.us.
TP-Link—User guide—Downloaded on Jul. 15, 2014 from www.tp-link.us.
AC Adapter Spy Camera—Downloaded on Jun. 24, 2014 from ahdcameras.com.
FanFare Chime—Downloaded on Oct. 10, 2014 from https://www.kickstarter.com/projects/1040187373/1919517395?token=47099d90.
Ring Video Doorbell—Downloaded on Oct. 10, 2014 from www.ring.com.
Doorboot becomes Ring—Downloaded on Oct. 10, 2014 from http://techcrunch.com/2014/09/29/doorbot-ring-home-security-doorbell/?ncid=rss&utm_source=feedburner&utm_medium=feed&utm_campaign=Feed.
iChime Customizable Digital Chime System—Downloaded on Nov. 7, 2014 from http://www.ichime.com/.
Philips InSight Wireless HD Baby Monitor—Downloaded on Jul. 24, 2013 from http://www.amazon.com/Philips-InSight-Wireless-Baby-Monitor/dp/B00AALO9Z6/ref=sr_1_2?ie=UTF8&qid=1374704204&sr=8-2&keywords=philips+insight+wi-fi+baby+monitor.
CellNock—Downloaded on Sep. 23, 2013 from http://cellnock.com/products.htm.
CellNock Index—Downloaded on Sep. 23, 2013 from http://cellnock.com/index.html.
DoorBot—Downloaded on Jun. 14, 2013 from https://christiestreet.com/products/doorbot.

\* cited by examiner

MONITORING SYSTEMS AND METHODS

CROSS-REFERENCE TO RELATED APPLICATIONS

The entire contents of the following application are incorporated by reference herein: U.S. Provisional Patent Application No. 62/035,646; filed Aug. 11, 2014; and entitled DOORBELL COMMUNICATION SYSTEMS AND METHODS.

The entire contents of the following application are incorporated by reference herein: U.S. Nonprovisional patent application Ser. No. 14/463,548; filed Aug. 19, 2014; and entitled DOORBELL COMMUNICATION SYSTEMS AND METHODS.

The entire contents of the following application are incorporated by reference herein: U.S. Nonprovisional patent application Ser. No. 14/529,334; filed Oct. 31, 2014; and entitled DOORBELL COMMUNICATION SYSTEMS AND METHODS.

The entire contents of the following application are incorporated by reference herein: U.S. Nonprovisional patent application Ser. No. 14/621,132; filed Feb. 12, 2015; and entitled DOORBELL COMMUNICATION SYSTEMS AND METHODS.

The entire contents of the following application are incorporated by reference herein: U.S. Nonprovisional patent application Ser. No. 14/566,690; filed Dec. 10, 2014; and entitled POOL MONITOR SYSTEMS AND METHODS.

The entire contents of the following application are incorporated by reference herein: U.S. Nonprovisional patent application Ser. No. 14/612,376; filed Feb. 3, 2015; and entitled DOORBELL COMMUNICATION SYSTEMS AND METHODS.

The entire contents of the following application are incorporated by reference herein: U.S. Nonprovisional patent application Ser. No. 14/623,741; filed Feb. 17, 2015; and entitled POWER OUTLET CAMERAS.

The entire contents of the following application are incorporated herein by reference: International Application No. PCT/US14/53506; filed Aug. 29, 2014 with the U.S. Patent and Trademark Office; and entitled DOORBELL COMMUNICATION SYSTEMS AND METHODS.

The entire contents of the following application are incorporated herein by reference: International Application No. PCT/US14/47622; filed Jul. 22, 2014 with the U.S. Patent and Trademark Office; and entitled DOORBELL COMMUNICATION SYSTEMS AND METHODS.

BACKGROUND

Field

Various embodiments disclosed herein relate to monitoring systems. Certain embodiments relate to methods of monitoring a field of view and emitting notifications regarding a visitor.

Description of Related Art

Monitoring systems can enable viewing a first location from a second location. Monitoring systems can use wireless communication to enable a person in the second location to see a live video of the first location.

SUMMARY

Various systems can provide a secure and convenient way for a remotely located individual to communicate with a person who is approaching a sensor, such as a proximity sensor or motion sensor, or with a person who rings a doorbell. A doorbell or camera assembly can be located in a doorway, near an entrance, within 15 feet of a door, inside a building, or near a pool.

Monitoring systems can be used to detect visitors. For example, if a person comes too close to a pool of water, the monitoring system can emit a warning sound and/or can send a wireless alert to a remote computing device such as a smartphone, laptop, desktop, tablet, or any other computing device with an electronic screen. As used herein, "pool of water" is used in a broad sense and can include any body of water that could be used for swimming or bathing. Example pools of water can include swimming pools, hot tubs, bathtubs, swift rivers, ponds, and lakes.

Several embodiments include methods for using a monitoring system to detect a first visitor. The monitoring system can comprise a camera assembly and a remote computing device. The camera assembly can include a camera, a speaker, a motion sensor, a button, a printed circuit board, and an outer housing, which can be waterproof. The remote computing device can include an electronic display such as a liquid-crystal display. iPhones made by Apple Inc. and other types of smartphones include electronic displays.

Some embodiments include obtaining the camera assembly; configuring the camera assembly such that a camera comprises a field of view that includes at least a portion of a pool of water; using the camera to take a first image of at least the portion of the pool of water; sending the first image wirelessly from the camera assembly to the remote computing device; displaying the first image on the electronic display of the remote computing device; and/or using the remote computing device to select a first detection zone within the first image. The first detection zone can comprise a portion of the first image.

Several embodiments include displaying a grid pattern on the first image on the electronic display of the remote computing device such that the first image is divided into at least six sections by lines that cross each other. In some application, six sections can be the minimum number of sections necessary to adequately subdivide the first image. Several application use at least two sections, at least ten sections, and/or at least fifty sections.

Some embodiments include selecting the first detection zone within the first image by touching at least a first subset of the sections on the electronic display of the remote computing device. Embodiments can include using the camera assembly to detect a first indication of the first visitor.

The first indication can be located inside of the field of view. For example, the location of the first indication can be seen in the field of view (e.g., such that a camera could see the location if the camera were taking a picture).

An indication can be suggestive of the visitor if the indication is of a type that may indicate a visitor (even if the indication can sometimes result in false positives). For example, the indication can be a motion indication, but at times, motion indications may result from moving objects, pets, and plants. As a result, a motion indication may not actually indicate a visitor even though the indication suggests that a visitor may be present (e.g., near a pool).

An infrared signature that seems to indicate that a visitor is present can be a type of indication. The infrared signature may be of a shape and/or temperature that suggests the infrared signature is from a visitor (i.e., a person). In many cases, infrared signatures suggestive of visitors are actually from visitors, but in some cases, infrared signatures suggestive of visitors may be misleading (and not actually be from visitors). The size of the infrared signature can help the system determine if the visitor is above or below a size threshold. This threshold can be advantageous to enable the system to ignore adults (because adults can likely swim) while not ignoring children (because many children cannot swim).

A shape in an image taken by a camera may be an indication suggestive of a visitor. For example, the shape can be of a size or geometry that suggests the shape represents at least a portion of a visitor. In some cases, shapes suggestive of a visitor may not actually be from a visitor.

Several embodiments include determining that the first indication of the first visitor is located outside of the first detection zone. Then, the monitoring system can decide to not send a first alert to the remote computing device (e.g., in response to determining that the first indication of the first visitor is located outside of the first detection zone). The first alert can be configured to notify the remote computing device regarding a presence of the first visitor.

Various embodiments can respond differently to touching the first subset on the electronic display. Touching the first subset can cause the first subset to be included in the first detection zone or excluded from the first detection zone.

The first detection zone can comprise an area of the first image that includes the pool of water. In some embodiments, a user configures the first detection zone using the remote computing device by tracing her finger around a perimeter of a pool in a picture that includes the pool while the picture is displayed on the remote computing device. The remote computing device can record the first detection zone as defined based on the traced perimeter. Then, the monitoring system can correlate visitor indications with locations such that the monitoring system can determine if the visitor indications are located inside or outside of the first detection zone even though the indications are sensed by a different sensor than the camera. In some embodiments, a calibration routine is conducted at the factory to correlate camera field-of-view locations with other sensor locations.

In several embodiments, the camera assembly comprises a speaker that can emit a notification sound while the camera assembly is mounted such that the field of view includes at least the portion of the pool of water. The camera assembly can emit the notification sound in response to the first visitor entering the first detection zone as defined using the first image.

In some embodiments, the monitoring system detects when a visitor enters the field of view and then detects when the visitor enters the first detection zone. The first image can be used to establish multiple detection zones. In some embodiments, the first detection zone is surrounded by a second detection zone.

Several embodiments include using the camera assembly to detect a second indication of the first visitor. The second indication can be located inside of the field of view. The monitoring system can also determine that the second indication of the first visitor is located inside of the first detection zone as defined using the first image. The monitoring system can then wirelessly send the first alert to the remote computing device in response to determining that the second indication of the first visitor is located inside of the first detection zone. The monitoring system can wirelessly send alerts via a wireless network and/or the Internet. In some embodiments, the camera assembly sends a wireless alert to the remote computing device (e.g., via a wireless network and/or the Internet). Several embodiments include sending the first image directly from the camera assembly to the remote computing device without using an intermediary server (although some embodiments use an intermediary server).

Some embodiments include sending the first alert wirelessly to the remote computing device while emitting a notification sound from the speaker in response to the first visitor entering the first detection zone as defined using the first image. Simultaneously sending the first alert and emitting the notification sound can notify both a user of the remote computing device and people who are within audible range of the notification sound.

Several embodiments use motion detectors to sense visitors. The camera assembly can include one or more motion detectors. The first and second indications can be motion indications.

Some embodiments analyze an image taken by the camera to sense visitors. Methods can include using the camera to take a second image of at least the portion of the pool of water, and then the monitoring system analyzing the second image to detect the first indication. Methods can also include using the camera to take a third image of at least the portion of the pool of water, and then the monitoring system analyzing the third image to detect the second indication.

Some embodiments reduce false positives by preventing the sending of the first alert to the remote computing device until after detecting the second indication in at least two of the sections. Several embodiments cause a second subset of the sections to be included in the first detection zone in response to the first subset comprising an outer perimeter that surrounds the second subset.

Several embodiments include selecting the first detection zone by displaying the first image on the electronic display, and then recording which areas of the first image a user indicates to include in the first detection zone by touching the electronic display; calculating a percentage of the first detection zone that includes the second indication of the first visitor; and/or sending the first alert to the remote computing device in response to determining that the percentage of the first detection zone exceeds a first threshold.

Some embodiments include selecting the first detection zone by displaying the first image on the electronic display, and then recording which areas of the first image a user indicates to include in the first detection zone by touching the electronic display; calculating a percentage of the first detection zone that includes the second indication of the first visitor; calculating a time in which the second indication of the first visitor has been in the first detection zone; and/or sending the first alert to the remote computing device in response to the percentage of the first detection zone and the time.

Several embodiments include using the camera assembly to detect a first indication of the first visitor. The first indication can be located inside of the field of view. Some embodiments include determining that the first indication of the first visitor is located outside of the first detection zone, and then the monitoring system ignoring the first visitor in response to the first visitor being located outside of the first detection zone. Ignoring the first visitor can comprise not sending a first alert to the remote computing device regarding the first visitor being outside of the first detection zone.

Some embodiments include using the camera assembly to detect a third indication of a second visitor. The third indication can be located inside of the field of view. Several embodiments include determining that the third indication is located inside of the first detection zone as defined using the first image.

Several embodiments include determining that the second visitor is greater than a size threshold, and then ignoring the second visitor in response to the second visitor being greater than the size threshold. Ignoring the second visitor can comprise not sending a second alert to the remote computing device. The second alert can be configured to notify the remote computing device regarding the second visitor being in the first detection zone.

Some embodiments include using the camera assembly to detect a fourth indication of a third visitor. The fourth indication can be located inside of the field of view. Embodiments can include determining that the fourth indication is located inside of the first detection zone as defined using the first image. Embodiments can also include determining that the third visitor is less than the size threshold, and then wirelessly sending a third alert to the remote computing device in response to the third visitor being less than the size threshold. The third alert can be configured to notify the remote computing device regarding the third visitor being in the first detection zone.

The size threshold can be a height threshold. The height threshold can be configured to distinguish between small children (who often cannot swim) and tall adults (who typically can swim). The height threshold can be at least four feet (because most people over four feet can swim).

In some embodiments, monitoring systems can be configured to detect visitors. Monitoring systems can include a camera assembly having a speaker and a camera. The camera assembly can be mounted such that the camera comprises a field of view that includes at least a portion of a pool of water. In some embodiments, the camera assembly includes an outer housing that is mounted to a wall, fence, or post. The camera assembly can be configured to wirelessly communicate with a remote computing device having an electronic display. In some embodiments, the camera assembly is communicatively coupled with the remote computing device via a cable. In many embodiments, the camera assembly is communicatively coupled to the remote computing device via wireless communication, but is not mechanically coupled to the remote computing device.

Monitoring systems can include a first image of at least the portion of the pool of water. The first image can be taken by the camera, wirelessly communicated to the remote computing device, and then displayed on the electronic display of the remote computing device. Monitoring systems can also include a first detection zone defined by a user touching sections of the first image while the first image is displayed on the electronic display of the remote computing device.

Some embodiments include a wireless notification sent from the camera assembly to the remote computing device in response to the first visitor entering the first detection zone as defined using the first image; and/or a notification sound emitted by the speaker in response to the first visitor entering the first detection zone as defined using the first image.

Several embodiments include a perimeter defined by the user touching the sections of the first image while the first image is displayed on the electronic display of the remote computing device. The perimeter can enclose an area of the first image that includes the pool of water. The perimeter can define the first detection zone.

In some embodiments, the monitoring system is configured to ignore a second visitor in response to the second visitor being located in the field of view and outside of the first detection zone. Ignoring the second visitor comprises not sending an alert regarding the second visitor to the remote computing device.

Several embodiments include using a monitoring system to detect a first visitor. Embodiments can include obtaining a camera assembly that includes a camera; configuring the camera assembly such that the camera comprises a field of view that includes at least a portion of a pool of water; using the camera to take a first image of at least the portion of the pool of water; sending the first image wirelessly from the camera assembly to a remote computing device that includes an electronic display; and/or using the remote computing device to select a first detection zone within the first image. The first detection zone can comprise a first portion of the first image that shows the portion of the pool of water.

Some embodiments include configuring the monitoring system to ignore a second visitor located within the field of view of the camera in response to the second visitor being located outside of the first detection zone. Ignoring the second visitor can comprise not sending a first alert regarding the second visitor to the remote computing device. Several embodiments include configuring the monitoring system to send a second alert regarding a third visitor to the remote computing device in response to determining that the third visitor is located inside of the first detection zone as defined based on the first image.

Several embodiments include displaying the first image on the electronic display of the remote computing device, and then selecting the first detection zone within the first image of the camera while displaying the first image on the electronic display. The first detection zone can represent a portion of the field of view of the camera. Selecting the first detection zone can comprise selecting a second portion of the first image of the camera.

Some embodiments include displaying lines on the first image on the electronic display of the remote computing device such that the first image is divided into sections by the lines; and/or selecting the first detection zone within the first image by touching or otherwise selecting at least a first subset of the sections on the electronic display of the remote computing device.

Several embodiments include displaying the first image on the electronic display of the remote computing device; and/or selecting the first detection zone within the first image by touching at least a first subset of sections on the electronic display of the remote computing device. The sections can be visibly differentiated (e.g., by lines) or can be indistinguishable to the unaided human eye. Some embodiments include millions of sections (e.g., each pixel can be a section). Touching or otherwise selecting the first subset can cause the first subset to be included in the first detection zone or excluded from the first detection zone. Some embodiments include causing a second subset of the sections to be included in the first detection zone of the monitoring system in response to the first subset comprising an outer perimeter that surrounds the second subset.

Some methods include sending data regarding the first detection zone from the remote computing device to the camera assembly to calibrate the camera assembly. Calibrating the camera assembly can include configuring the camera assembly to ignore visitor indications in certain portions of the field of view (e.g., whether sensed by the camera or by a motion sensor).

In several embodiments, the camera assembly comprises a microphone, which can help enable audio communication between the third visitor and a user of the remote computing device in response to determining that the third visitor is located inside of the first detection zone as defined based on the first image. The user of the remote computing device can hear the visitor via the microphone.

Some embodiments include determining that the second visitor is located outside of the first detection zone by detecting a first motion of the second visitor; correlating the first motion to a first location as defined by the first image; and/or determining that the first location is located outside of the first detection zone. Embodiments can also include determining that the third visitor is located inside of the first detection zone by detecting a second motion of the third visitor; correlating the second motion to a second location as defined by the first image; and/or determining that the second location is located inside of the first detection zone.

BRIEF DESCRIPTION OF THE DRAWINGS

These and other features, aspects, and advantages are described below with reference to the drawings, which are intended to illustrate, but not to limit, the invention. In the drawings, like reference characters denote corresponding features consistently throughout similar embodiments.

DETAILED DESCRIPTION

Although certain embodiments and examples are disclosed herein, inventive subject matter extends beyond the specifically disclosed embodiments to other alternative embodiments and/or uses, and to modifications and equivalents thereof. Thus, the scope of the claims appended hereto is not limited by any of the particular embodiments described herein. For example, in any method or process disclosed herein, the acts or operations of the method or process may be performed in any suitable sequence and are not necessarily limited to any particular disclosed sequence. Various operations may be described as multiple discrete operations in turn, in a manner that may be helpful in understanding certain embodiments; however, the order of description should not be construed to imply that these operations are order dependent. Additionally, the structures, systems, and/or devices described herein may be embodied as integrated components or as separate components.

For purposes of comparing various embodiments, certain aspects and advantages of these embodiments are described. Not necessarily all such aspects or advantages are achieved by any particular embodiment. Thus, for example, various embodiments may be carried out in a manner that achieves or optimizes one advantage or group of advantages as taught herein without necessarily achieving other aspects or advantages as may also be taught or suggested herein.

Relationship to Previous Applications

The present application is a continuation-in-part of previous applications, which are incorporated by reference. In some of the previous applications, the camera assembly is called a security system 202 and the monitoring system is called a communication system 200 (e.g., see FIG. 1 of U.S. Nonprovisional patent application Ser. No. 14/529,334, which is incorporated by reference herein). Camera assembly embodiments can include any of the features described in the context of security system embodiments included in applications incorporated by reference.

Figure 1:
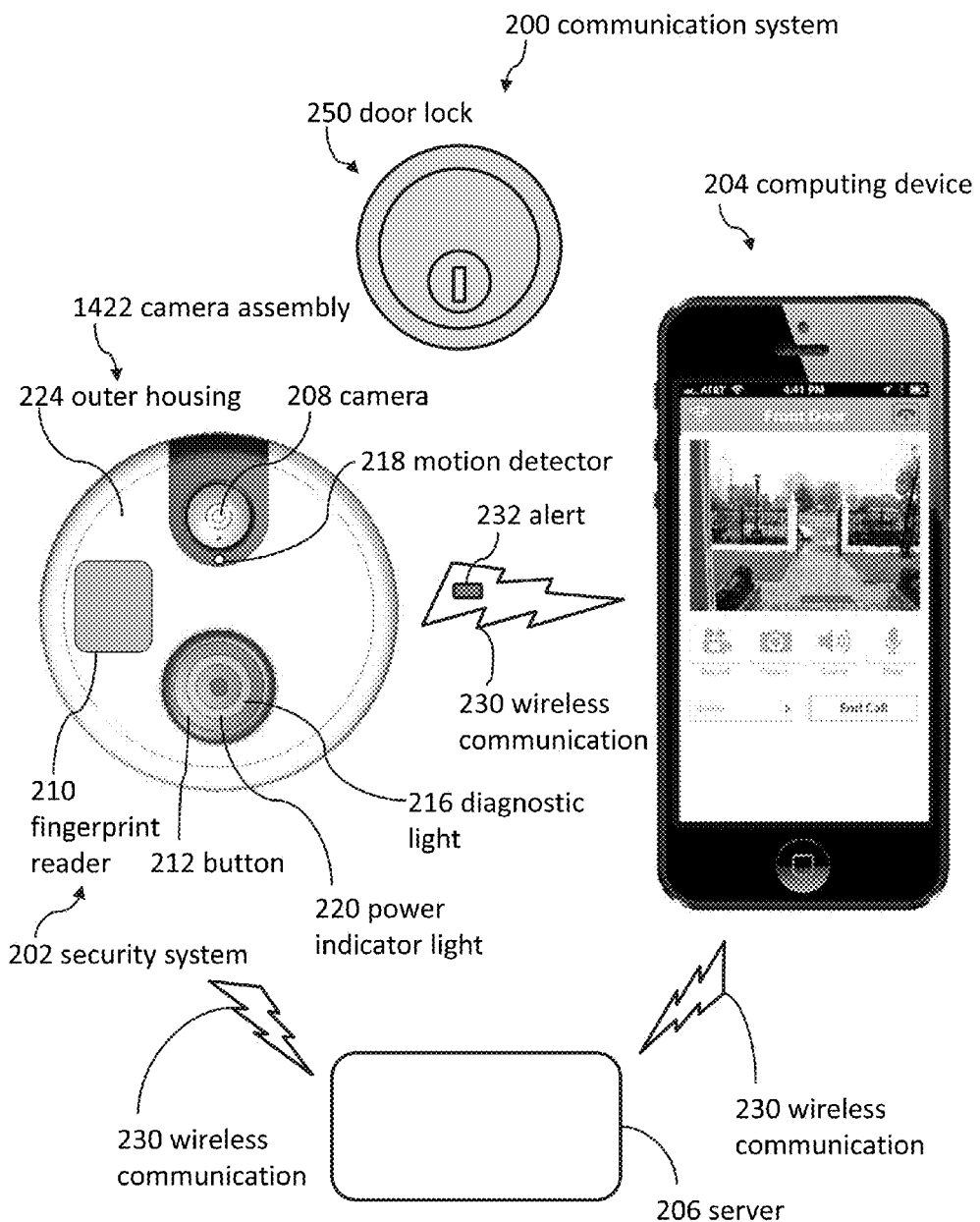
FIG. 1 illustrates a front view of a monitoring system, according to some embodiments.

Applications incorporated by reference include a "camera assembly" 208 (e.g., see FIG. 1 of U.S. Nonprovisional patent application Ser. No. 14/529,334). However, the term "camera assembly" in the present application is used in a broader sense than it was used in applications incorporated by reference. For example, camera assembly embodiments can include the motion sensor 218 and the outer housing 224 shown in FIG. 1 of U.S. Nonprovisional patent application Ser. No. 14/529,334. Camera assembly embodiments can also include any of the items shown in FIGS. 5-14 of U.S. Nonprovisional patent application Ser. No. 14/275,811 (now U.S. Pat. No. 8,872,915).

All of the embodiments incorporated by reference can be applied to the monitoring system embodiments described herein. For example, camera assembly embodiments described herein can be placed in the context of the security system embodiments and communication system embodiments described in applications incorporated by reference. The security systems (e.g., camera assemblies, doorbells) in applications incorporated by reference can be placed near a pool of water, inside a building, or outside a building in an entryway.

System Embodiments

Communication systems can provide a secure and convenient way for a remotely located individual to communicate with a person who is approaching a sensor, such as a proximity sensor or motion sensor, or with a person who rings a doorbell. A doorbell or camera assembly can be located in a doorway, near an entrance, within 15 feet of a door, or near a pool.

Some communication systems allow an individual to hear, see, and talk with visitors who approach at least a portion of the communication system and/or press a button, such as a doorbell's button. For example, communication systems can use a computing device to enable a remotely located person to see, hear, and/or talk with visitors. Computing devices can include computers, laptops, tablets, mobile devices, smartphones, cellular phones, and wireless devices (e.g., cars with wireless communication). Example computing devices include the iPhone, iPad, iMac, MacBook Air, and MacBook Pro made by Apple Inc. Communication between a remotely located person and a visitor can occur via the Internet, cellular networks, telecommunication networks, and wireless networks.

Referring now to FIG. 1, communication systems can be a portion of a smart home hub. In some embodiments, the communication system 200 forms the core of the smart home hub. For example, the various systems described herein enable complete home automation. In some embodiments, the security system 202 controls various electrical items in a home (e.g., lights, air conditioners, heaters, motion sensors, garage door openers, locks, televisions, computers, entertainment systems, pool monitors, elderly monitors). In some embodiments, the computing device 204 controls the security system 202 and other electrical items in a home (e.g., lights, air conditioners, heaters, motion sensors, garage door openers, locks, televisions, computers, entertainment systems, pool monitors, elderly monitors).

FIG. 1 illustrates a front view of a communication system embodiment (e.g., a monitoring system embodiment). The communication system 200 can include a security system 202 (e.g., a camera assembly) and a computing device 204. Although the illustrated security system 202 includes many components in one housing, several security system embodiments include components in separate housings. The security system 202 can include a camera 208 and a doorbell button 212. The camera 208 can include a video camera, which in some embodiments is a webcam. The security system 202 can include a diagnostic light 216 and a power indicator light 220. In some embodiments, the diagnostic light 216 is a first color (e.g., blue) if the security system 202 and/or the communication system 200 is connected to a wireless Internet network and is a second color (e.g., red) if the security system 202 and/or the communication system 200 is not connected to a wireless Internet network. In some embodiments, the power indicator 220 is a first color if the security system 202 is connected to a power source. The power source can be power supplied by the building to which the security system 202 is attached. In some embodiments, the power indicator 220 is a second color or does not emit light if the security system 202 is not connected to the power source.

The security system 202 (e.g., a doorbell or a camera assembly) can include an outer housing 224, which can be water resistant and/or waterproof. The outer housing can be made from metal or plastic, such as molded plastic with a hardness of 60 Shore D. In some embodiments, the outer housing 224 is made from brushed nickel or aluminum.

Rubber seals can be used to make the outer housing 224 water resistant or waterproof. The security system 202 can be electrically coupled to a power source, such as wires electrically connected to a building's electrical power system. In some embodiments, the security system 202 includes a battery for backup and/or primary power.

Wireless communication 230 can enable the security system 202 (e.g., a doorbell or a camera assembly) to communicate with the computing device 204. Some embodiments enable communication via cellular and/or WiFi networks. Some embodiments enable communication via the Internet. Several embodiments enable wired communication between the security system 202 and the computing device 204. The wireless communication 230 can include the following communication means: radio, WiFi (e.g., wireless local area network), cellular, Internet, Bluetooth, telecommunication, electromagnetic, infrared, light, sonic, and microwave. Other communication means are used by some embodiments. In some embodiments, such as embodiments that include telecommunication or cellular communication means, the security system 202 can initiate voice calls or send text messages to a computing device 204 (e.g., a smartphone, a desktop computer, a tablet computer, a laptop computer).

Several embodiments use near field communication (NFC) to communicate between the computing device 204 and the security system 202; between the security system 202 and the door lock 250; and/or between the computing device 204 and the door lock 250. The security system 208, the computing device 204, and/or the door lock 250 can include a NFC tag. Some NFC technologies include Bluetooth, radio-frequency identification, and QR codes.

Some embodiments include computer software (e.g., application software), which can be a mobile application designed to run on smartphones, tablet computers, and other mobile devices. Software of this nature is sometimes referred to as "app" software. Some embodiments include software designed to run on desktop computers and laptop computers.

The computing device 204 can run software with a graphical user interface. The user interface can include icons or buttons. In some embodiments, the software is configured for use with a touch-screen computing device such as a smartphone or tablet.

Figure 2:
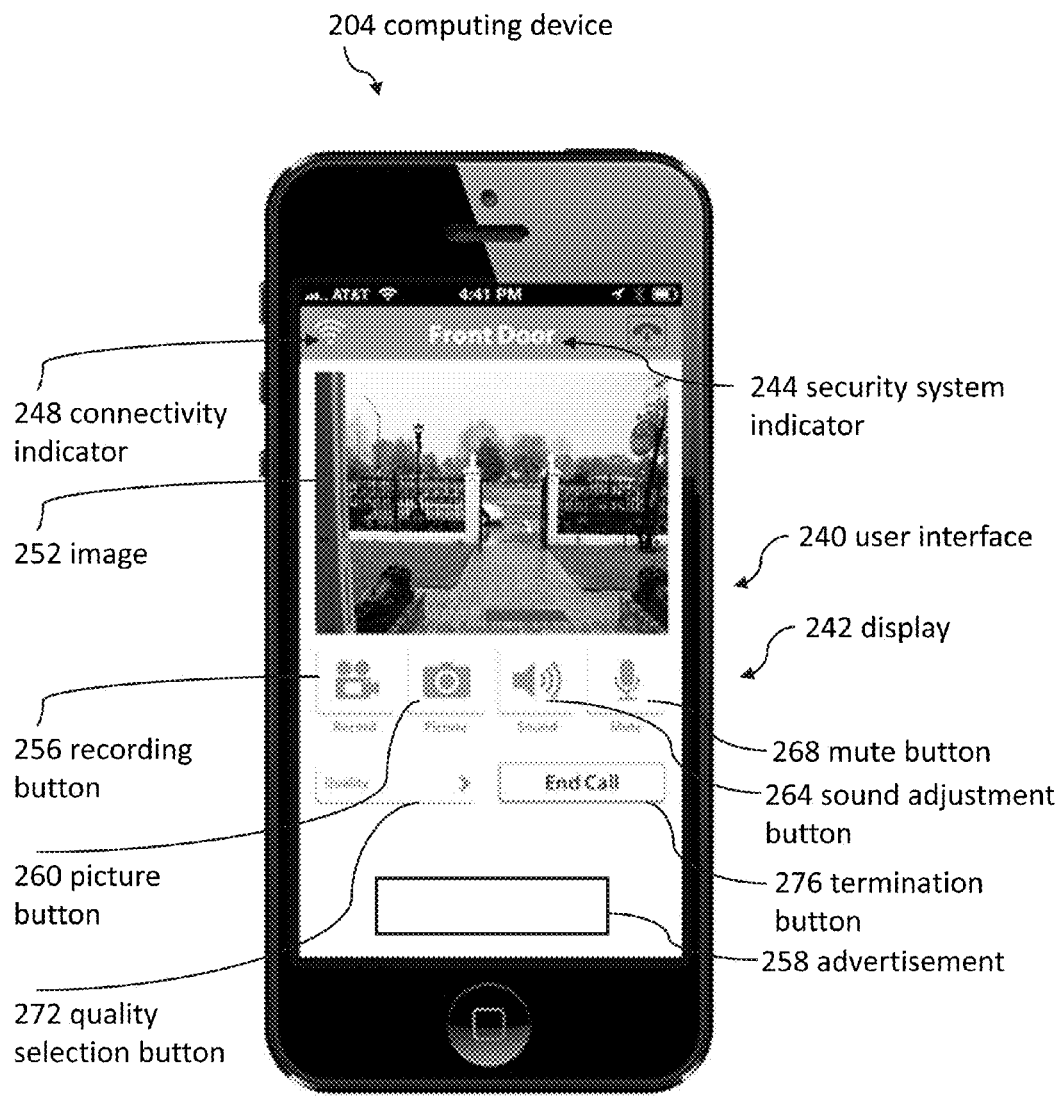
FIG. 2 illustrates a computing device running software, according to some embodiments.

FIG. 2 illustrates a computing device 204 running software. The software includes a user interface 240 displayed on a display screen 242. The user interface 240 can include a security system indicator 244, which can indicate the location of the security system that the user interface is displaying. For example, a person can use one computing device 204 to control and/or interact with multiple security systems, such as one security system located at a front door and another security system located at a back door. Selecting the security system indicator 244 can allow the user to choose another security system (e.g., the back door security system rather than the front door security system).

The user interface 240 can include a connectivity indicator 248. In some embodiments, the connectivity indicator can indicate whether the computing device is in communication with a security system, the Internet, and/or a cellular network. The connectivity indicator 248 can alert the user if the computing device 204 has lost its connection with the security system 202; the security system 202 has been damaged; the security system 202 has been stolen; the security system 202 has been removed from its mounting location; the security system 202 lost electrical power; and/or if the computing device 204 cannot communicate with the security system 202. In some embodiments, the connectivity indicator 248 alerts the user of the computing device 204 by flashing, emitting a sound, displaying a message, and/or displaying a symbol.

In some embodiments, if the security system 202 loses power, loses connectivity to the computing device 204, loses connectivity to the Internet, and/or loses connectivity to a remote server, a remote server 206 sends an alert (e.g., phone call, text message, image on the user interface 240) regarding the power and/or connectivity issue. In several embodiments, the remote server 206 can manage communication between the security system 202 and the computing device. In some embodiments, information from the security system 202 is stored by the remote server 206. In several embodiments, information from the security system 202 is stored by the remote server 206 until the information can be sent to the computing device 204, uploaded to the computing device 204, and/or displayed to the remotely located person via the computing device 204. The remote server 206 can be a computing device that stores information from the security system 202 and/or from the computing device 204. In some embodiments, the remote server 206 is located in a data center.

In some embodiments, the computing device 204 and/or the remote server 206 attempts to communicate with the security system 202 (e.g., a camera assembly). If the computing device 204 and/or the remote server 206 is unable to communicate with the security system 202, the computing device 204 and/or the remote server 206 alerts the remotely located person via the software, phone, text, a displayed message, and/or a website. In some embodiments, the computing device 204 and/or the remote server 206 attempts to communicate with the security system 202 periodically; at least every five hours and/or less than every 10 minutes; at least every 24 hours and/or less than every 60 minutes; or at least every hour and/or less than every second.

In some embodiments, the server 206 can initiate communication to the computer device 204 and/or to the security system 202. In several embodiments, the server 206 can initiate, control, and/or block communication between the computing device 204 and the security system 202.

In several embodiments, a user can log into an "app," website, and/or software on a computing device (e.g., mobile computing device, smartphone, tablet, desktop computer) to adjust the security system settings discussed herein.

In some embodiments, a computing device can enable a user to watch live video and/or hear live audio from a security system due to the user's request rather than due to actions of a visitor. Some embodiments include a computing device initiating a live video feed (or a video feed that is less than five minutes old).

In some embodiments, the user interface 240 displays an image 252 such as a still image or a video of an area near and/or in front of the security system 202 (e.g., a camera assembly). The image 252 can be taken by the camera 208 and stored by the security system 202, server 206, and/or computing device 204. The user interface 240 can include a recording button 256 to enable a user to record images, videos, and/or sound from the camera 208, microphone of the security system 202, and/or microphone of the computing device 204.

In several embodiments, the user interface 240 includes a picture button 260 to allow the user to take still pictures and/or videos of the area near and/or in front of the security system 202. The user interface 240 can also include a sound adjustment button 264 and a mute button 268. The user interface 240 can include camera manipulation buttons such as zoom, pan, and light adjustment buttons. In some embodiments, the camera 208 automatically adjusts between Day Mode and Night Mode. Some embodiments include an infrared camera and/or infrared lights to illuminate an area near the security system 202 to enable the camera 208 to provide sufficient visibility (even at night).

In some embodiments, buttons include diverse means of selecting various options, features, and functions. Buttons can be selected by mouse clicks, keyboard commands, and touching a touch screen. Many embodiments include buttons that can be selected without touch screens.

In some embodiments, the user interface 240 includes a quality selection button, which can allow a user to select the quality and/or amount of the data transmitted from the security system 202 to the computing device 204 and/or from the computing device 204 to the security system 202.

In some embodiments, video can be sent to and/or received from the computing device 204 using video chat protocols such as FaceTime (by Apple Inc.) or Skype (by Microsoft Corporation). In some embodiments, these videos are played by videoconferencing apps on the computing device 204 instead of being played by the user interface 240.

The user interface 240 can include a termination button 276 to end communication between the security system 202 and the computing device 204. In some embodiments, the termination button 276 ends the ability of the person located near the security system 202 (i.e., the visitor) to hear and/or see the user of the computing device 204, but does not end the ability of the user of the computing device 204 to hear and/or see the person located near the security system 202.

In some embodiments, a button 276 is both an answer button (to accept a communication request from a visitor) and is a termination button (to end communication between the security system 202 and the computing device 204). The button 276 can include the word "Answer" when the system is attempting to establish two-way communication between the visitor and the user. Selecting the button 276 when the system is attempting to establish two-way communication between the visitor and the user can start two-way communication. The button 276 can include the words "End Call" during two-way communication between the visitor and the user. Selecting the button 276 during two-way communication between the visitor and the user can terminate two-way communication. In some embodiments, terminating two-way communication still enables the user to see and hear the visitor. In some embodiments, terminating two-way communication causes the computing device 204 to stop showing video from the security system and to stop emitting sounds recorded by the security system.

In some embodiments, the user interface 240 opens as soon as the security system detects a visitor (e.g., senses indications of a visitor). Once the user interface 240 opens, the user can see and/or hear the visitor even before "answering" or otherwise accepting two-way communication, in several embodiments.

Some method embodiments include detecting a visitor with a security system. The methods can include causing the user interface to display on a remote computing device 204 due to the detection of the visitor (e.g., with or without user interaction). The methods can include displaying video from the security system and/or audio from the security system before the user accepts two-way communication with the visitor. The methods can include displaying video from the security system and/or audio from the security system before the user accepts the visitor's communication request. The methods can include the computing device simultaneously asking the user if the user wants to accept (e.g., answer) the communication request and displaying audio and/or video of the visitor. For example, in some embodiments, the user can see and hear the visitor via the security system before opening a means of two-way communication with the visitor.

In some embodiments, the software includes means to start the video feed on demand. For example, a user of the computing device might wonder what is happening near the security system 202. The user can open the software application on the computing device 204 and instruct the application to show live video and/or audio from the security device 202 even if no event near the security system 202 has triggered the communication.

In several embodiments, the security device 202 (e.g., a camera assembly) can be configured to record when the security device 202 detects movement and/or the presence of a person. The user of the computing device 204 can later review all video and/or audio records when the security device 202 detected movement and/or the presence of a person.

Referring now to FIG. 1, in some embodiments, the server 206 controls communication between the computing device 204 and the security system 202, which can be a doorbell with a camera, a microphone, and a speaker. In several embodiments, the server 206 does not control communication between the computing device 204 and the security system 202.

In some embodiments, data captured by the security system and/or the computing device 204 (such as videos, pictures, and audio) is stored by another remote device such as the server 206. Cloud storage, enterprise storage, and/or networked enterprise storage can be used to store video, pictures, and/or audio from the communication system 200 or from any part of the communication system 200. The user can download and/or stream stored data and/or storage video, pictures, and/or audio. For example, a user can record visitors for a year and then later can review conversations with visitors from the last year. In some embodiments, remote storage, the server 206, the computing device 204, and/or the security system 202 can store information and statistics regarding visitors and usage.

Figure 3:
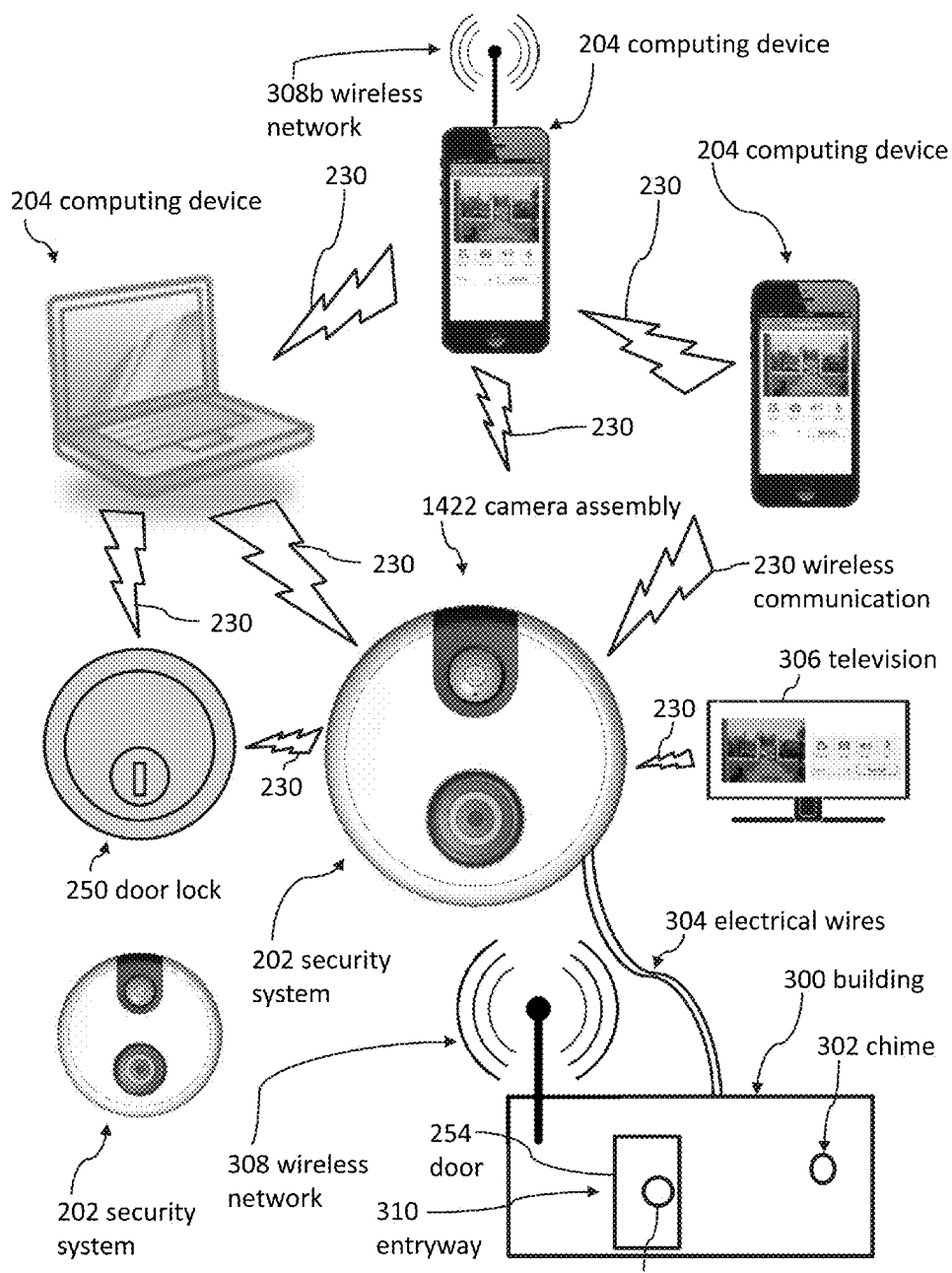
FIG. 3 illustrates an embodiment in which a camera assembly is connected to a building, according to some embodiments.

FIG. 3 illustrates an embodiment in which a security system 202 (e.g., a camera assembly) is connected to a building 300, which can include an entryway 310 that has a door 254. A door lock 250 can be configured to lock and unlock the door 254. Electrical wires 304 can electrically couple the security system 202 to the electrical system of the building 300 such that the security system 202 can receive electrical power from the building 300.

A wireless network 308 can allow devices to wirelessly access the Internet. The security system 202 can access the Internet via the wireless network 308. The wireless network 308 can transmit data from the security system 202 to the Internet, which can transmit the data to remotely located computing devices 204. The Internet and wireless networks can transmit data from remotely located computing devices 204 to the security system 202. In some embodiments, a security system 202 connects to a home's WiFi.

As illustrated in FIG. 3, one computing device 204 (e.g., a laptop, a smartphone, a mobile computing device, a television) can communicate with multiple security systems 202. In some embodiments, multiple computing devices 204 can communicate with one security system 202.

In some embodiments, the security system 202 can communicate (e.g., wirelessly 230) with a television 306, which can be a smart television. Users can view the television 306 to see a visitor and/or talk with the visitor.

As used herein, an "electronic device" is capable of displaying images, including videos. An electronic device consumes electrical power and is capable of running software. As used herein, the term "electronic device" should not be confused with the term "electronic key." Many electronic key embodiments are not capable of displaying images, consuming electrical power, or running software.

Visitor Detection

Referring now to FIGS. 1 and 3, methods can include using a doorbell (e.g., security system 202) that is configurable to wirelessly communicate with a remotely located computing device 204, such as a cellular telephone, laptop, or tablet. Some embodiments include obtaining a doorbell that comprises a speaker, a microphone, a camera, and a button. In some embodiments, the camera acts as a motion sensor. A doorbell can include an infrared motion detection system (e.g., motion detector 218). The button 212 of the doorbell can be configurable to enable a visitor to sound a chime 302 (e.g., a speaker or another sound emission device located inside of a building). Some chimes are digital and some chimes are mechanical.

Several embodiments include using a doorbell system (e.g., communication system 200) to detect a first visitor. The doorbell system can comprise a doorbell and a remote computing device 204 such as a smartphone, laptop, tablet, or desktop computer. Some embodiments include obtaining the doorbell that comprises a camera, a speaker, a microphone, and a button, wherein the button is configurable to enable the first visitor to sound a chime.

Figure 4:
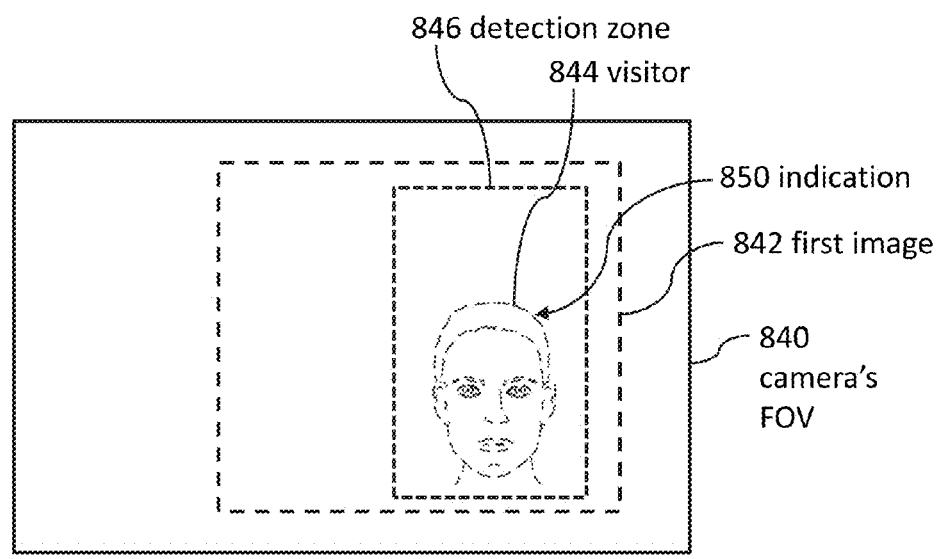
FIGS. 4 and 5 illustrate diagrammatic views of a camera's field of view, according to some embodiments.

FIG. 4 illustrates a camera's field of view 840. Methods can include configuring the camera of the doorbell such that the camera comprises a field of view 840, and using the camera of the doorbell to take a first image 842. The doorbell system can send the first image 842 from the doorbell to the remote computing device, which can comprise an electronic display 242 (shown in FIG. 2). Some methods include displaying the first image 842 on the electronic display 242 of the remote computing device, and prompting a user of the remote computing device to select a first detection zone 846 within the first image 842. The first detection zone 846 can comprise a portion of the first image 842. The first image 842 can comprise all or a portion of the camera's field of view 840.

Figure 5:
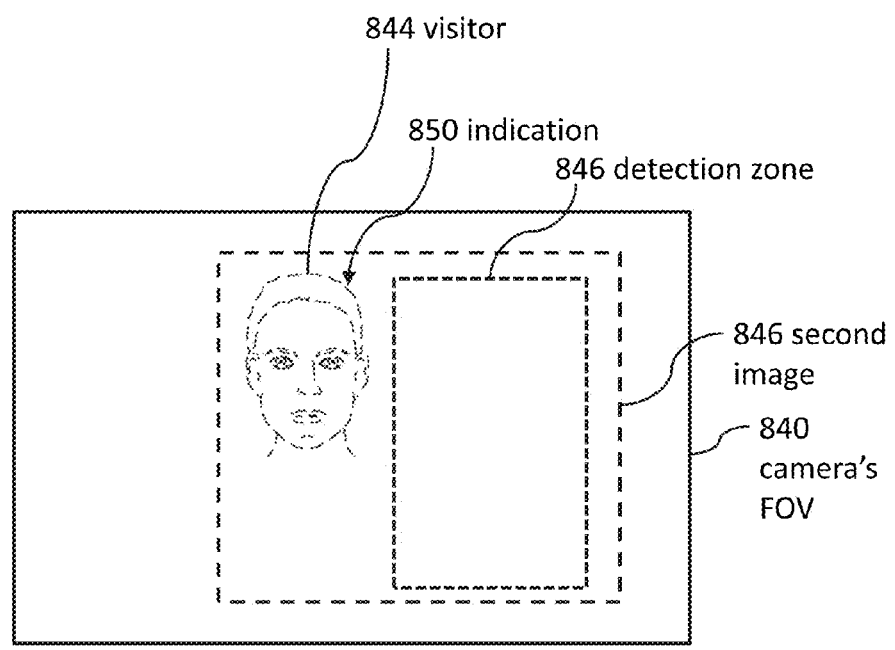

In FIG. 4, the visitor 844 is located inside of the detection zone 846. An indication 850 of the visitor 844 is also located inside of the detection zone 846. The indication 850 can be any evidence or data that suggests the presence of the visitor 844. In FIG. 5, the visitor 844 and the indication 850 are located outside of the detection zone 846 in a second image 846. The first image 842 (shown in FIG. 4) and the second image 846 can show the same area (e.g., can include the same portion of the field of view 840). The detection zone 846 can consist of the same area (e.g., of an entryway) in both the first image 842 and the second image 846. In some embodiments, the first image 842 does not include a visitor 844 to help calibrate the system to a visitor-free state.

Some embodiments include using the camera of the doorbell to take a second image, analyzing the second image to detect a first indication of the first visitor, and determining that the first indication of the first visitor in the second image is located outside of the first detection zone. The doorbell system can then decide not to send an alert 232 (shown in FIG. 1) to the remote computing device in response to determining that the first indication of the first visitor in the second image is located outside of the first detection zone. The alert 232 can be configured to notify the remote computing device 204 (shown in FIG. 1) regarding a presence of the first visitor.

Analyzing the second image can include determining if there are signs of seeing the visitor in the second image. In some embodiments, the system looks for indications of motion in the image. In several embodiments, the system compares a baseline image (e.g., the first image) to the second image in order to determine if there are areas in the second image that include an object (e.g., a visitor) that was not present in the first image. Thus, some embodiments use computer vision to identify the presence of a visitor within the detection zone.

Several embodiments include using the camera of the doorbell to take a third image and analyzing the third image to detect a second indication of the first visitor. Methods can include determining that the second indication of the first visitor in the third image is located inside of the first detection zone, and then sending the alert to the remote computing device in response to determining that the second indication of the first visitor in the third image is located inside of the first detection zone. In some embodiments, the alert is not sent unless other conditions are met.

Figure 6:
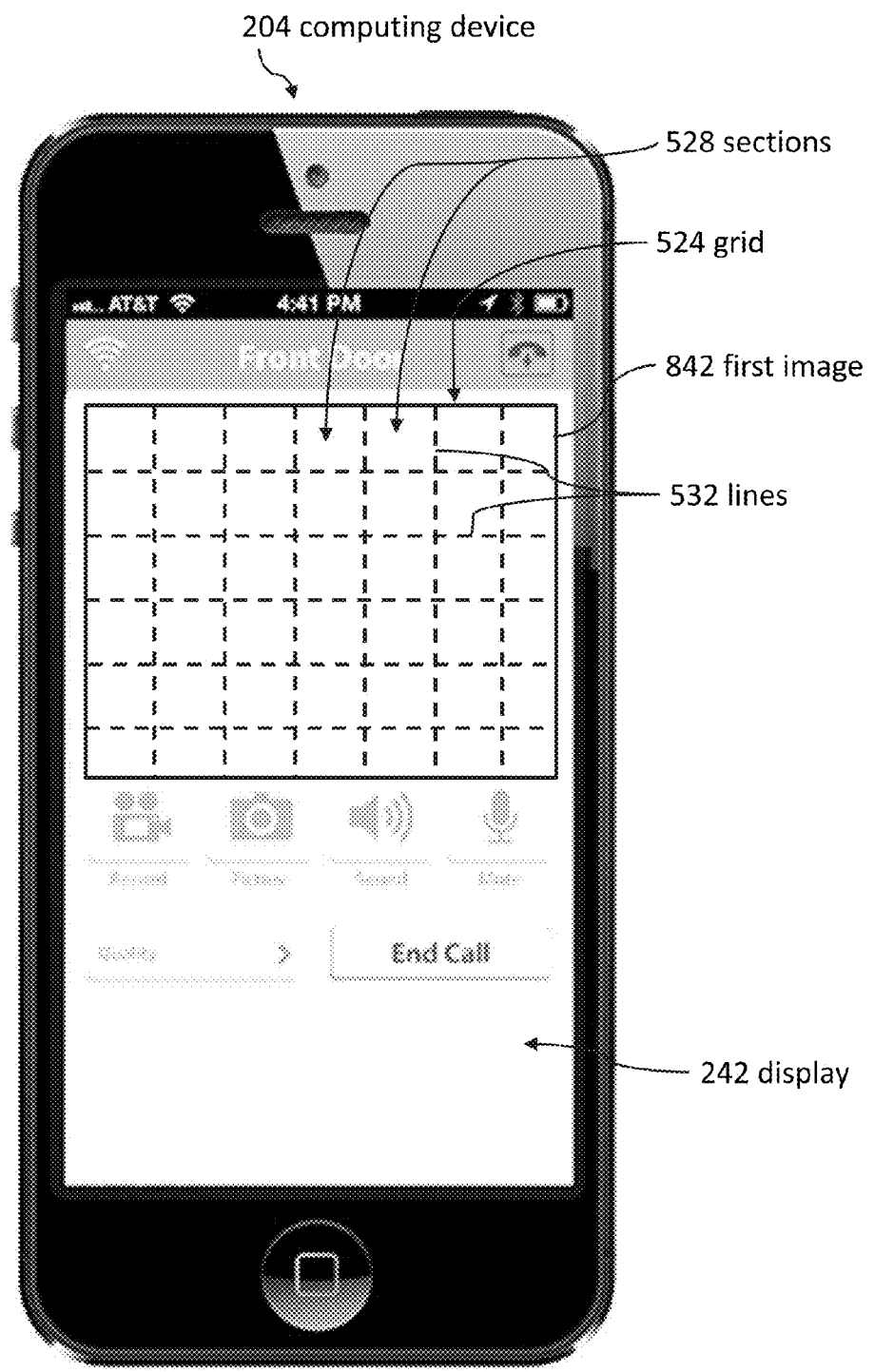
FIG. 6 illustrates a front view of a remote computing device displaying a grid pattern on an image taken by a camera, according to some embodiments.

FIG. 6 illustrates a front view of a remote computing device 204 displaying a grid pattern 254 on an image 842. Some embodiments include displaying a grid pattern 254 on the first image 842 on the electronic display 242 of the remote computing device 204 such that the first image 842 is divided into sections 528 by lines 532 that cross each other. (Not all sections 528 and lines 532 are labeled in FIGS. 6-9 to increase the clarity of various features.)

The lines 532 can include horizontal lines and vertical lines that intersect at 90 degree angles. The lines can be straight, curved, and/or wavy. The sections can be equal in size and shape. The sections can be irregular and can vary in size. Methods can include preventing the sending of the alert to the remote computing device until after detecting an indication of a visitor in at least two, four, and/or eight of the sections. Methods can include preventing the sending of the alert to the remote computing device until after detecting an indication of a visitor in at least twenty percent and/or forty percent of the sections (e.g., of a detection zone).

Figure 7:
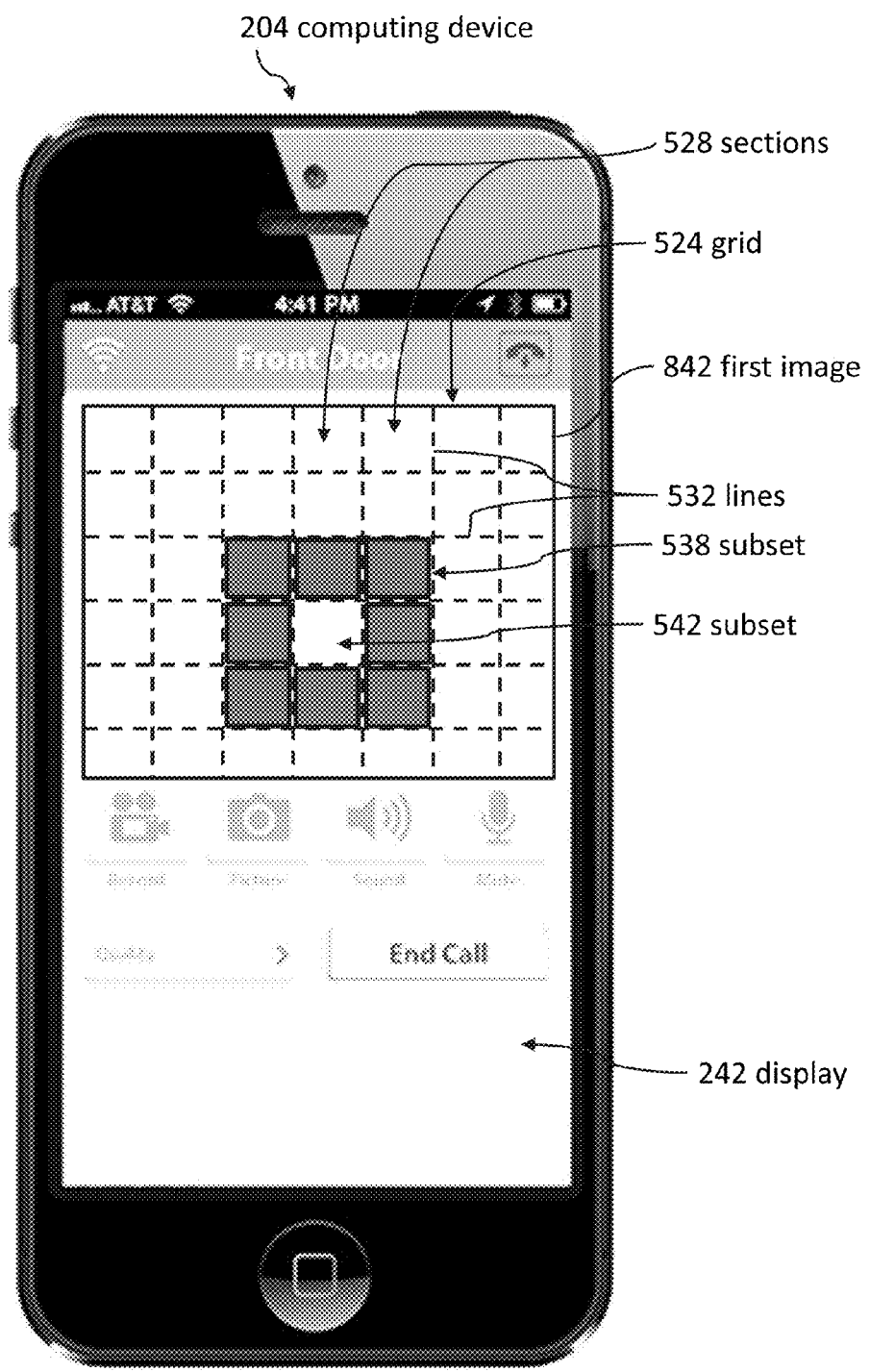
FIG. 7 illustrates a front view of a remote computing device displaying a grid pattern of which sections have been selected to be part of a detection zone, according to some embodiments.

FIG. 7 illustrates a subset 538 of the sections 528 that have been selected as part of a detection zone. Several methods include selecting the first detection zone within the first image 842 by the user touching at least a first subset 538 of the sections 528 on the electronic display 242 of the remote computing device 204. Touching the first subset 538 can cause the first subset 538 to be included in the first detection zone. The electronic display 242 can be a touchscreen of a computer such as a smartphone, tablet, or laptop. The user of the remote computing device 204 can swipe the touchscreen to select a detection zone.

Touching or clicking on each section is not necessary in some embodiments. Some methods include causing a second subset 542 of the sections to be included in the first detection zone in response to the first subset 538 comprising an outer perimeter that surrounds the second subset 542. For example, the user can swipe the touchscreen to form a closed shape. All sections at least partially located within the closed shape can be included in the first detection zone.

Some embodiments include two, three, four, and/or many detection zones, which can be independent, interdependent, separate, and/or overlapping. Detecting a visitor in a first detection zone can lead to immediately notifying the user of the remote computing device. Detecting a visitor in a second detection zone can include additional safeguards against false-positives.

Several embodiments include selecting the first detection zone by displaying the first image on the electronic display and then recording which areas (e.g., sections 528) of the first image the user indicates to include in the first detection zone by touching the electronic display. Some methods include calculating a percentage of the first detection zone that includes the second indication of the first visitor. The percentage can be a percentage of the area of the detection zone or can be a percentage of the sections. Methods can include sending the alert to the remote computing device in response to determining that the percentage of the detection zone exceeds a first threshold. The first threshold can be 10 percent or 30 percent.

Some methods include sending a picture of a visitor to the remote computing device, and then waiting to open audio and/or video communication between the visitor and the user of the remote computing device until after determining a percentage of the first detection zone that includes an indication of the visitor and calculating a time in which the indication of the visitor has been in the first detection zone. Embodiments can include opening the audio communication between the visitor and the user of the remote computing device in response to the percentage of the detection zone and the time. The percentage can be at least 10 percent and/or at least 25 percent. The time can be at least one second and/or at least four seconds.

Indications of the visitor can be motions indications. Motion indications can be identified by comparing a baseline image to another image. The baseline image can be taken when a visitor is not present. Other indications of the visitor can include presence indications (e.g., indications that at least a portion of the visitor is present in the section being analyzed).

Some embodiments include selecting the first detection zone by displaying the first image on the electronic display and then recording which areas of the first image the user indicates to include in the first detection zone by touching the electronic display. The remote computing device can prompt the user to select areas and/or sections to include in a detection zone. In some embodiments, the remote computing device does not display a grid on the calibration image, but the remote computing device prompts the user to select a portion of the image as the detection zone and/or prompts the user to select a portion of the image to exclude from the detection zone.

Several embodiments include calculating a percentage of the first detection zone that includes the second indication of the first visitor and/or calculating a time in which the second indication of the first visitor has been in the first detection zone. Methods can include sending the alert to the remote computing device in response to the percentage of the detection zone and the time.

The images used in several methods do not necessarily include the entire field of view of the camera of the doorbell. In some embodiments, the field of view comprises a portion, and the first image, the second image, and the third image consist of the portion of the field of view. Methods can further comprise selecting the portion of the field of view. In some embodiments, the images include the entire field of view of the camera.

The portion of the field of view can be consistent between the calibration image and subsequent images to help the system accurately analyze the images. In some methods, the first image, the second image, and the third image consist of at least a portion of the field of view, wherein the method further comprises analyzing the portion of the field of view.

Referring now To FIG. 3, although doorbells can be used anywhere, in some embodiments, the camera of the doorbell is configured to record a portion of an entryway 310, wherein the first image, the second image, and the third image show the portion of the entryway 310.

In some embodiments, the doorbell (e.g., 202) and the remote computing device 204 are not physically coupled. Methods can include wirelessly sending the first image from the doorbell to the remotely located computing device. Some embodiments include sending the first image directly from the doorbell to the remote computing device without an intermediary server (e.g., 206 in FIG. 1). This direct transmission can be via wires or can be wireless. Several embodiments include intermediary servers that enable the doorbell to communicate with the remote computing device via the Internet.

Figure 8:
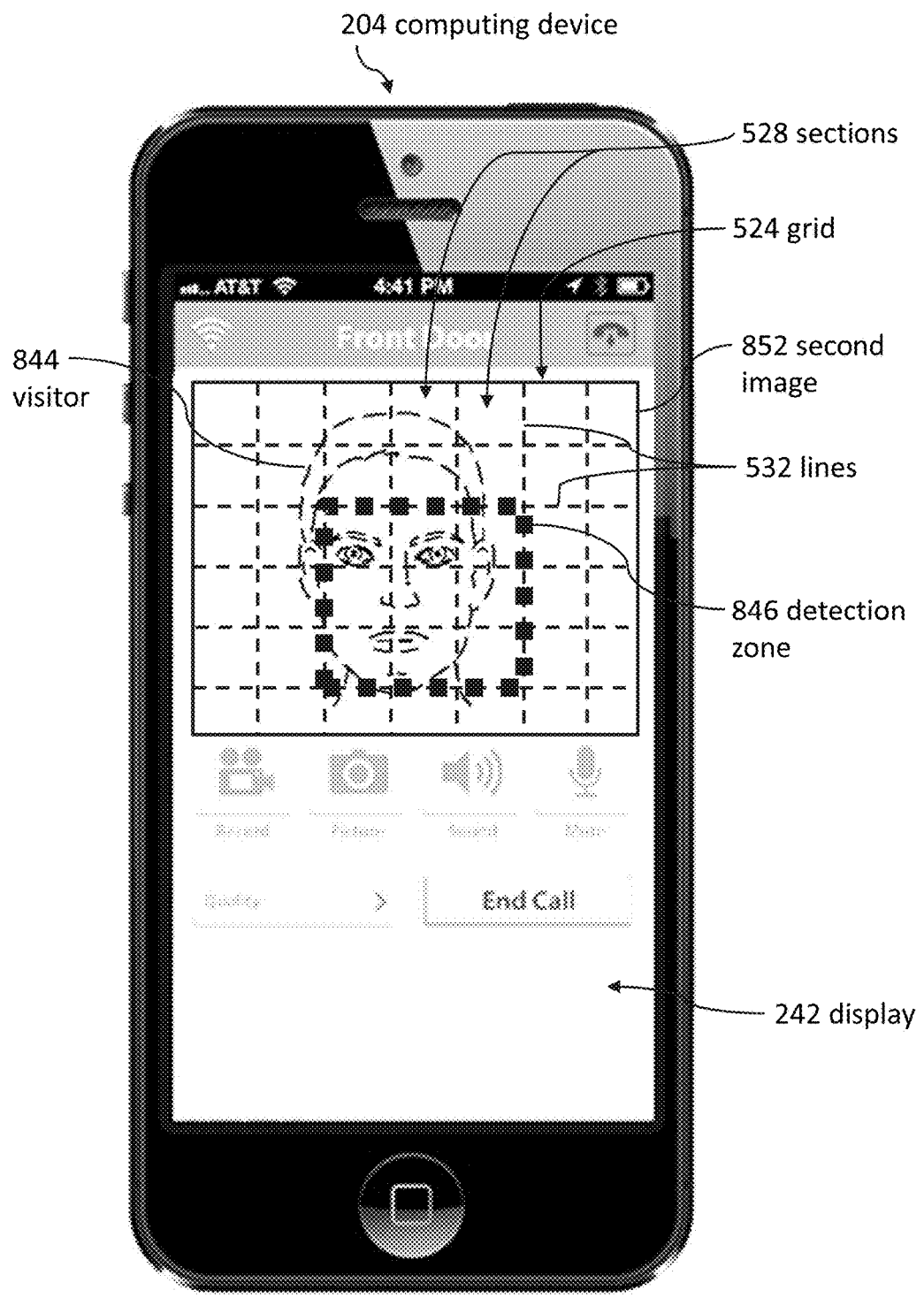
FIG. 8 illustrates a front view of a remote computing device displaying a visitor partially located inside of a detection zone, according to some embodiments.

FIG. 8 illustrates a visitor 844 in a second image 852. The visitor is partially in the detection zone 846 (which was explained in the context of FIG. 7). The detection zone 846 was defined by selecting the subsets 538, 542 in FIG. 7. By analyzing the detection zone 846, the system can detect indications of the visitor 844. The system can ignore visitor indications located outside of the detection zone 846. Visitor indications can include motion and/or infrared signatures indicative of humans. In some embodiments, the system analyzes an image to identify shapes indicative of humans.

Methods for using a doorbell system to detect a first visitor can include obtaining the doorbell that comprises a camera and a button. The camera can be configured such that the camera has a field of view. Several embodiments include using the camera of the doorbell to take a first image to calibrate the doorbell system and sending the first image from the doorbell to the remote computing device. Some methods include displaying the first image on the electronic display of the remote computing device. Several embodiments include prompting a user of the remote computing device to select a first detection zone within the first image. The first detection zone can comprise at least a portion of the first image. Methods can include configuring the doorbell system to ignore a second visitor located within the field of view but located outside of the first detection zone.

The system can ignore a visitor by not sending an alert regarding the visitor to the remote computing device. In some embodiments, the system does not send an alert to the remote computing device in response to the presence of the visitor outside of the detection zone but inside of the field of view of the camera and/or inside of the image. Even when the system ignores a visitor, the system can record the visitor for future reference by the user. The user can then request to see visitors who were inside of the field of view but not shown via alerts (because they were ignored due to being located outside of the detection zone). Thus, the system can ignore the visitor in response to the presence of the visitor outside of the detection zone, but the system can later provide information regarding the visitor to the user in response to a user's request. Sending an alert can include sending a push notification to a smartphone.

Several methods include configuring the doorbell system to send a picture of a third visitor to the remote computing device in response to determining that the third visitor is located inside of the first detection zone as defined based on the first image. The first detection zone can be a two-dimensional zone rather than a three dimensional area of the physical world. Thus, the detection zone can be decoupled from proximity.

Some method embodiments include enabling audio and/or video communication between a visitor and the user of the remote computing device in response to detecting at least one indication of the visitor in at least two of the sections and/or in at least ten of the sections. In some embodiments, the sections with the detected indications must be adjacent to each other.

Some embodiments include selecting the first detection zone within the first image by prompting the user of the remote computing device to indicate a first area by touching the first area on the electronic display of the remote computing device; recording the first area; and/or excluding the first area from the first detection zone. Methods can include ignoring a visitor in response to the visitor being located in the first area.

Doorbells can comprise a motion sensor. Some embodiments include an infrared motion sensor. Methods can comprise ignoring the second visitor in response to disabling the motion sensor during a predetermined time period. The predetermined time period can be during certain hours of the day or night. The time period can be when the user is home or away from home (e.g., where the doorbell is mechanically coupled to the home). As used herein, "home" can include any type of stationary structure configured to shelter people (e.g., an office building).

Several embodiments include using a doorbell system to detect at least one visitor. Methods can include configuring the camera of the doorbell such that the camera comprises a field of view and using the camera of the doorbell to take a first image to calibrate the doorbell system by establishing a baseline of an entryway. The baseline can be used to define a state without any visitors. Methods can include sending the first image from the doorbell to the remote computing device and displaying the first image on an electronic display of the remote computing device.

Some methods include prompting a user of the remote computing device to select a first detection zone within the first image. The first detection zone can comprise a portion of the first image. The first detection zone can include a two-dimensional representation of an area in which the doorbell system is configured to respond to motion detection. Several embodiments include displaying a grid pattern on the first image on the electronic display of the remote computing device such that the first image is divided into at least ten sections by lines that cross each other. The system can be configured to identify the first detection zone within the first image by the user choosing at least a first subset of the sections on the electronic display of the remote computing device. Choosing the first subset can cause the first subset to be included in the first detection zone.

Several methods include configuring the doorbell system to ignore a second visitor located within the field of view but located outside of the first detection zone. Some embodiments include configuring the doorbell system to send a picture of a third visitor to the remote computing device in response to at least some of the following factors: (1) determining that the third visitor is located inside of the first detection zone as defined based on the first image, (2) determining that at least a predetermined percentage (e.g., thirty percent) of the first detection zone includes motion indicators, and (3) determining that the first detection zone has included the motion indicators for at least a predetermined amount of time (e.g., three seconds).

Some methods include automatically excluding an area from a detection zone. Automatic exclusion can occur without the user excluding a specific area (even if the user configures settings that later lead to automatic exclusions). In some embodiments, indications indicative of motorized vehicles (e.g., cars, trucks, vans) are automatically excluded from a detection zone. These automatic calibration innovations can take many forms. Several methods include automatically excluding an area from a detection zone in response to detecting an object (e.g., a motorized vehicle) moving through the first detection zone at more than twenty-five miles per hour. Some methods include automatically excluding an area in response to detecting an infrared signal indicative of a motorized vehicle.

Some embodiments include automatically excluding an area from the first detection zone in response to at least some of the following items: (1) detecting an indication of a visitor in a detection zone; (2) enabling audio communication between the doorbell and the remote computing device in response to detecting the indication of the visitor; and (3) using the doorbell to detect an absence of sound indicative of speaking. The area that is excluded can be the area in which the indication was detected.

Figure 9:
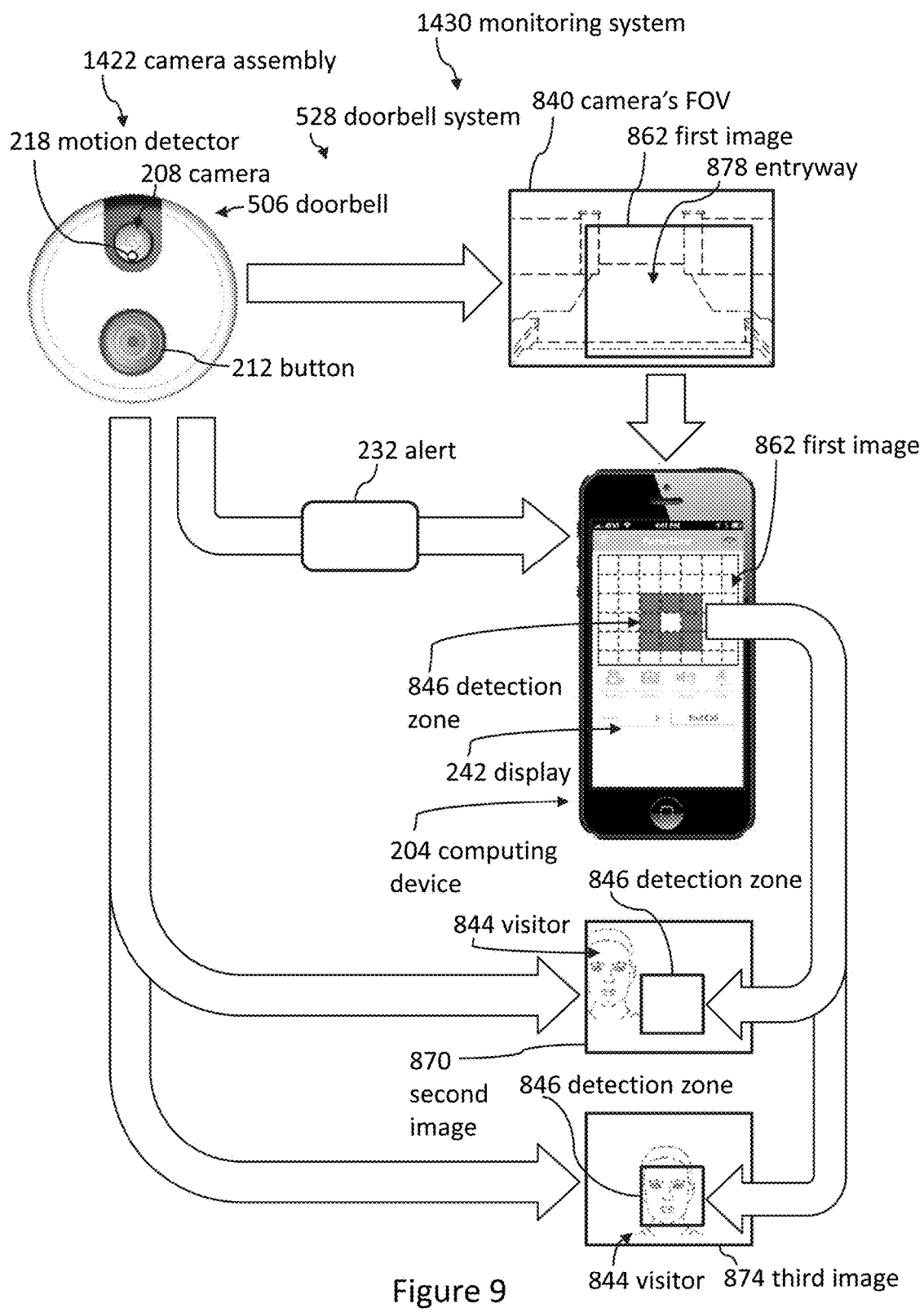
FIG. 9 illustrates a diagrammatic view of a monitoring system, according to some embodiments.

FIG. 9 illustrates a doorbell system 528 that comprises a doorbell 506 (e.g., security system 202) and a remote computing device 204. The doorbell 506 has a camera 208 and a doorbell button 212. Pressing the button 212 can cause the chime 302 (shown in FIG. 3) to sound (e.g., emit a "ding-dong" sound or another notification sound).

Figure 18:
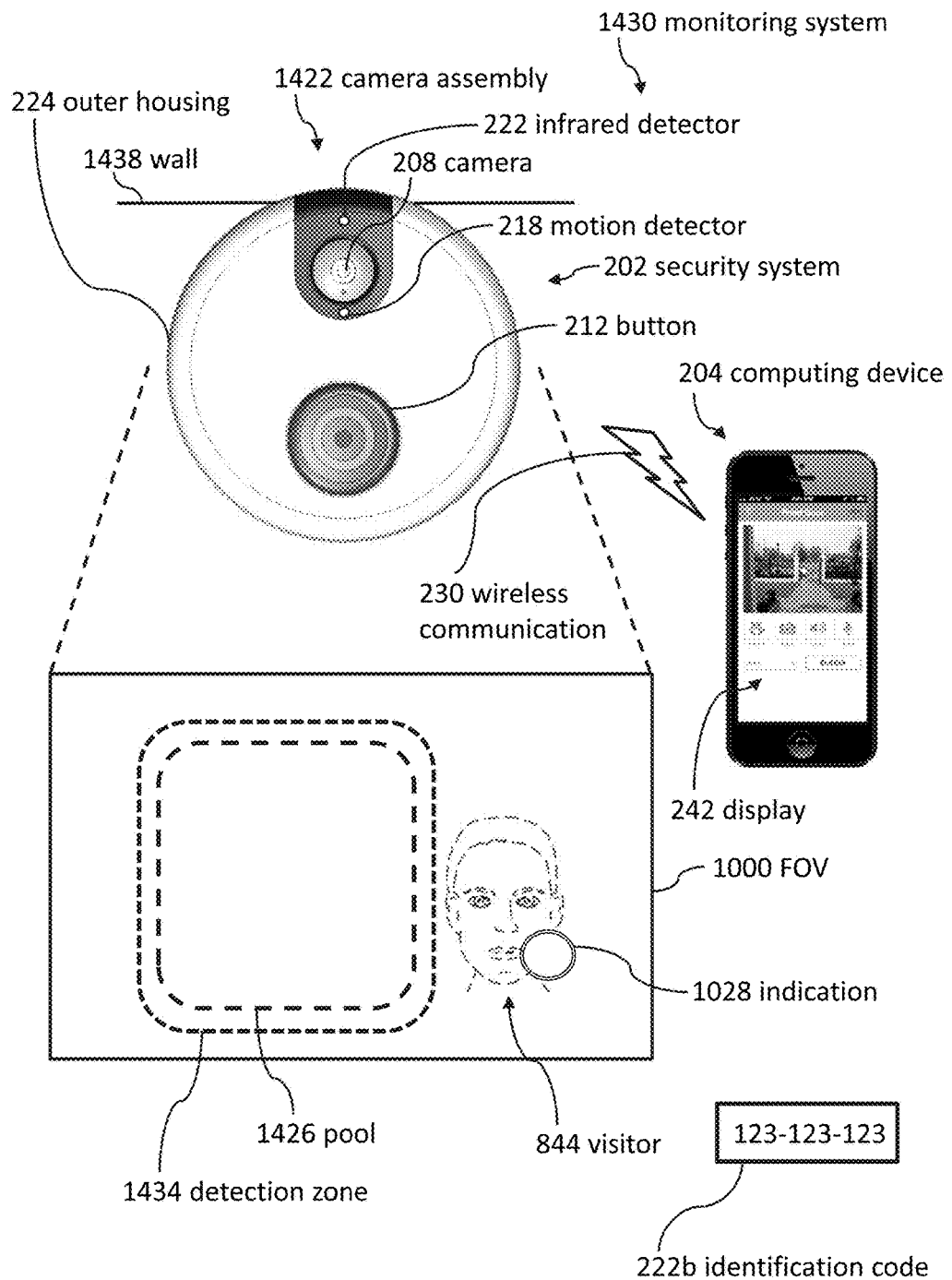
FIG. 18 illustrates a diagrammatic view of a camera assembly placed near a pool of water, according to some embodiments.

The camera 208 is configured such that it has a field of view 840. The camera 208 can be positioned such that the field of view 840 shows an entryway 878 (as illustrated in FIG. 9) or at least a portion of a pool of water 1426 (as illustrated in FIG. 18). The camera 208 can take a first image 862, which can be all or part of the field of view 840. As used herein, phrases such as "take an image" are used in a very broad sense. A picture can be taken and then recorded on any of the items listed herein. Taking a picture can mean that a camera was used as at least one of several items used to capture an image. Taking a picture can be part of taking a video. Thus, an item that takes a video also takes a picture. The camera can be a digital video camera.

The doorbell system 528 can send the first image 862 to a remote computing device 204. The remote computing device 204 can display the first image 862 on an electronic display 242. The remote computing device 204 can prompt a user (of the remote computing device 204) to select at least one detection zone 846 within the first image 862. As illustrated in FIG. 9, the detection zone 846 is a portion of the first image 862. Multiple detection zones can overlap or can be separate.

The doorbell system 528 can send data regarding the selected detection zone 846 from the remote computing device 204 to the doorbell 506. The doorbell 506 can then focus on looking for visitors within the detection zone 846 and/or can ignore indications that are suggestive of a visitor if the indications are located outside of the detection zone 846.

In some embodiments, a computer (e.g., server 206 or computing device 204 in FIG. 1) that is located remotely from the doorbell 506 analyzes each image. Thus, the computer can apply the detection zone 846 to analyses of images from the doorbell 506 such that the doorbell 506 does not have to receive data regarding the detection zone 846. In some embodiments, the doorbell 506 sends an alert regarding a visitor to the remote computing device 204, but then the computing device 204 (and/or the server 206 in FIG. 1) blocks displaying the alert because the alert is from a visitor indication that was outside of the detection zone 846.

The camera 208 can be used to take a second image 870. The detection zone 846 selected from the first image 862 can be positioned on the second image 870 such that the detection zone 846 represents the same area in front of the camera 208 in both the first image 862 and the second image 870. For example, the detection zone 846 can focus a visitor detection analysis on the same portion of an entryway in images taken by the camera assembly subsequent to the camera 208 taking the first image 862.

The doorbell system 528 can analyze the detection zone 846 of the second image 870. The doorbell system 528 can be used to analyze the second image 870 to determine whether a first indication of the visitor 844 is located inside of the detection zone 846. In FIG. 9, the doorbell system 528 determines that a first indication of the visitor 844 is located outside of the detection zone 846 (because the visitor 844 is located outside of the detection zone 846 in the second image 870). Then, the doorbell system 528 can decide not to send an alert and/or can block sending an alert to the remote computing device 204 in response to determining that the first indication of the visitor 844 is located outside of the detection zone 846.

The doorbell system 528 can be configured to notify the remote computing device 204 regarding a presence of the visitor 844 by sending an alert (e.g., a push notification) to the remote computing device 204. FIG. 9 illustrates the doorbell 506 sending an alert 232 to the remote computing device 204. The alert 232 can be sent directly from the doorbell 506 to the remote computing device 204. In some embodiments, the alert 232 is sent directly and wirelessly. In some embodiments, the alert 232 is sent via a server and/or via the Internet. The alert 232 can cause a push notification to appear on the user interface 240 of the computing device 204. In some embodiments, the alert 232 causes the remote computing device 204 to vibrate or "ring" to notify the user of the remote computing device 204 that a visitor may be present near the doorbell 202. The alert 232 can include a video of the visitor.

After the second image 870 was taken, the visitor 844 moved into the detection zone 846. The visitor 844 is located at least partially inside the detection zone 846 in the third image 874. The doorbell system 528 can analyze the third image 874 to detect an indication of the visitor 844. The doorbell system 528 can determine that an indication of the visitor 844 is located inside the detection zone 846.

Automatic Calibration

Figure 10:
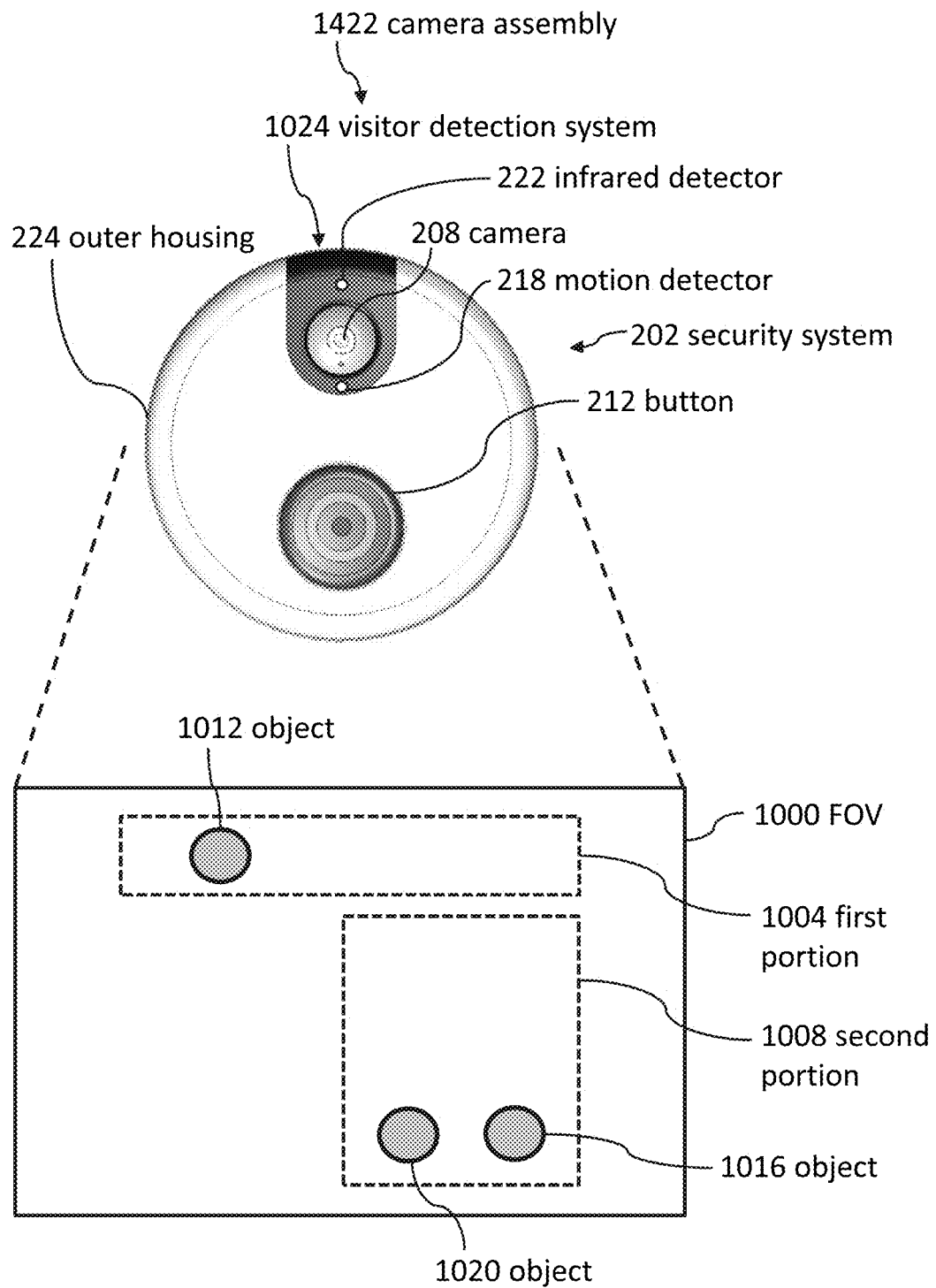
FIG. 10 illustrates a diagrammatic view of a camera assembly that has a field of view, according to some embodiments.

FIG. 10 illustrates a doorbell (e.g., security system 202) that has a field of view ("FOV") 1000. The doorbell 202 can be part of a doorbell system (e.g., communication system 200) that includes a remote computing device 204, a server 206, and/or wireless communication 230 (shown in FIG. 1). The button 212 of the doorbell 202 can be configurable such that pressing the button 212 rings a chime 302 (shown in FIG. 3). The field of view 1000 can include a first portion 1004 and a second portion 1008.

Embodiments can include using doorbell 202 to detect a first object 1012 within the first portion 1004 of the field of view 1000; and/or determining that the button 212 was not pressed within a predetermined time after the doorbell detects the first object 1012 within the first portion 1004 of the field of view 1000. For example, the first object 1012 might be a car or a bird that is detected by the camera 208 and/or by the motion detector 218. The car or bird will not press the button 212 like an actual visitor might do. As a result of the object's 1012 detection not being followed by a button 212 press (e.g., within 60 seconds), the doorbell system can become more skeptical of objects detected in the first portion 1004 of the field of view 1000. If the detected object 1012 had actually been a visitor (e.g., a person coming to the door), then the detection of the object 1012 likely would have been followed by the visitor pressing the doorbell button 212. This correlation between detecting remote objects and the doorbell system detecting a press of the doorbell button 212 can enable the doorbell system to automatically calibrate itself.

More specifically, the doorbell system can calibrate sensitivity in certain areas of the field of view 1000. For example, the first portion 1004 of the field of view 1000 might be of a road that passes in front of the building 300 (shown in FIG. 3) to which the doorbell 202 is attached. The movement on the road and/or the presence of new objects on the road could lead to many false positives. For example, the doorbell 202 could detect a car on the road and then automatically send an alert regarding a "visitor" to the remote computing device 204 (shown in FIG. 1). The user of the remote computing device 204 could then be irritated that the passing car is not actually a visitor, and thus, the alert inappropriately distracted the user. The doorbell system can reduce the sensitivity of the detection system in the first portion 1004 to reduce false positives (e.g., due to passing cars). In some cases, the sensitivity of the detection system is reduced so much that the system excludes the first portion of the field of view from causing an alert configured to notify the remote computing device regarding a presence of a "visitor" (e.g., when the suspected "visitor" is a passing car and not a visiting person).

The field of view 1000 can include a second portion 1008 that can be commonly associated with detecting indications of real visitors. For example, the system can detect an object 1016 in the second portion 1008. This detection can be followed by the object 1016 (i.e., a real visitor) triggering the doorbell button 212 (by pressing the button 212). This correlation can increase the probability of another object 1020 detected within the second portion 1008 resulting in the system sending the alert to the remote computing device 204 (shown in FIG. 1) even if the object 1020 does not ring the doorbell button 212 or before the object 1020 rings the doorbell button 212.

Embodiments can include many detection areas (such as the first portion 1004 and the second portion 1008). For example, the sections 528 in FIG. 6 can each be individual detection areas that are individually calibrated based on doorbell button triggering data that is individually associated with the detection areas. Some of the sections 528 can be excluded from causing an alert if motion, image indications, and/or infrared data detected in those sections is not typically correlated with doorbell button triggering.

Figure 11:
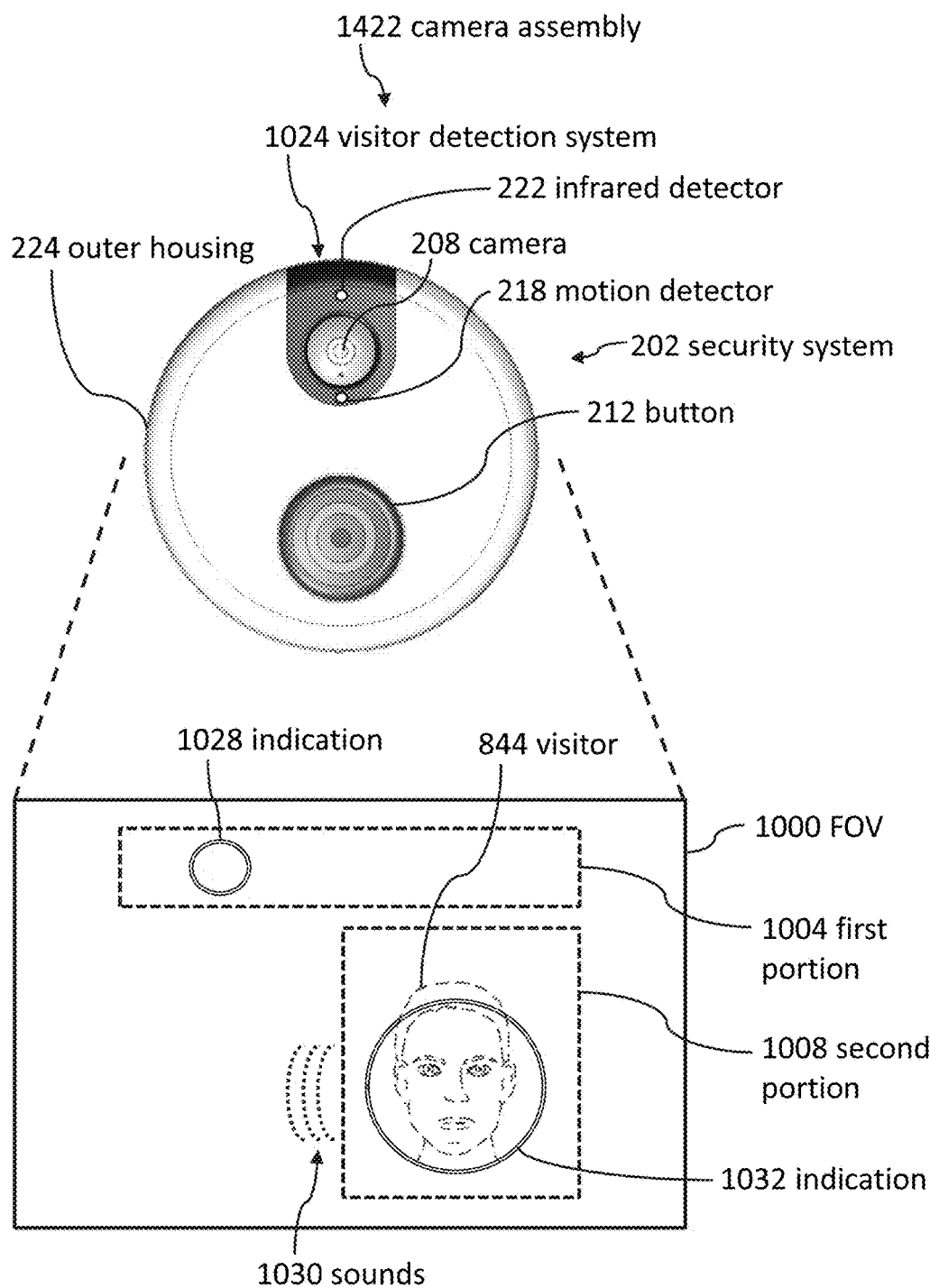
FIG. 11 illustrates a diagrammatic view of a visitor located within the field of view from FIG. 10, according to some embodiments.

FIG. 11 illustrates a visitor 844 located within the second portion 1008 of the field of view 1000. The visitor detection system 1024 can be configured to detect the visitor 844. The visitor detection system 1024 can comprise at least one of a camera 208, a motion detector 218, and/or an infrared detector 222. The visitor detection system 1024 is configured to detect a first indication 1028 suggestive of the visitor 844. In this example, the first indication 1028 is misleading because, although it is suggestive of a visitor, the indication 1028 was caused by something other than a visitor. For example, the first indication 1028 might have been caused by a passing car, an animal, or wind blowing a garbage container over. The system can realize that indications in the first portion 1004 of the field of view 1000 are unreliable if indications in the first portion 1004 of the field of view are not typically followed by the doorbell button 212 being triggered.

An indication can be suggestive of the visitor if the indication is of a type that may indicate a visitor (even if the indication can sometimes result in false positives). For example, the indication can be a motion indication, but at times, motion indications may result from moving cars, pets, and plants. As a result, a motion indication may not actually indicate a visitor even though the indication suggests that a visitor may be present.

An infrared signature that seems to indicate that a visitor is present can be a type of indication. The infrared signature may be of a shape and/or temperature that suggests the infrared signature is from a visitor (i.e., a person). In many cases, infrared signatures suggestive of visitors are actually from visitors, but in some cases, infrared signatures suggestive of visitors may be misleading (and not actually be from visitors).

A shape in an image taken by a camera may be an indication suggestive of a visitor. For example, the shape can be of a size or geometry that suggests the shape represents at least a portion of a visitor. In some cases, shapes suggestive of a visitor may not actually be from a visitor.

Doorbell triggering (e.g., pressing) data can be used to substantiate suggestive indicators. Thus, embodiments can grow more skeptical of indicators if they are not followed by, for example, a visitor pressing the doorbell button. Certain areas of the field of view can be discounted or ignored altogether if indicators associated with the certain areas are not followed by a visitor pressing the doorbell button.

Embodiments can grow more confident of indicators if they are followed by a visitor pressing the doorbell button. In some embodiments, all areas of the field of view are configured to trigger an alert regarding the visitor until indications associated with certain areas are not followed by visitors pressing the button. Then, the system can ignore indications in those areas (to reduce the number of false positives).

Some embodiments include using the visitor detection system to detect the first indication suggestive of the first visitor within a first portion of the field of view and determining that the first indication detected within the first portion of the field of view is not associated with a triggering of the button.

Several methods can be used to determine if an indication is associated with a triggering of the button. In some embodiments, the system waits for a predetermined amount of time (e.g., 60 seconds or less) after detecting the indication to determine if the doorbell button is pressed. If the button is not pressed within the predetermined amount of time, then the indication is not associated with the triggering of the button.

The system can be configured to determine if the object that resulted in the indication suggestive of the visitor later pressed the doorbell button. If the object pressed the doorbell button, then the indication was associated with the triggering of the button. If the object did not press the doorbell button, then the object was not associated with the triggering of the button. This approach enables the system to calibrate its remote detection capabilities based on doorbell button data. Then, the system can more accurately determine if an indication is actually a visitor (to reduce false positives). As a result, the system can more reliably send an alert about a later visitor even if the visitor does not press the button.

A visitor can trigger the doorbell button in several ways. In many embodiments, the visitor triggers the doorbell button by pressing the doorbell button (e.g., to make the chime "ring"). Some embodiments include a button that can be triggered without pressing the button. For example, the visitor can trigger the button by touching the button. Some embodiments include "contactless" switches (e.g., Hall effect sensors) that enable triggering the button without actually touching the button.

Several embodiments include using the visitor detection system to detect a second indication suggestive of a second visitor within the first portion of the field of view and excluding the first portion of the field of view from causing an alert configured to notify the remote computing device regarding a presence of the second visitor. The excluding can be at least partially in response to determining that the first indication detected within the first portion of the field of view is not associated with the triggering of the button. The excluding prevents the second indication from causing the alert.

In some embodiments, this exclusion can create zones within the field of view that will not cause the system to send the alert even though the system detects an indication suggestive of a visitor in the excluded zones. This exclusion often will not prevent all indications from causing an alert if the indications are detected in non-excluded zones.

Several embodiments include using the visitor detection system to detect a third indication suggestive of the second visitor within a second portion of the field of view and then sending the alert in response to detecting the third indication within the second portion. The first indication can be a first motion indication, the second indication can be a second motion indication, and the third indication can be a third motion indication.

In some embodiments, the doorbell system determines that the first indication detected within the first portion of the field of view is not associated with the triggering of the button by determining that the button was not triggered within 60 seconds after detecting the first indication. 60 seconds can be a good timeframe because visitors approaching a doorbell will typically ring the doorbell within 60 seconds. If the item that caused the indication has not pressed the doorbell button within 60 seconds of being detected, then the item might not actually be a visitor and might be a passing car, a pet, a wind-blown tree branch, or another misleading item.

Of course, there will be times when an actual visitor does not press the doorbell button. For example, a person might choose to knock on the door instead of ringing the doorbell button. Thus, some embodiments include listening for sounds 1030 indicative of a visitor. Sounds 1030 indicative of a visitor include talking and knocking. Some embodiments are similar to other embodiments described herein except that the embodiments determine whether an indication detected within the first portion of the field of view is associated with sounds 1030 indicative of a visitor.

As a result of there being times when an actual visitor does not press the doorbell button, some embodiments do not immediately exclude a portion of the field of view from causing an alert, but instead, rely on data from many visitors and/or adjust the sensitivity of the visitor detector in the portion of the field of view.

FIG. 11 illustrates an indication 1032 that resulted from a visitor 844 approaching the doorbell 202. The doorbell system can detect the indication 1032 based on detecting the infrared signature of the visitor 844, detecting the motion of the visitor 844, and/or comparing a baseline image to a second image of the field of view 1000 and then determining that the indication 1032 is present in the second image but not in the baseline image.

Infrared signature is used to describe the appearance of objects to infrared sensors. Infrared signatures can be influenced by a wide range of factors (e.g., object shape, temperature, background). As used herein, infrared signature is used in a broad sense to describe detecting an object based on the infrared indication of that object.

Figure 12:
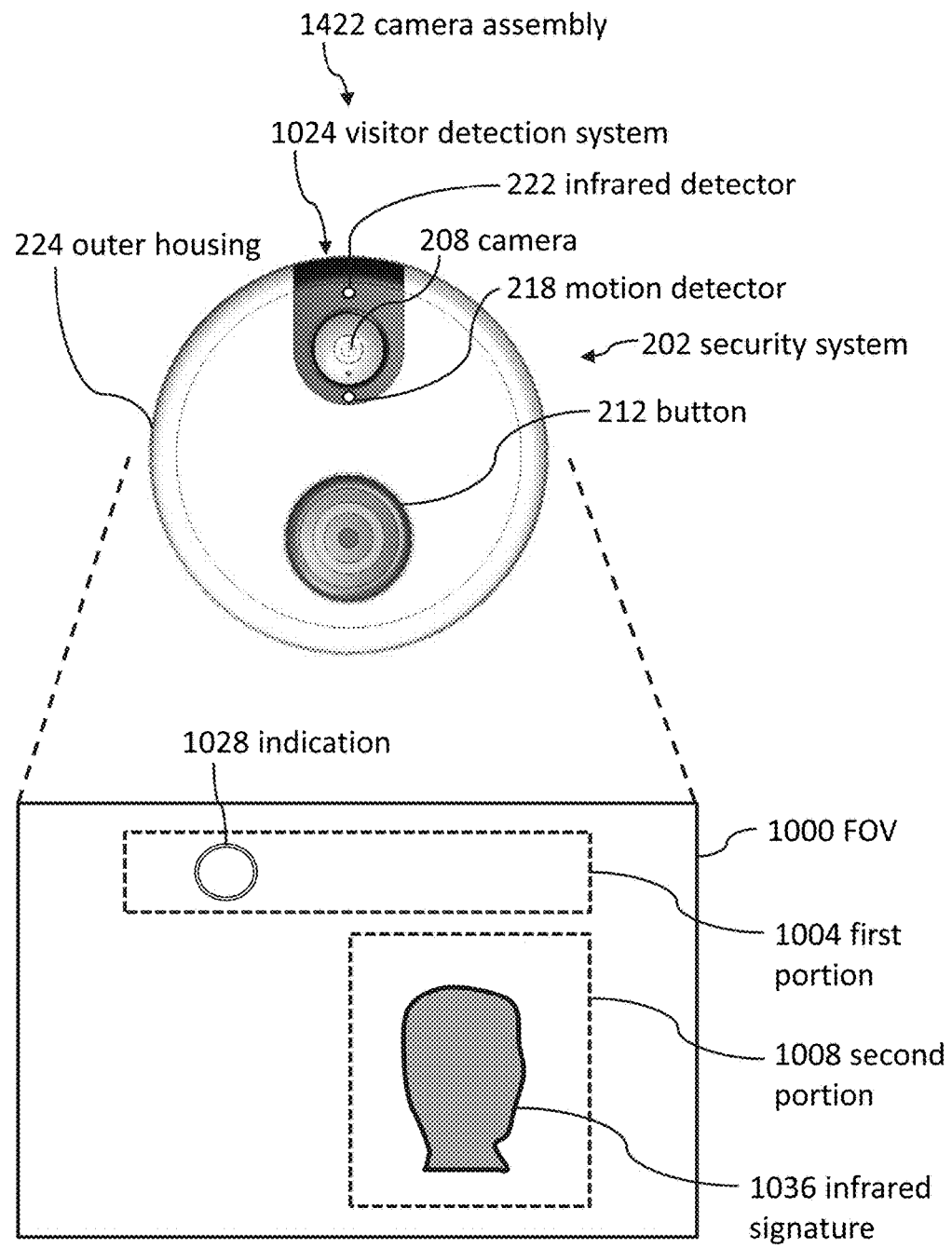
FIG. 12 illustrates a diagrammatic view of an infrared signature of the visitor shown in FIG. 11, according to some embodiments.

FIG. 12 illustrates an infrared signature 1036 of the visitor 844 shown in FIG. 11. The infrared detector 222 can detect the infrared signature 1036. Although the infrared signature 1036 was caused by a real visitor 844, many objects that are not visitors can cause infrared signatures. As a result, many embodiments use doorbell button 212 data to calibrate the visitor detection system 1024. Infrared signatures that are not associated (e.g., followed) by a press of the doorbell button 212 may be categorized as unreliable indications of a visitor. Portions of the field of view 1000 that commonly cause unreliable indications may be precluded from causing an alert to be sent to the remote computing device 204 (shown in FIG. 1). For example, cars passing in the first portion 1004 of the field of view 1000 may have an infrared signature that the doorbell system could mistake for a visitor (e.g., a person approaching the doorbell). If so, the system can become more reliable (and better calibrated) by ignoring infrared signatures in the first portion 1004 of the field of view 1000.

In some embodiments, the visitor detection system comprises the infrared detector, wherein using the visitor detection system to detect the first indication within the first portion of the field of view comprises detecting a first infrared signature within the first portion. Methods can include reducing a first sensitivity of the visitor detection system within the first portion in response to determining that the button was not triggered within 60 seconds after detecting the first indication. Reducing the first sensitivity can reduce a first probability of causing a first alert configured to notify the remote computing device regarding a presence of a second visitor in response to detecting a second indication suggestive of the second visitor within the first portion of the field of view.

In several embodiments, the infrared detector comprises a first infrared sensor and a second infrared sensor. The doorbell can comprise a wall that separates the first infrared sensor from the second infrared sensor such that the first infrared sensor is configured to detect the first infrared signature within the first portion and the second infrared sensor is configured to detect a second infrared signature within a second portion of the field of view.

Some embodiments include using the infrared detector to detect a third indication suggestive of a third visitor within a second portion of the field of view; and/or increasing a second sensitivity of the visitor detection system within the second portion in response to determining that the button was triggered within 60 seconds after detecting the third indication. Increasing the second sensitivity can increase a second probability of causing a second alert configured to notify the remote computing device regarding the presence of the third visitor in response to detecting the third indication within the second portion of the field of view.

Figure 13:
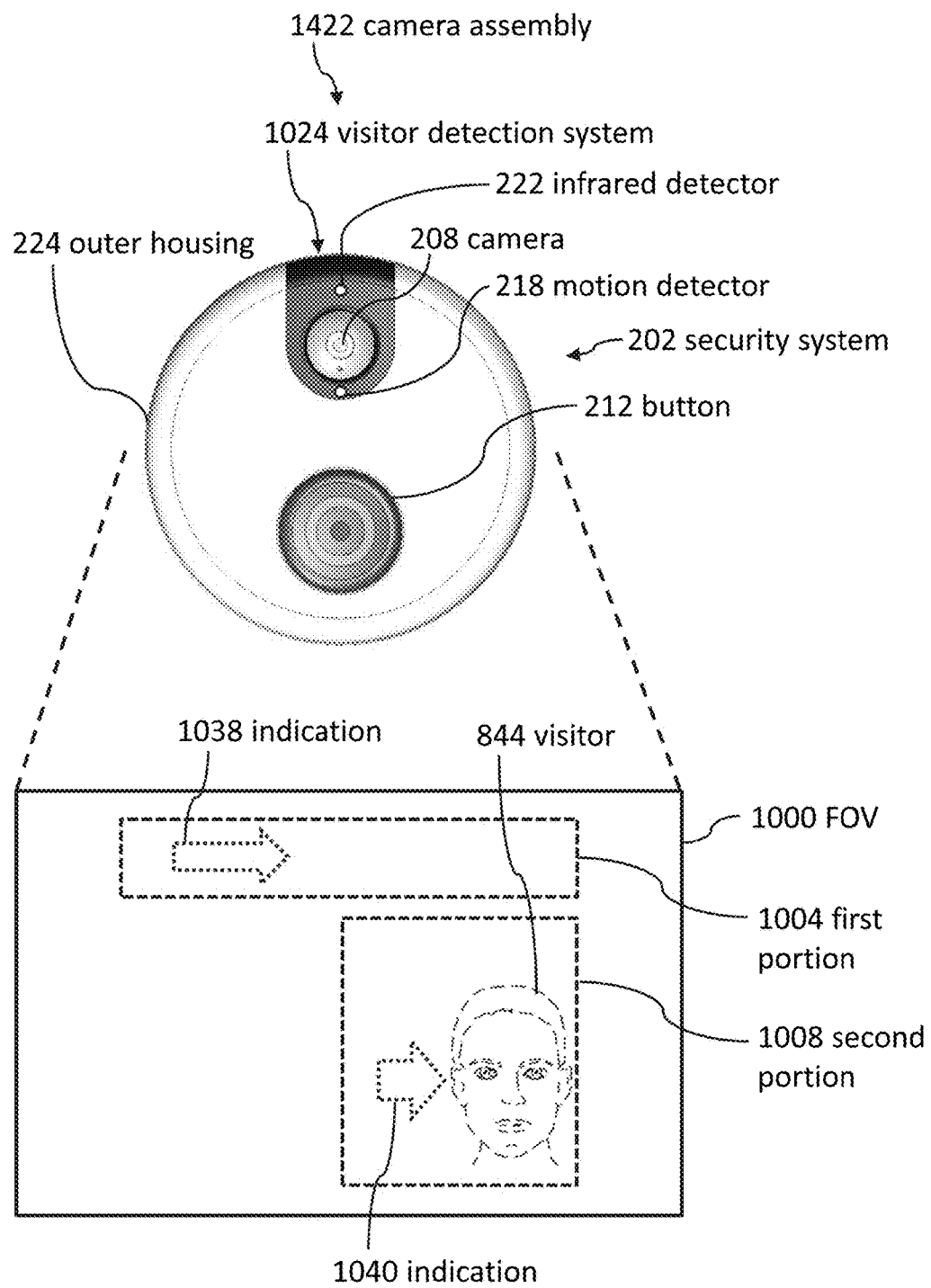
FIG. 13 illustrates a diagrammatic view of a motion indication of the visitor shown in FIG. 11, according to some embodiments.

FIG. 13 illustrates an embodiment with motion indications 1038, 1040. The motion detector 218 can detect the motion indications 1038, 1040. The first motion indication 1038 can be from a passing car traveling at 35 miles per hour. The second indication 1040 can be from the visitor 844 approaching a door located in the same entryway as the doorbell 202. The visitor 844 can be moving at less than 5 miles per hour, which is typical of people as they approach doors. Cars tend to move much faster than people walking towards doorbells, so a speed threshold can be a useful way for the doorbell system to distinguish between people (which are typically true positives) and cars (which are typically false positives).

If the first portion 1004 of the field of view 1000 typically results in false positives (e.g., based on objects that are moving too fast and/or based on detecting objects that then do not ring the doorbell), then the first portion 1004 can be precluded from causing alerts. If the second portion 1008 of the field of view 1000 typically results in true positives (e.g., based on objects that are moving at a speed below the predetermined threshold and/or based on detecting objects that then ring the doorbell), then the doorbell system can increase its sensitivity to motion indicators in the second portion 1008 of the field of view 1000.

Speed is one of many factors that can help distinguish between misleading motion and motion that is from an actual visitor. People tend to approach doorbells at less than 5 miles per hour. In contrast, cars tend to drive over 25 miles per hour and often drive over 35 miles per hour. Excluding motion that is over 5 miles per hour can help improve the accuracy of the doorbell system (by screening out motions that are too fast to likely be from a visitor).

Several methods include detecting a speed of the first motion; and/or excluding the first motion from causing the alert configured to notify the remote computing device regarding the presence of the first visitor. The excluding can be at least partially in response to the speed being greater than a predetermined threshold. The predetermined threshold can be at least 5 miles per hour and can be less than 35 miles per hour. A predetermined threshold of 15 miles per hour provides a very reliable dividing line between people walking up to a doorbell and cars driving in front of the doorbell. Several embodiments include a predetermined threshold of at least 15 miles per hour.

In some embodiments, the visitor detection system comprises a motion detector. Using the visitor detection system to detect the first indication within the first portion of the field of view can comprise detecting a first motion within the first portion. Embodiments can include reducing a first sensitivity of the visitor detection system within the first portion in response to determining that the button was not triggered within a predetermined time (e.g., 60 seconds, 30 seconds, 15 seconds) after detecting the first indication. Reducing the first sensitivity can reduce a first probability of causing an alert configured to notify the remote computing device regarding a presence of a second visitor in response to detecting a second indication suggestive of the second visitor within the first portion of the field of view.

Several embodiments include using the visitor detection system to detect a second motion within a second portion of the field of view; and/or increasing a second sensitivity of the visitor detection system within the second portion in response to determining that the button was triggered within 60 seconds after detecting the second motion. Increasing the second sensitivity can increase a second probability of causing the alert configured to notify the remote computing device regarding the presence of the second visitor in response to detecting the second motion within the second portion of the field of view.

Some embodiments include dividing the field of view into the first portion and the second portion such that the doorbell system is configured to distinguish between the first motion detected in the first portion and the second motion detected in the second portion. A wall (e.g., a plastic blade) can be used to divide the field of view. In some embodiments, the field of view is divided with software (e.g., rather than being physically divided by a wall).

Several embodiments for using a doorbell to detect visitors include obtaining the doorbell system that comprises a motion detector and a button; configuring the doorbell system such that the motion detector comprises a field of view; detecting a first motion within a first portion of the field of view; determining that the button was not triggered within 60 seconds after detecting the first motion within the first portion of the field of view; and/or excluding the first portion of the field of view from causing an alert configured to notify the remote computing device regarding a presence of the first visitor. The excluding can be at least partially in response to determining that the button was not triggered within 60 seconds after detecting the first motion within the first portion of the field of view.

Some embodiments include detecting a second motion within a second portion of the field of view; determining that the button was triggered within 60 seconds after detecting the second motion within the second portion of the field of view; and/or configuring the doorbell system to automatically send the alert regarding a third motion detected in the second portion of the field of view at least partially in response to determining that the button was triggered within 60 seconds after detecting the second motion within the second portion of the field of view.

Several embodiments include detecting the third motion within the second portion of the field of view; and/or automatically sending the alert to the remote computing device regarding the presence of a visitor in response to detecting the third motion within the second portion of the field of view. Methods can include automatically initiating the sending of the alert to the remote computing device regarding the presence of the first visitor prior to the first visitor pressing the button.

Figure 14:
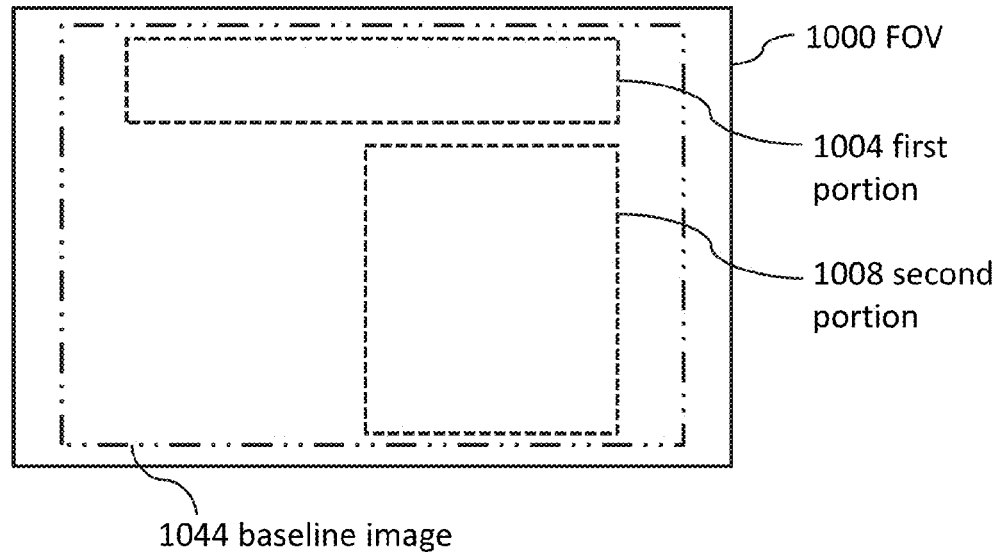
FIGS. 14 and 15 illustrate diagrammatic views of the field of view shown in FIG. 10, according to some embodiments.
Figure 15:
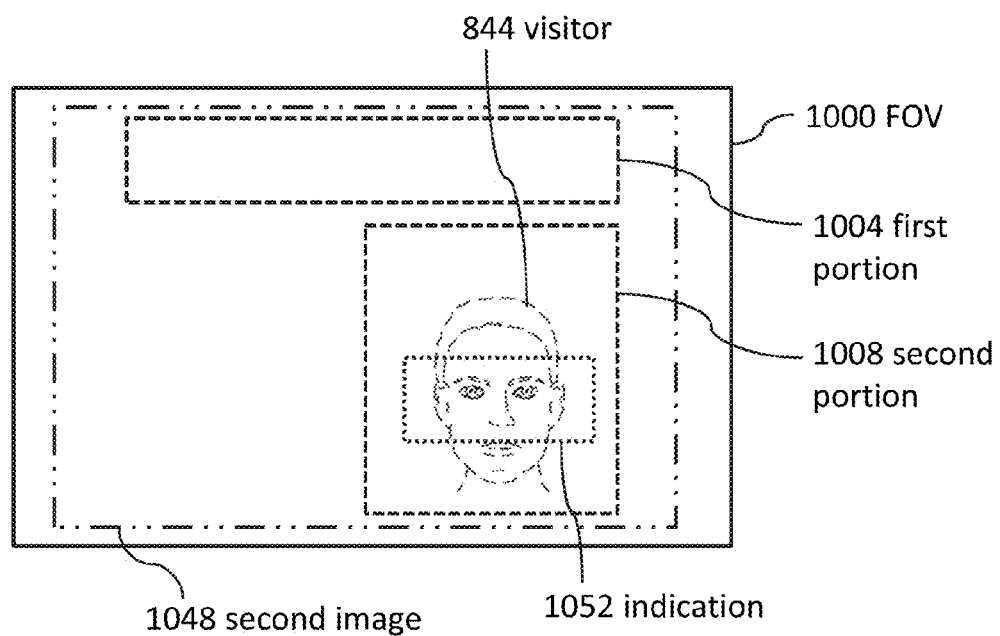

FIG. 14 illustrates a baseline image 1044 of the field of view 1000. FIG. 15 illustrates a second image 1048 of the field of view 1000. Referring now to FIGS. 14 and 15, the camera 208 can take the baseline image 1044 and the second image 1048. The doorbell system can compare the baseline image 1044 to the second image 1048 to detect an indication 1052 of the visitor 844. The system can then determine that the indication 1052 is present in the second image 1048 but not in the baseline image 1048.

In several embodiments, the visitor detection system comprises a camera, and using the visitor detection system to detect the first indication within the first portion of the field of view comprises using the camera to take a first image. Then, the doorbell system can analyze the first image to detect the first indication. Embodiments can include reducing a first sensitivity of the visitor detection system within the first portion in response to determining that the button was not triggered within a predetermined time after detecting the first indication. Reducing the first sensitivity can reduce a first probability of causing a first alert configured to notify the remote computing device regarding a presence of a second visitor in response to detecting a second indication suggestive of the second visitor within the first portion of the field of view.

Some embodiments include using the camera to take a second image. Then, the doorbell system can analyze the second image to detect a third indication suggestive of a third visitor within a second portion of the field of view. Methods can include increasing a second sensitivity of the visitor detection system within the second portion in response to determining that the button was triggered within 60 seconds after detecting the third indication by analyzing the second image. Increasing the second sensitivity can increase a second probability of causing a second alert configured to notify the remote computing device regarding the presence of the third visitor in response to detecting the third indication within the second portion of the field of view.

Several embodiments include using a doorbell system to detect a first visitor. The doorbell system can comprise a doorbell and a remote computing device. Methods can include obtaining the doorbell that comprises a camera and a button. The button can be configurable to enable the first visitor to sound a chime. Methods can also include configuring the doorbell system such that the camera comprises a field of view; using the camera of the doorbell to take a baseline image to calibrate the doorbell system by establishing a baseline of at least a part of the field of view; using the camera of the doorbell to take a second image of at least the part of the field of view; determining that a first object is present in the second image, but not in the baseline image; associating the first object with a first portion of the field of view; determining that the button was not triggered within 60 seconds after determining that the first object is present in the second image, but not in the baseline image; and/or excluding the first portion of the field of view from causing an alert configured to notify the remote computing device regarding a presence of the first visitor. The excluding can be at least partially in response to determining that the button was not triggered within 60 seconds after determining that the first object is present in the second image, but not in the baseline image.

Associating the first object with the first portion of the field of view can include correlating the first object with a location within the field of view. For example, the system can know where in the field of view the first object was detected. This relative location information can be helpful so the system can determine which areas of the field of view are causing misleading indications (e.g., as implied by an indication not being followed by a triggering of the doorbell button within 60 seconds of the system detecting the indication).

Many factors and methods can be used to exclude a portion of the field of view from causing an alert. For example, sound data and button data can be combined to exclude the portion of the field of view. In some embodiments, many button press data points are used to eventually exclude a portion of the field of view. Thus, excluding can be at least partially in response to determining that the button was not triggered within 60 seconds after determining that the first object is present in the second image, but not in the baseline image, even though other factors and methods are ultimately used in the full exclusion decision.

Several embodiments include using the camera of the doorbell to take a third image of at least the part of the field of view; determining that a second object is present in the third image, but not in the baseline image; associating the second object with a second portion of the field of view; determining that the button was triggered within 60 seconds after determining that the second object is present in the third image, but not in the baseline image; and/or configuring the doorbell system to automatically send the alert regarding a third object detected in the second portion of the field of view at least partially in response to determining that the button was triggered within 60 seconds after determining that the second object is present in the third image, but not in the baseline image.

Some embodiments include using the camera of the doorbell to take a fourth image of at least the part of the field of view; determining that the third object is present in the fourth image, but not in the baseline image; associating the third object with the second portion of the field of view; and/or automatically sending the alert to the remote computing device regarding the presence of a visitor.

Several embodiments include automatically initiating the sending of the alert to the remote computing device regarding the presence of the first visitor prior to the first visitor pressing the button. Initiating the sending of the alert does not necessarily mean that the alert has arrived at the remote computing device.

The baseline image can comprise several images. In some embodiments, the baseline image is actually a collection of images taken at different times. Thus, a first image can be the baseline image for a second image, and the second image can be the baseline image for a third image.

Figure 16:
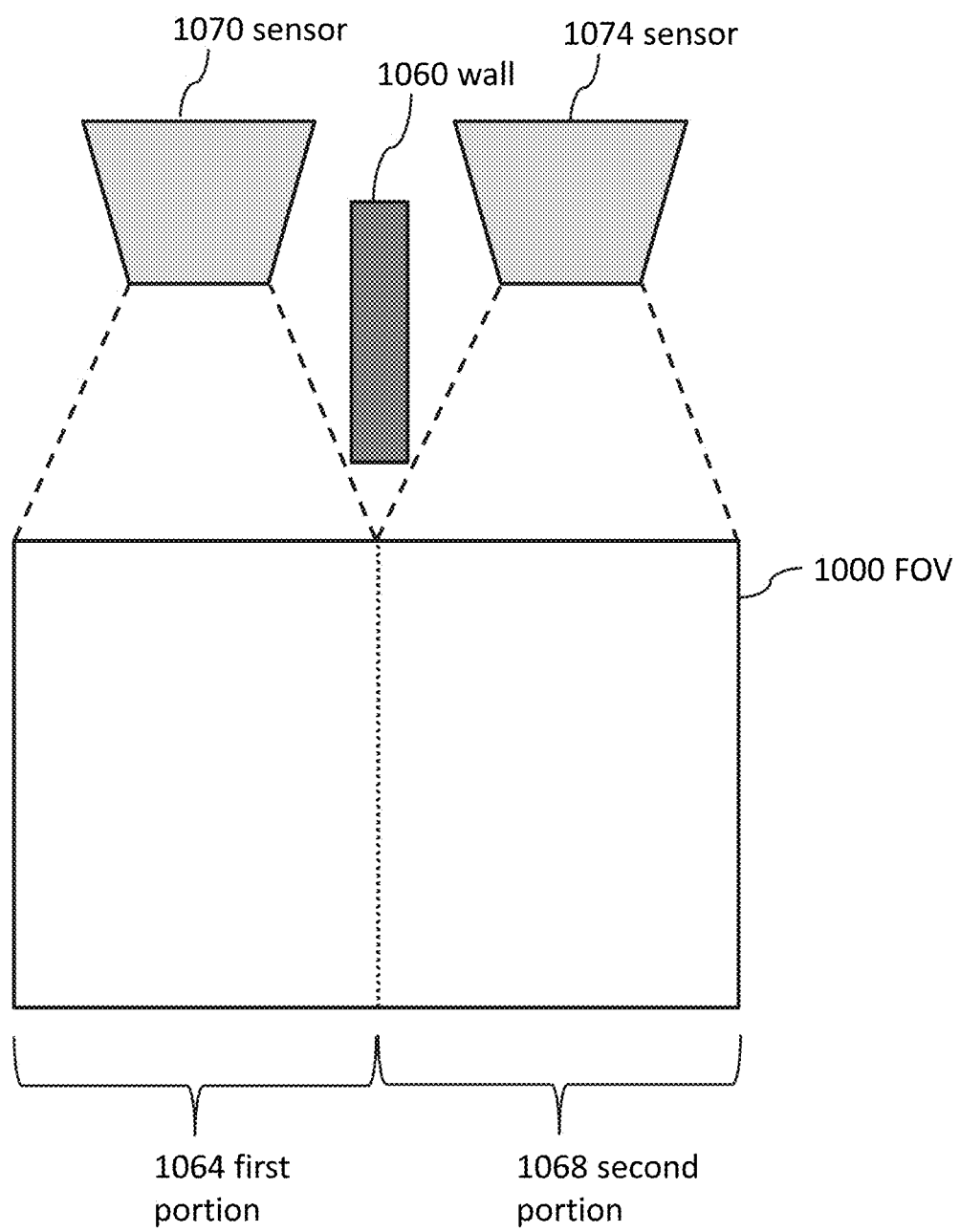
FIG. 16 illustrates a diagrammatic view with a wall dividing the field of view from FIG. 10, according to some embodiments.

FIG. 16 illustrates an embodiment in which a wall 1060 divides the field of view 1000 into a first portion 1064 and a second portion 1068. The infrared detector 222 and/or the motion detector 218 (shown in FIG. 12) can include a first sensor 1070 and a second sensor 1074. The sensors 1070, 1074 can be infrared sensors and/or motion sensors.

In several embodiments, the infrared detector 222 comprises a first infrared sensor and a second infrared sensor. The doorbell 202 (shown in FIG. 12) can be configured such that the wall 1060 separates the first infrared sensor from the second infrared sensor such that the first infrared sensor is configured to detect the first infrared signature within the first portion and the second infrared sensor is configured to detect a second infrared signature within a second portion of the field of view.

The wall 1060 can be configured to divide the field of view 1000 into portions 1064, 1068 such that the doorbell system can distinguish between motions in different portions 1064, 1068. For example, the wall 1060 can be configured to prevent a second sensor 1074 from detecting a motion that the first sensor 1070 can detect (e.g., because the wall 1060 can "hide" the motion from the second sensor 1074).

Pool Monitoring

Drowning is the second-leading cause of injury-related death for children under 14 years old. Traditional pool monitoring devices rely on detecting when a person enters the water. People, however, can drown in less than two minutes. As a result, emitting an alert when a person enters the water can leave insufficient time for a rescuer to save the drowning person. Moreover, a potential rescuer might not hear an alert emitted by a pool monitoring device. Various embodiments described herein address at least some of these shortcomings of traditional pool monitoring devices.

While staffing each pool 24 hours a day with a lifeguard might be ideal, the cost of human monitoring is often too high to be feasible. Many monitoring system embodiments described herein provide means of robotically monitoring a pool and then alerting a remotely located individual if an unauthorized person enters a pool area. A camera assembly can be used to monitor the pool and then can wirelessly send alerts to a remote computing device such as a smartphone. A user of the remote computing device can receive the alert and then can decide what action to take (e.g., personally rushing to the pool or calling 911 for emergency assistance). The life-saving benefits of many embodiments cannot be overstated.

Monitoring systems can be used to detect visitors (e.g., a person who approaches a pool of water). For example, if a person comes too close to a pool of water, the monitoring system can emit a warning sound and/or can send a wireless alert to a remote computing device such as a smartphone, laptop, desktop, tablet, or any other computing device with an electronic screen.

As used herein, "pool of water" is used in a broad sense and can include any body of water that could be used for swimming or bathing. Example pools of water can include swimming pools, hot tubs, bathtubs, swift rivers, ponds, and lakes.

Figure 17:
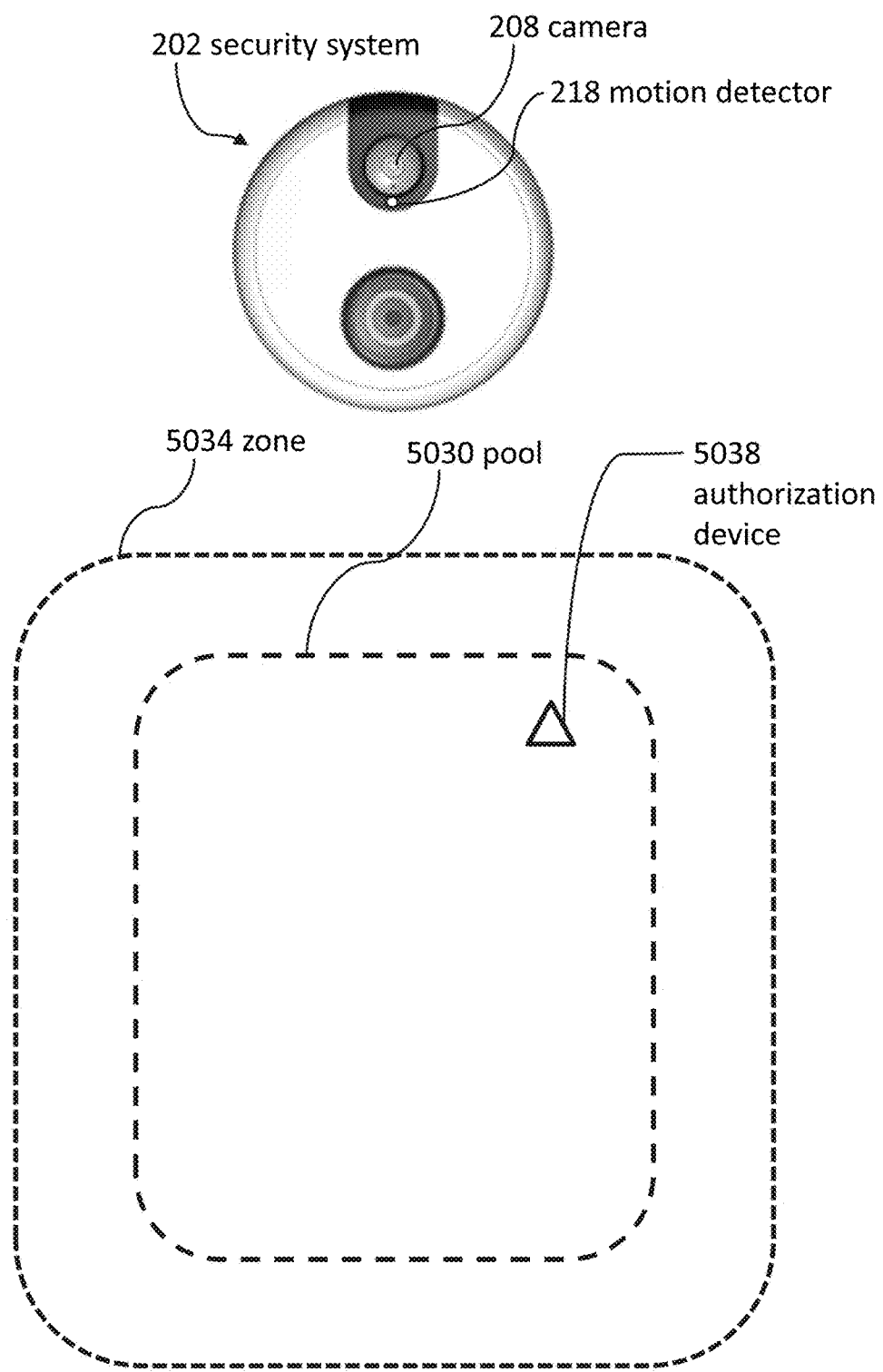
FIG. 17 illustrates a diagrammatic view of a camera assembly used to monitor a pool area, according to some embodiments.

FIG. 17 shows FIG. 50 of U.S. Nonprovisional patent application Ser. No. 14/275,811 (now U.S. Pat. No. 8,872,915), which illustrates a diagrammatic view of a security system (e.g., a camera assembly) used to monitor a pool area. (Also see FIG. 50 of U.S. Nonprovisional patent application Ser. No. 14/142,839, which is now U.S. Pat. No. 8,842,180.) The entire contents of U.S. Nonprovisional patent application Ser. No. 14/275,811 and U.S. Nonprovisional patent application Ser. No. 14/142,839 are incorporated by reference herein.

Referring now to FIG. 17, the motion detector 218 can be configured to determine whether a person is located in the pool 5030 even when the security system 202 is located outside of the pool 5030. In some embodiments, the security system 202 is placed at least three feet and/or less than fifty feet from the pool 5030. The security system 202 can watch over the pool 5030 and can send a notification to a remote computing device if a visitor enters a zone 5034 that includes at least a portion of the pool 5030.

The security system 202 can take a picture 208 with the camera 208 in response to detecting motion (e.g., via the motion detector 218). The security system 202 (or another portion of the communication system 200 illustrated in FIG. 1) can analyze the picture to determine if the motion was caused by an adult or by a child (e.g., by a person under a predetermined height threshold). In some cases, the height threshold can be at least 5 feet, 4.5 feet, 3.5 feet, or 3 feet.

The camera 208 can be configured to visually identify people through machine vision and/or image recognition. For example, the camera 208 can take an image of the person located near the pool 5030. Software run by any portion of the system can then analyze select features of the person from the image. The software can use scaling to estimate the height of the person (e.g., based on previous calibration procedures and information).

Figure 19:
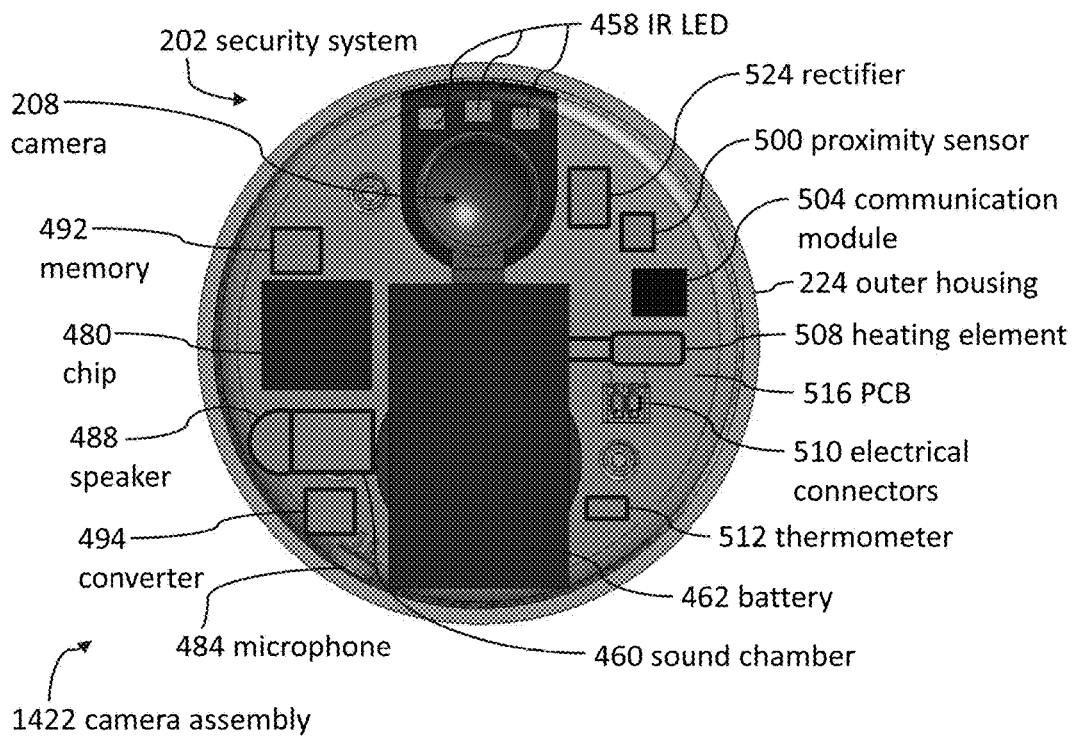
FIG. 19 illustrates a back view of a camera assembly without a mounting bracket, according to some embodiments.

In some embodiments, if the motion was caused by an adult and/or by a person taller than the height threshold, then the system will not send a notification (e.g., alarm) to the remote computing device and/or will not emit an alert sound from the speaker 488 (shown in FIG. 19 herein and in FIG. 11 of U.S. Nonprovisional patent application Ser. No. 14/142,839) of the security system 202. In some embodiments, if the motion was caused by a child and/or by a person shorter than the height threshold, then the system will send a notification to the remote computing device and/or will emit an alert from the speaker of the security system 202.

Although the security system 202 can be configured to detect if a person falls into the pool 5030, the security system 202 can also be configured to detect whether a person is located within a zone 5034 that includes at least a portion of the pool 5030. In some embodiments, the zone 5034 includes all of the pool 5030 and/or an area around the perimeter of the pool 5030. The zone 5034 can define a danger zone. Once the security system 202 detects that a person is located in the zone 5034, the security system can enter a Standby Mode in which the security system 202 conducts at least one analysis to determine if the person might be in danger (e.g., if the person is shorter than the height threshold or if the person is unauthorized to be in the zone 5034 and/or in the pool 5030).

In some embodiments, the security system 202 will send a notification to a remote computing device and/or emit an alert sound from the speaker unless the detected person is wearing a device that indicates the person is authorized to be in the zone 5034 and/or in the pool 5030. The authorization device 5038 can be a bracelet or other object worn by the person. The authorization device 5038 can include a radio-frequency identification ("RFID") or Bluetooth communication device configured to provide data to the security system 202 (e.g., data regarding the authorization of the device to be located in the zone 5034 and/or in the pool 5030).

Several methods include using the security system 202 to detect whether a person is located in the zone 5034. Methods can include determining whether the person is authorized to be in the zone 5034. In some embodiments, methods include sending a notification to a remote computing device and/or emitting an alert sound from a speaker 488 of the security system 202 if the person is located in the zone 5034 and/or not authorized to be in the zone 5034.

FIG. 18 illustrates an embodiment that can be applied to any of the communication system embodiments and security system embodiments incorporated by reference. A camera assembly 1422 (e.g., the security system 202 shown in FIG. 1) is placed near a pool of water 1426 such that the camera 208 of the camera assembly 1422 includes a field of view 1000 that comprises (e.g., is configured to "see") at least a portion of the pool of water 1426.

A monitoring system 1430 can include the camera assembly 1422 and a remote computing device 204. The camera assembly 1422 can wirelessly communicate with the remote computing device 204 via wireless communications 230. Alerts from the camera assembly 1422 can be shown on the electronic display 242 of the remote computing device 204.

If the visitor 844 enters a detection zone 1434 and/or falls into the pool of water 1426, then the camera assembly 1422 can take a picture of the visitor 844. This picture can be shown on the electronic display 242. A user of the remote computing device 204 can then determine if the visitor 844 is someone who can swim and/or is authorized to be in the detection zone 1434 (e.g., a pool area). The camera assembly 1422 can detect visitors via analyzing images taken by the camera 208, via the motion detector 218, and/or via an infrared detector 222.

In many cases, the computing device 204 is located out of visible range of the camera assembly 1422 when the camera assembly 1422 sends an alert (e.g., a wireless communication 230) to the remote computing device 204. In the embodiment illustrated in FIG. 18, the remote computing device 204 is not mechanically coupled to the camera assembly 1422. For example, the camera assembly 1422 can be mounted to a wall 1438 and the remote computing device 204 can be inside a home that is adjacent to the pool of water 1426. In some cases, the remote computing device 204 can be thousands of miles away from the camera assembly 1422 and can still be configured to receive alerts regarding unauthorized visitors from the camera assembly 1422.

Figure 20:
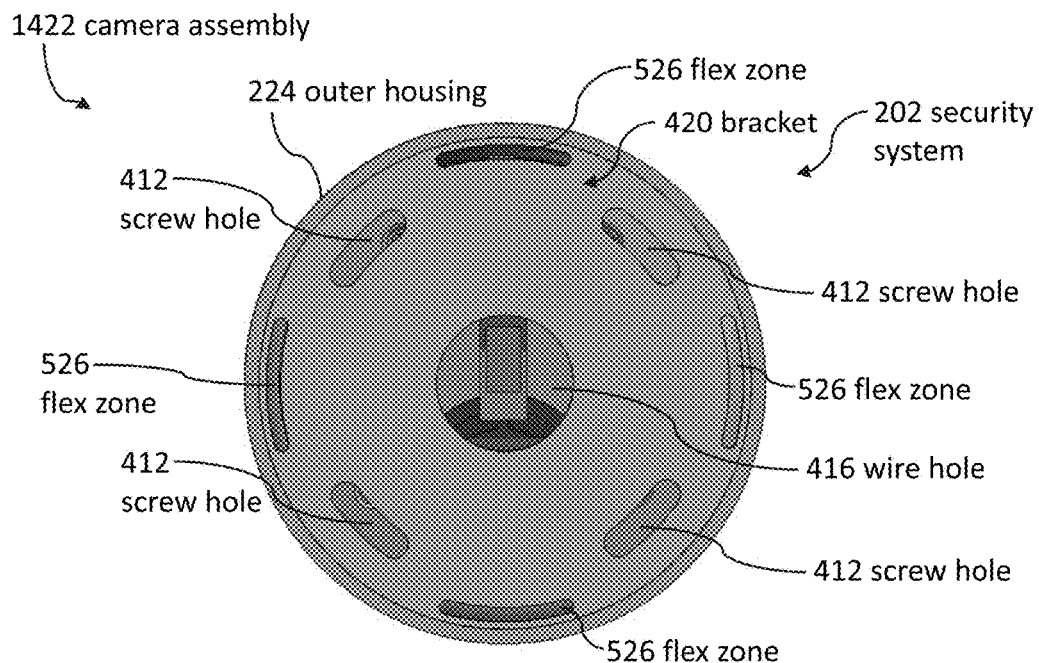
FIG. 20 illustrates a back view of a camera assembly with a mounting bracket, according to some embodiments.

A mounting bracket 420 can be used to mount the camera assembly 1422. The mounting bracket 420 is shown in FIG. 20 herein and in FIGS. 10 and 12 of U.S. Nonprovisional patent application Ser. No. 14/275,811 (now U.S. Pat. No. 8,872,915). Various embodiments can use many different types of mounting brackets.

FIGS. 19 and 20 are based on FIGS. 11 and 12 from U.S. Nonprovisional patent application Ser. No. 14/142,839, which is now U.S. Pat. No. 8,842,180. FIG. 19 illustrates a back view of a camera assembly 1422 without a mounting bracket 420. FIG. 20 illustrates a back view of the camera assembly 1422 with a mounting bracket 420.

Referring now to FIGS. 18 and 19, the monitoring system 1430 can be used to detect a first visitor 844. The camera assembly 1422 can include a camera 208, a speaker 488, a motion sensor 218, a button 212, a printed circuit board 516, and an outer housing 224, which can be water-resistant or waterproof. The remote computing device 204 can include an electronic display 242 configured to show images taken by the camera 208.

Some embodiments include obtaining the camera assembly 1422 and configuring the camera assembly 1422 such that a camera 208 comprises a field of view 1000 that includes at least a portion of a pool of water 1426.

Figure 21:
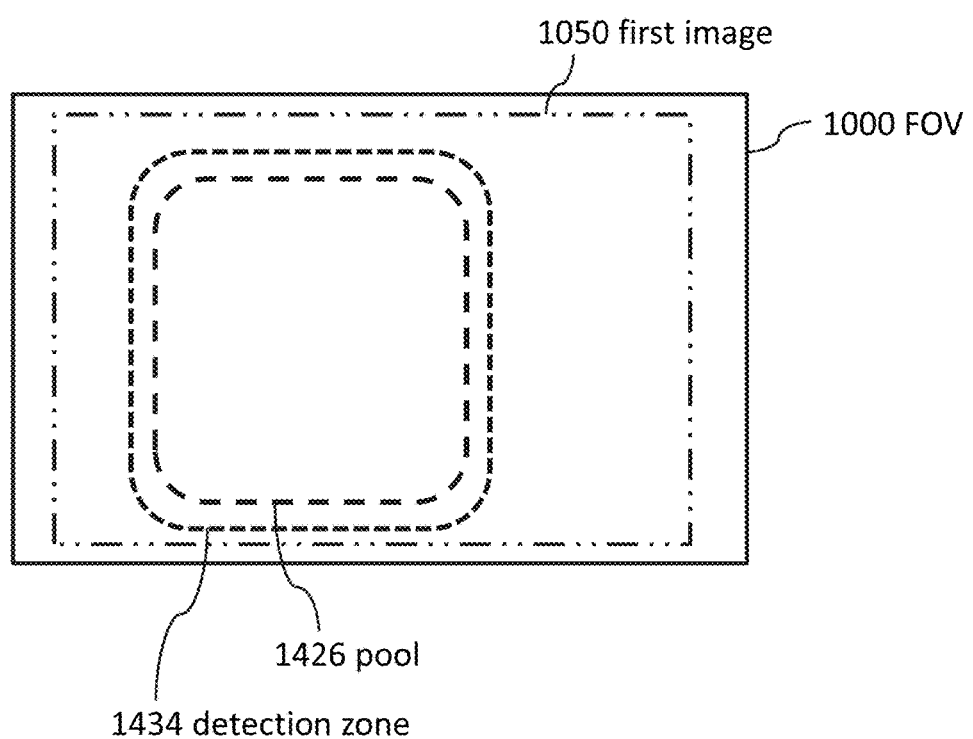
FIG. 21 illustrates a diagrammatic view of an image, according to some embodiments.

FIG. 21 illustrates a first image 1050 of the field of view 1000. Referring now to FIGS. 18 and 21, the camera 208 can be used to take the first image 1050 of at least a portion of the pool of water 1426. Embodiments can include sending the first image 1050 wirelessly from the camera assembly 1422 to the remote computing device 204; displaying the first image 1050 on the electronic display 242 of the remote computing device 204; and/or using the remote computing device 204 to select a first detection zone 1434 within the first image 1050. The first detection zone 1434 can comprise a portion of the first image 1050.

Figure 22:
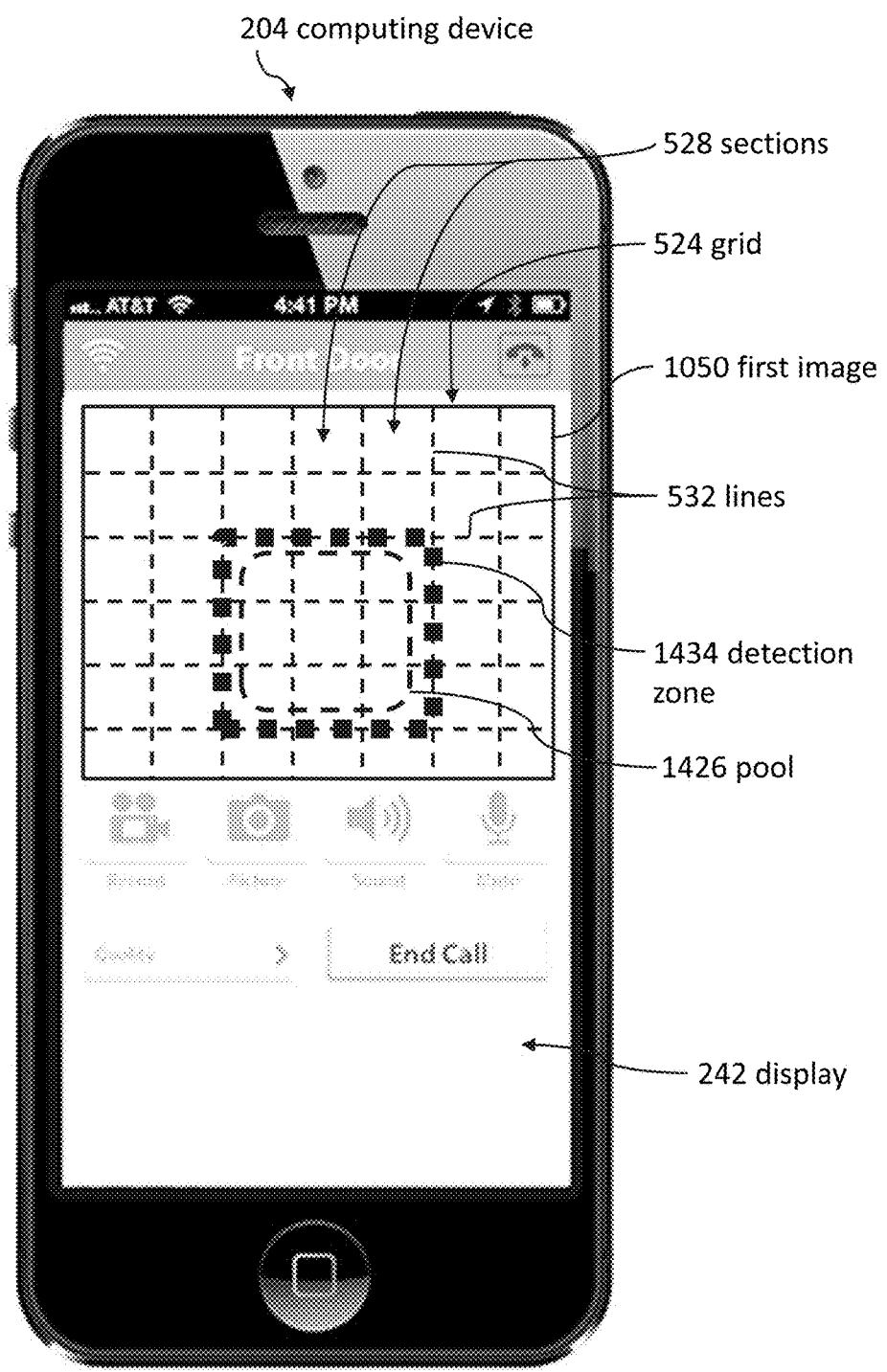
FIG. 22 illustrates a front view of a remote computing device displaying a grid pattern on an image taken by a camera, according to some embodiments.

The first image 842 in FIG. 7 can be replaced with the first image 1050 shown in FIG. 21. FIG. 22 illustrates a front view of a remote computing device 204 displaying a grid pattern 524 on the first image 1050 taken by a camera 208 (shown in FIG. 18). Sections 528 of the grid pattern 524 can be selected to form a detection zone 1434 (which is also shown in FIGS. 18 and 21).

Several embodiments include displaying the grid pattern 524 on the first image 1050 on the electronic display 242 of the remote computing device 204 such that the first image 1050 is divided into at least six sections 528 by lines 532 that cross each other. In some application, six sections can be the minimum number of sections necessary to adequately subdivide the first image 1050. Several application use at least two sections, at least ten sections, and/or at least fifty sections. Some embodiments include selecting the first detection zone 1434 within the first image 1050 by touching at least a first subset of the sections 528 on the electronic display 242 of the remote computing device 204. (In the interest of clarity, not all of the sections 528 and lines 532 are labeled in FIG. 22.)

Referring now to FIG. 18, the monitoring system 1430 can be configured to detect a first indication 1028 suggestive of the visitor 844 (e.g., like the visitor detection system 1024 is configured to detect indications suggestive of visitors as described in the context of FIGS. 11, 12, 13, and 15). Embodiments can include using the camera assembly 1422 to detect an indication 1028 of the first visitor.

The indication 1028 can be located inside of the field of view 1000. For example, the location of the indication 1028 can be seen in the field of view 1000 (e.g., such that the camera 208 could see the location if the camera 208 were taking a picture).

An indication can be suggestive of the visitor 844 if the indication is of a type that may indicate a visitor (even if the indication can sometimes result in false positives). For example, the indication 1028 can be a motion indication, but at times, motion indications may result from moving objects, pets, and plants. As a result, a motion indication may not actually indicate a visitor even though the indication suggests that a visitor may be present (e.g., near a pool).

An infrared signature that seems to indicate that a visitor is present can be a type of indication. The infrared signature may be of a shape and/or temperature that suggests the infrared signature is from a visitor (i.e., a person). In many cases, infrared signatures suggestive of visitors are actually from visitors, but in some cases, infrared signatures suggestive of visitors may be misleading (and not actually be from visitors). The size of the infrared signature can help the system determine if the visitor is above or below a size threshold. This threshold can be advantageous to enable the system to ignore adults (because adults can likely swim) while not ignoring children (because many children cannot swim).

A shape in an image taken by a camera may be an indication suggestive of a visitor. For example, the shape can be of a size or geometry that suggests the shape represents at least a portion of a visitor. In some cases, shapes suggestive of a visitor may not actually be from a visitor.

In FIG. 18, the indication 1028 of the visitor 844 is located outside of the first detection zone 1434. Embodiments can include determining that the indication 1028 is located outside of the first detection zone 1434, and then the monitoring system 1430 deciding to not send a first alert (e.g., 232 in FIG. 1) to the remote computing device 204 (e.g., in response to determining that the indication 1028 of the visitor 844 is located outside of the first detection zone 1434). The first alert can be configured to notify the remote computing device 204 regarding a presence of the visitor 844.

Referring now to FIG. 7, various embodiments can respond differently to touching the first subset 538 on the electronic display 242. Touching the first subset 538 can cause the first subset 538 to be included in the first detection zone or excluded from the first detection zone.

Referring now to FIG. 22, the first detection zone can 1434 comprise an area of the first image 1050 that includes the pool of water 1426. In some embodiments, a user configures the first detection zone 1434 using the remote computing device 204 by tracing her finger around a perimeter of a pool 1426 in a picture (e.g., the first image 1050) that includes the pool 1426 while the picture is displayed on the remote computing device 204. The remote computing device 204 can record the first detection zone 1434 as defined based on the traced perimeter (e.g., as shown by the dotted line of the detection zone 1434 in FIG. 22).

Referring now to FIG. 18, the monitoring system 1430 can correlate visitor indications 1028 with locations such that the monitoring system 1430 can determine if the visitor indications 1028 are located inside or outside of the first detection zone 1434 even though the indications 1028 are sensed by a different sensor than the camera 208. For example, the indications 1028 can be detected via the motion detector 218 and/or the infrared detector 218. In some embodiments, a calibration routine is conducted at the factory to correlate camera field-of-view locations with other sensor locations.

The camera assembly 1422 can include a speaker 488 (shown in FIG. 19) that can emit a notification sound 1042 (shown in FIG. 23) while the camera assembly 1422 is mounted such that the field of view 1000 includes at least the portion of the pool of water 1426 (e.g., as shown in FIG. 18). The camera assembly 1422 can emit the notification sound in response to the visitor 844 entering the first detection zone 1434 as defined using the first image 1050 (shown in FIG. 21).

In some embodiments, the monitoring system 1430 detects when a visitor 844 enters the field of view 1000 and then detects when the visitor 844 enters the first detection zone 1434. The first image 1050 (shown in FIG. 21) can be used to establish multiple detection zones. In some embodiments, the first detection zone 1434 is surrounded by a second detection zone.

Figure 23:
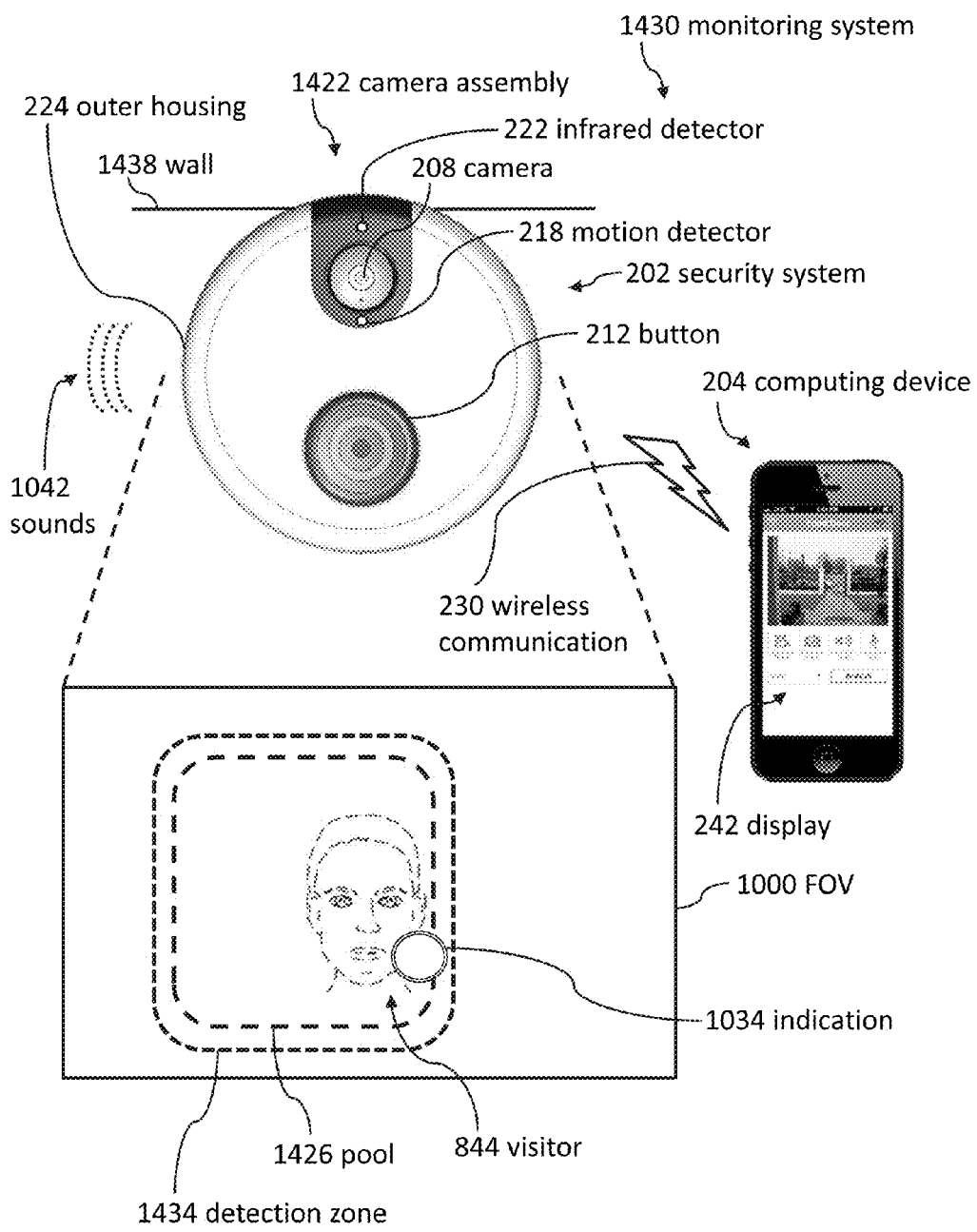
FIG. 23 illustrates a diagrammatic view of a camera assembly placed near a pool of water, according to some embodiments.

Referring now to FIG. 23, several embodiments include using the camera assembly 1422 to detect a second indication 1034 of the first visitor 844. The second indication 1034 can be located inside of the field of view 1000. The monitoring system 1430 can also determine that the second indication 1034 of the first visitor 844 is located inside of the first detection zone 1434 as defined using the first image. The monitoring system 1430 can then wirelessly send the first alert to the remote computing device 204 in response to determining that the second indication 1034 of the first visitor 844 is located inside of the first detection zone 1434.

The monitoring system 1430 can wirelessly send alerts via a wireless network and/or the Internet. In some embodiments, the camera assembly 1422 sends a wireless alert to the remote computing device 204 (e.g., via a wireless network and/or the Internet). Several embodiments include sending the first image directly from the camera assembly 1422 to the remote computing device 204 without using an intermediary server (although some embodiments use an intermediary server).

Some embodiments include sending the first alert wirelessly to the remote computing device 204 while emitting a notification sound 1042 from the speaker 488 (shown in FIG. 19) in response to the first visitor 844 entering the first detection zone 1434 as defined using the first image. Simultaneously sending the first alert and emitting the notification sound 1042 can notify both a user of the remote computing device 204 and people who are within audible range of the notification sound 1042.

Several embodiments use motion detectors 218 to sense visitors 844. The camera assembly 1422 can include one or more motion detectors 218. The first and second indications described in various embodiments herein can be motion indications.

Some embodiments analyze an image taken by the camera 208 to sense visitors. Methods can include using the camera 208 to take a second image of at least the portion of the pool of water, and then the monitoring system analyzing the second image to detect the first indication. Methods can also include using the camera 208 to take a third image of at least the portion of the pool of water 1426, and then the monitoring system 1430 analyzing the third image to detect the second indication 1034.

Some embodiments reduce false positives by preventing the sending of the first alert to the remote computing device until after detecting the second indication in at least two of the sections 528 (shown in FIG. 22). Several embodiments cause a second subset 542 of the sections 528 to be included in the first detection zone in response to the first subset 538 comprising an outer perimeter that surrounds the second subset 542 (as described in the context of FIG. 7).

Several embodiments include selecting the first detection zone by displaying the first image on the electronic display, and then recording which areas of the first image a user indicates to include in the first detection zone by touching the electronic display; calculating a percentage of the first detection zone that includes the second indication of the first visitor; and/or sending the first alert to the remote computing device in response to determining that the percentage of the first detection zone exceeds a first threshold.

Some embodiments include selecting the first detection zone by displaying the first image on the electronic display, and then recording which areas of the first image a user indicates to include in the first detection zone by touching the electronic display; calculating a percentage of the first detection zone that includes the second indication of the first visitor; calculating a time in which the second indication of the first visitor has been in the first detection zone; and/or sending the first alert to the remote computing device in response to the percentage of the first detection zone and the time (e.g., exceeding thresholds).

Several embodiments include using the camera assembly to detect a first indication of the first visitor. The first indication can be located inside of the field of view. Some embodiments include determining that the first indication of the first visitor is located outside of the first detection zone, and then the monitoring system ignoring the first visitor in response to the first visitor being located outside of the first detection zone. Ignoring the first visitor can comprise not sending a first alert to the remote computing device regarding the first visitor being outside of the first detection zone.

Some embodiments include using the camera assembly to detect a third indication of a second visitor. The third indication can be located inside of the field of view. Several embodiments include determining that the third indication is located inside of the first detection zone as defined using the first image.

Several embodiments include determining that the second visitor is greater than a size threshold, and then ignoring the second visitor in response to the second visitor being greater than the size threshold. Ignoring the second visitor can comprise not sending a second alert to the remote computing device. The second alert can be configured to notify the remote computing device regarding the second visitor being in the first detection zone.

Some embodiments include using the camera assembly to detect a fourth indication of a third visitor. The fourth indication can be located inside of the field of view. Embodiments can include determining that the fourth indication is located inside of the first detection zone as defined using the first image. Embodiments can also include determining that the third visitor is less than the size threshold, and then wirelessly sending a third alert to the remote computing device in response to the third visitor being less than the size threshold. The third alert can be configured to notify the remote computing device regarding the third visitor being in the first detection zone.

The size threshold can be a height threshold. The height threshold can be configured to distinguish between small children (who often cannot swim) and tall adults (who typically can swim). The height threshold can be at least four feet (because most people over four feet can swim).

Referring now to FIG. 18, monitoring systems 1430 can be configured to detect visitors 844. Monitoring systems 1430 can include a camera assembly 1422 having a speaker and a camera 208. The camera assembly 1422 can be mounted (e.g., to a wall 1438) such that the camera 208 comprises a field of view 1000 that includes at least a portion of a pool of water 1426. In some embodiments, the camera assembly 1422 includes an outer housing 224 that is mounted to a wall 1438, fence, or post. The camera assembly 1422 can be configured to wirelessly communicate with a remote computing device 204 having an electronic display 242. In some embodiments, the camera assembly 1422 is communicatively coupled with the remote computing device 204 via a cable. In many embodiments, the camera assembly 1422 is communicatively coupled to the remote computing device 204 via wireless communication 230, but is not mechanically coupled to the remote computing device 204.

Monitoring systems 1430 can include a first image of at least the portion of the pool of water. The first image can be taken by the camera 208, wirelessly communicated to the remote computing device 204, and then displayed on the electronic display 242 of the remote computing device 204. Monitoring systems 1430 can also include a first detection zone 1434 defined by a user touching sections of the first image while the first image is displayed on the electronic display 242 of the remote computing device 204.

Some embodiments include a wireless notification sent from the camera assembly 1422 to the remote computing device 204 in response to the first visitor 844 entering the first detection zone 1434 as defined using the first image; and a notification sound 1042 (shown in FIG. 23) emitted by the speaker in response to the first visitor 844 entering the first detection zone 1434 as defined using the first image. In FIG. 23, the visitor 844 is located inside the first detection zone 1434.

In some embodiments, the monitoring system is configured to ignore a second visitor in response to the second visitor being located in the field of view and outside of the first detection zone. Ignoring the second visitor comprises not sending an alert regarding the second visitor to the remote computing device Referring now to FIG. 18, several embodiments include using a monitoring system 1430 to detect a first visitor 844. Embodiments can include obtaining a camera assembly 1422 that includes a camera 208; configuring the camera assembly 1422 such that the camera 208 comprises a field of view 1000 that includes at least a portion of a pool of water 1426; using the camera 208 to take a first image of at least the portion of the pool of water 1426; sending the first image wirelessly from the camera assembly 1422 to a remote computing device 204 that includes an electronic display 242; and/or using the remote computing device 204 to select a first detection zone 1434 within the first image 1050 (shown in FIG. 21). The first detection zone 1434 can comprise a first portion of the first image that shows the portion of the pool of water 1426.

Some embodiments include configuring the monitoring system 1430 to ignore a second visitor located within the field of view 1000 of the camera 208 in response to the second visitor being located outside of the first detection zone 1434. Ignoring the second visitor can comprise not sending a first alert regarding the second visitor to the remote computing device 204. Several embodiments include configuring the monitoring system 1430 to send a second alert regarding a third visitor to the remote computing device 204 in response to determining that the third visitor is located inside of the first detection zone 1434 as defined based on the first image.

Several embodiments include displaying the first image on the electronic display 242 of the remote computing device 204, and then selecting the first detection zone 1434 within the first image from the camera 208 while displaying the first image on the electronic display 242. The first detection zone 1434 can represent a portion of the field of view 1000 of the camera 208. Selecting the first detection zone 1434 can comprise selecting a second portion of the first image of the camera 208.

Referring now to FIG. 22, some embodiments include displaying lines 532 on the first image 1050 on the electronic display 242 of the remote computing device 204 such that the first image 1050 is divided into sections 528 by the lines 532; and selecting the first detection zone 1434 within the first image 1050 by touching or otherwise selecting at least a first subset 538 (shown in FIG. 7) of the sections 528 on the electronic display 242 of the remote computing device 204.

Several embodiments include displaying the first image 1050 on the electronic display 242 of the remote computing device 204; and selecting the first detection zone 1434 within the first image 1050 by touching at least a first subset 538 (shown in FIG. 7) of sections 528 on the electronic display 242 of the remote computing device 204. The sections 528 can be visibly differentiated (e.g., by lines) or can be indistinguishable to the unaided human eye. Some embodiments include millions of sections 528 (e.g., each pixel can be a section). Touching or otherwise selecting the first subset 538 (shown in FIG. 7) can cause the first subset 538 to be included in the first detection zone 1434 or excluded from the first detection zone 1434. Some embodiments include causing a second subset 542 (shown in FIG. 7) of the sections 528 to be included in the first detection zone 1434 of the monitoring system in response to the first subset 538 comprising an outer perimeter that surrounds the second subset 542.

Referring now to FIG. 18, some methods include sending data regarding the first detection zone 1434 from the remote computing device 204 to the camera assembly 1422 to calibrate the camera assembly 1422. Calibrating the camera assembly 1422 can include configuring the camera assembly 1422 to ignore visitor indications in certain portions of the field of view 1000 (whether sensed by the camera, by a motion sensor, or by any other sensor).

In several embodiments, the camera assembly 1422 comprises a microphone 484 (shown in FIG. 19), which can help enable audio communication between the third visitor and a user of the remote computing device 204 in response to determining that the third visitor is located inside of the first detection zone 1434 as defined based on the first image 1050 (shown in FIG. 21). The user of the remote computing device 204 can hear the visitor via the microphone 484.

Some embodiments include determining that the second visitor is located outside of the first detection zone 1434 by detecting a first motion of the second visitor; correlating the first motion to a first location as defined by the first image; and determining that the first location is located outside of the first detection zone 1434. Embodiments can also include determining that the third visitor is located inside of the first detection zone 1434 by detecting a second motion of the third visitor; correlating the second motion to a second location as defined by the first image; and determining that the second location is located inside of the first detection zone 1434.

Connecting to a Network

Referring now to FIG. 18, the camera assembly 1422 can communicate with the computing device 204 via a wireless network 308 (shown in FIG. 3). Several embodiments include setup modes to connect the camera assembly 1422 (e.g., a security system) to a wireless network. Some of these embodiments are described in U.S. Nonprovisional patent application Ser. No. 14/502,601; filed Sep. 30, 2014; and entitled DOORBELL COMMUNICATION SYSTEMS AND METHODS. The entire contents of patent application Ser. No. 14/502,601 are incorporated by reference herein. Some of these embodiments are described in U.S. Nonprovisional patent application Ser. No. 14/275,811; filed May 12, 2014; and entitled DOORBELL COMMUNICATION SYSTEMS AND METHODS (now U.S. Pat. No. 8,872, 915). The entire contents of patent application Ser. No. 14/275,811 are incorporated by reference herein.

In several embodiments, the camera assembly 1422 does not use electricity from an external power source to charge a battery 462 (shown in FIG. 19) of the camera assembly 1422. In addition, the button pressed to initiate the setup mode is not necessarily a doorbell button.

Also, the embodiments described in the context of a security system and/or a doorbell in U.S. Nonprovisional patent application Ser. No. 14/502,601 and/or U.S. Nonprovisional patent application Ser. No. 14/275,811 can be applied to the context of camera assemblies 1422 placed such that the field of view 1000 of a camera 208 includes at least a portion of a pool of water 1426.

In some embodiments, a setup mode comprises a network connection mode, and the method comprises entering the network connection mode in response to pressing a button 212 (shown in FIG. 18). Several embodiments include pressing the button 212 for at least two seconds. The network connection mode can comprise detecting a wireless network 308 (shown in FIG. 3) and inputting a camera identification code 222b into the remotely located computing device 204 (e.g., a remote computing device). In some embodiments, inputting the identification code 222b includes typing letters, numbers, words, and/or symbols on the remotely located computing device 204. Inputting the identification code 222b can include speaking letters, numbers, words, and/or symbols such that the remotely located computing device 204 hears the information and captures the information.

The identification code 222b can be associated with the camera assembly 1422 such that the code is correlated with at least one camera assembly. The identification code 222b can be used as an electronic key to unlock access to the camera assembly 1422 (e.g., to enable administrative functions). The identification code 222b can enable the computing device 204 to activate the camera assembly 1422 and/or can enable the computing device 204 to wirelessly receive alerts from the camera assembly 1422.

The network connection mode can comprise using the identification code 222b to verify whether the remotely located computing device 204 (e.g., the remote computing device) is authorized to communicate with the camera assembly 1422. For example, the code 222b can prevent an unauthorized computing device from hacking into the camera assembly 1422 and receiving visitor alerts from the camera assembly 1422.

In several embodiments, the network connection mode comprises enabling communication from the remotely located computing device 204 to the camera assembly 1422 in response to pressing the button and/or inputting the identification code 222b into the remotely located computing device 204.

In some embodiments, the remotely located computing device 204 is connected to the wireless network 308 (shown in FIG. 3) such that the remotely located computing device 204 is configured to transmit data via the wireless network 308. The wireless network 308 can comprise a name and a password. The name can identify the wireless network 308 to entities searching for wireless networks. The password can enable an electronic device to connect to the wireless network 308. The wireless network 308 can enable electronic devices to connect to the Internet.

The communication from the remotely located computing device 204 to the camera assembly 1422 can comprise the name and the password of the wireless network to which the remotely located computing device 204 is connected. The network connection mode can comprise connecting the camera assembly 1422 to the wireless network to which the remotely located computing device 204 is connected such that the camera assembly 1422 can send an alert regarding a presence of the visitor to the remotely located computing device 204 via the wireless network.

Some embodiments include using the camera assembly 1422 to detect multiple wireless networks. The wireless network to which the remotely located computing device 204 is connected can be one of the multiple wireless networks. Methods can comprise automatically selecting the wireless network to which the remotely located computing device 204 is connected. For example, the system 1430 can choose which wireless network to connect the camera assembly 1422 without asking a person which wireless network the system 1430 should choose.

In some embodiments, a setup mode comprises a network connection mode. Methods can comprise entering the network connection mode in response to pressing the button (e.g., for at least two seconds). The network connection mode can comprise detecting a first wireless network 308 (shown in FIG. 3) having a name and a password. The network connection mode can comprise inputting an identification code 222b into the remotely located computing device 204. The identification code 222b can be associated with the camera assembly 1422. The network connection mode can comprise using the identification code 222b to verify whether the remotely located computing device 204 is authorized to communicate with the camera assembly 1422. The network connection mode can comprise the remotely located computing device 204 creating a second wireless network 308b (shown in FIG. 3). For example, the second wireless network 308b can emanate from the remotely located computing device 204. The network connection mode can comprise transmitting the name and the password of the first wireless network directly from the remotely located computing device 204 to the camera assembly 1422 via the second wireless network 308b to enable the camera assembly 1422 to communicate with the remotely located computing device 204 via the first wireless network 308 (shown in FIG. 3). Methods can comprise the remotely located computing device 204 directly communicating with the camera assembly 1422 via the second wireless network 308b prior to the camera assembly 1422 indirectly communicating with the remotely located computing device 204 via the first wireless network 308. For example, the wireless communication from the remotely located computing device 204 can travel through the air directly to the camera assembly 1422. The wireless communication from the remotely located computing device 204 can travel indirectly to the camera assembly 1422 via a third electronic device such as a server 206 (shown in FIG. 1).

A remotely located computing device 204 can be located near a camera assembly 1422. For example, during setup some users will hold a cellular phone within a couple of feet from the camera assembly 1422 to input an identification code 222b into the cellular phone to verify that the phone is authorized to communicate with the camera assembly 1422 and to help the camera assembly 1422 connect to a wireless network. The phone is located remotely from the camera assembly 1422 because it is not mechanically attached to the camera assembly 1422.

Some embodiments comprise detecting multiple wireless networks and automatically selecting a first wireless network for communicating between the camera assembly 1422 and the remotely located computing device 204. Prior to the automatic selection, the remotely located computing device 204 can be connected to the first wireless network. Methods can further comprise authorizing the camera assembly 1422 to communicate with the remotely located computing device 204 by pressing the button 212 and/or inputting an identification code 222b into the remotely located computing device 204. The identification code 222b can be associated with the camera assembly 1422. The first wireless network can comprise a name and a password. Methods can further comprise wirelessly communicating the name and the password from the remotely located computing device 204 to the camera assembly 1422.

Several methods include entering a network connection mode prior to sending the wireless notification. The network connection mode can comprise detecting a first wireless network having a name and a password. The network connection mode can comprise inputting an identification code 222b into the remotely located computing device 204. The identification code 222b can be associated with the camera assembly 1422. The network connection mode can further comprise using the identification code 222b to verify whether the remotely located computing device 204 is authorized to communicate with the camera assembly 1422. The network connection mode can comprise the remotely located computing device 204 creating a second wireless network 308b (shown in FIG. 3). The network connection mode can comprise transmitting the name and the password of the first wireless network directly from the remotely located computing device 204 to the camera assembly 1422 via the second wireless network to enable the camera assembly 1422 to communicate with the remotely located computing device 204 via the first wireless network. Methods can comprise the camera assembly 1422 directly communicating with the remotely located computing device 204 via the second wireless network prior to the camera assembly 1422 indirectly communicating with the remotely located computing device 204 via the first wireless network.

Plug-in Camera

Figure 24:
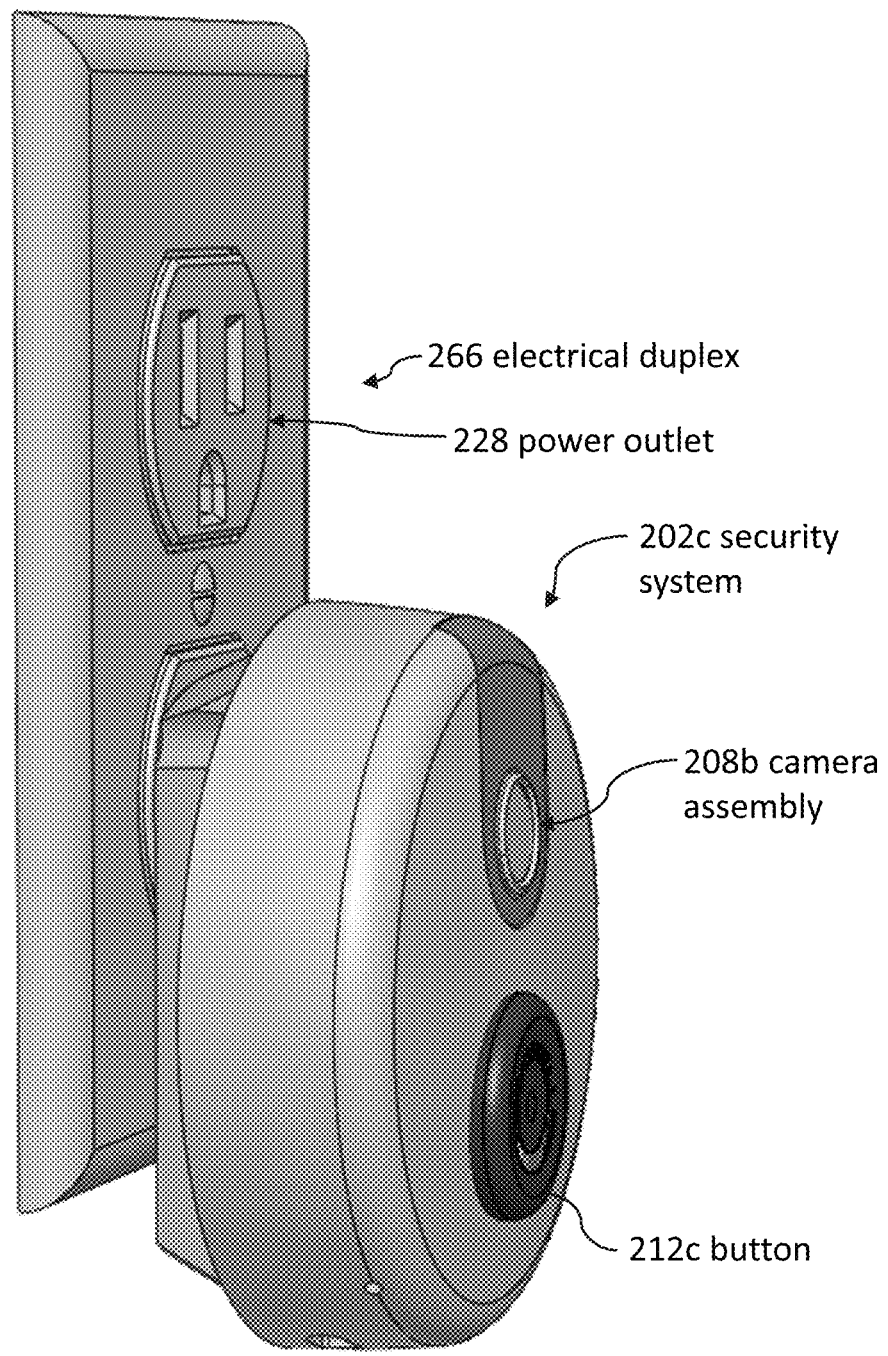
FIG. 24 illustrates a side and front perspective view in which an outwardly facing portion is mounted to an inwardly facing portion while the inwardly facing portion is attached to the power outlet, according to some embodiments.

FIG. 24 illustrates a remote surveillance system (e.g., the security system 202c and the computing device 204 shown in FIG. 1). The remote surveillance system can communicate via a server 206 and/or via wireless communication 230 (as shown in FIG. 1). The security system 202c is configured to mount to a power outlet 228 on a wall of a building (e.g., as described in U.S. Nonprovisional patent application Ser. No. 14/623,741; filed Feb. 17, 2015; and entitled POWER OUTLET CAMERAS, which is incorporated by reference herein).

360-Degree Camera

Figure 25:
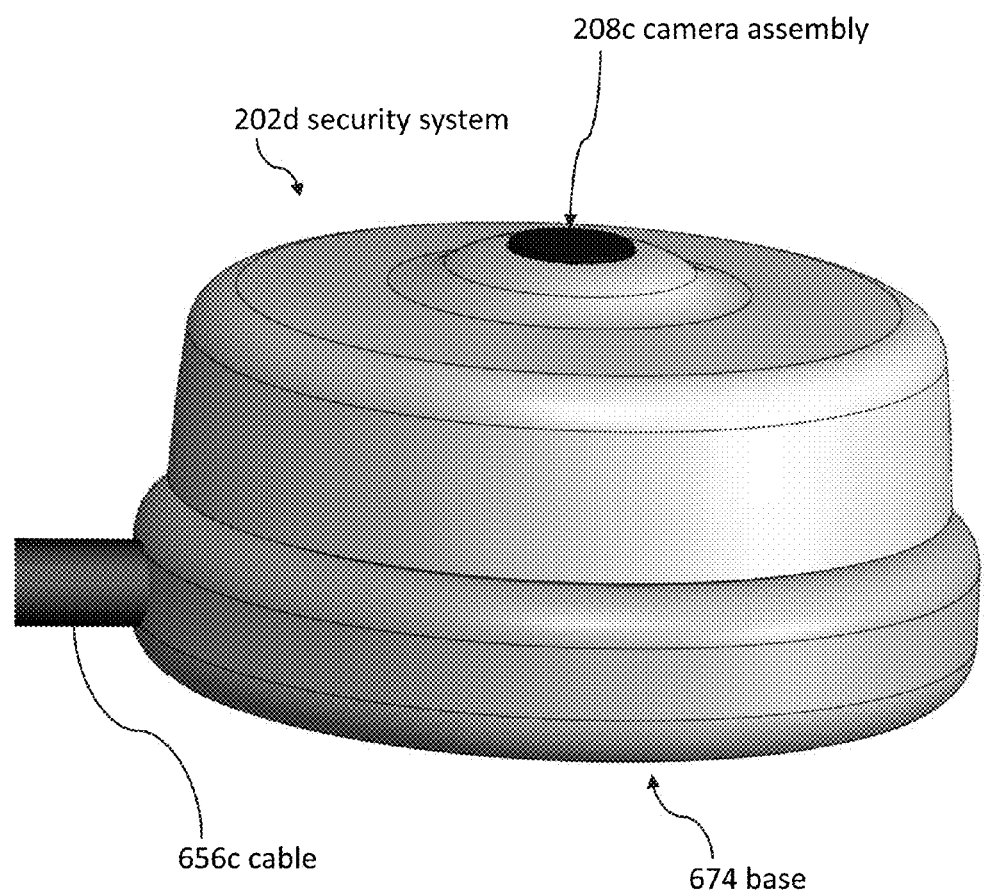
FIG. 25 illustrates a side and top perspective view of a security system that includes a 360-degree camera assembly, according to some embodiments.

FIG. 25 illustrates a security system 202d that includes a 360-degree camera assembly 208c (e.g., the camera 208c can see a complete panoramic view and/or can see a half-sphere). The security system 202d can be placed inside a building or outside a building. A cable 656c provides power from an electrical outlet to a base 674. The base 674 can charge the security system 202d. The security system 202d can be removed from the base 674 and relocated to a location that is remote relative to the base 674. The embodiment shown in FIG. 25 can be combined with any of the embodiments described herein and/or incorporated by reference.

Tabletop Camera

Figure 26:
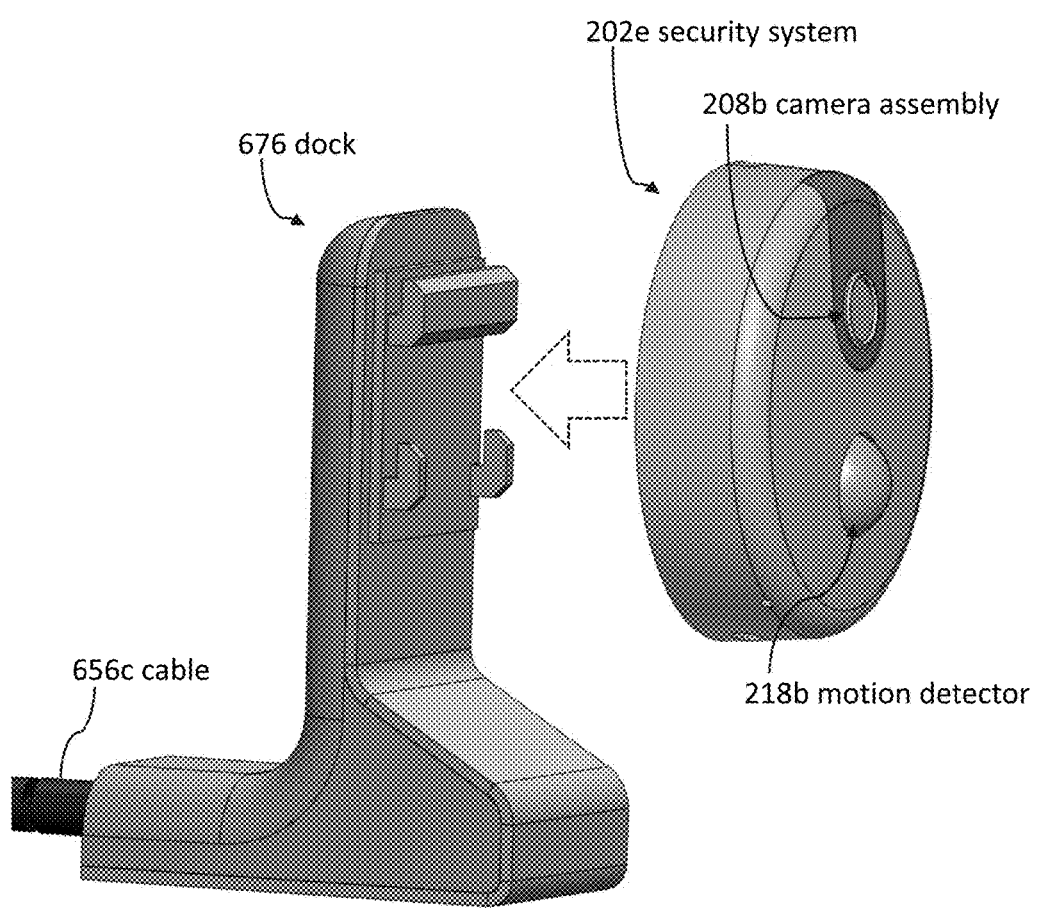
FIG. 26 illustrates a side and front perspective view of a security system and a dock configured to hold the security system, according to some embodiments.

FIG. 26 illustrates a security system 202e that can be coupled to a dock 676. The dock 676 can hold the security system 202e such that the camera assembly 208b can have a field of view that is perpendicular to the ground. A cable 656c can provide power to the dock 676, which can charge the security system 202e. The embodiment shown in FIG. 26 can be combined with any of the embodiments described herein and/or incorporated by reference.

Interpretation

None of the steps described herein is essential or indispensable. Any of the steps can be adjusted or modified. Other or additional steps can be used. Any portion of any of the steps, processes, structures, and/or devices disclosed or illustrated in one embodiment, flowchart, or example in this specification can be combined or used with or instead of any other portion of any of the steps, processes, structures, and/or devices disclosed or illustrated in a different embodiment, flowchart, or example. The embodiments and examples provided herein are not intended to be discrete and separate from each other.

The section headings and subheadings provided herein are nonlimiting. The section headings and subheadings do not represent or limit the full scope of the embodiments described in the sections to which the headings and subheadings pertain. For example, a section titled "Topic 1" may include embodiments that do not pertain to Topic 1 and embodiments described in other sections may apply to and be combined with embodiments described within the "Topic 1" section.

Some of the devices, systems, embodiments, and processes use computers. Each of the routines, processes, methods, and algorithms described in the preceding sections may be embodied in, and fully or partially automated by, code modules executed by one or more computers, computer processors, or machines configured to execute computer instructions. The code modules may be stored on any type of non-transitory computer-readable storage medium or tangible computer storage device, such as hard drives, solid state memory, flash memory, optical disc, and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

The various features and processes described above may be used independently of one another, or may be combined in various ways. All possible combinations and subcombinations are intended to fall within the scope of this disclosure. In addition, certain method, event, state, or process blocks may be omitted in some implementations. The methods, steps, and processes described herein are also not limited to any particular sequence, and the blocks, steps, or states relating thereto can be performed in other sequences that are appropriate. For example, described tasks or events may be performed in an order other than the order specifically disclosed. Multiple steps may be combined in a single block or state. The example tasks or events may be performed in serial, in parallel, or in some other manner. Tasks or events may be added to or removed from the disclosed example embodiments. The example systems and components described herein may be configured differently than described. For example, elements may be added to, removed from, or rearranged compared to the disclosed example embodiments.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some, or all of the elements in the list. Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require at least one of X, at least one of Y, and at least one of Z to each be present.

The term "and/or" means that "and" applies to some embodiments and "or" applies to some embodiments. Thus, A, B, and/or C can be replaced with A, B, and C written in one sentence and A, B, or C written in another sentence. A, B, and/or C means that some embodiments can include A and B, some embodiments can include A and C, some embodiments can include B and C, some embodiments can only include A, some embodiments can include only B, some embodiments can include only C, and some embodiments can include A, B, and C. The term "and/or" is used to avoid unnecessary redundancy.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions, and changes in the form of the methods and systems described herein may be made without departing from the spirit of the inventions disclosed herein.

The following is claimed:

1. A method for using a monitoring system to detect a first visitor, wherein the monitoring system comprises a camera and a remote computing device, the method comprising:
   capturing, via the camera, a first image of at least a portion of a pool of water and sending the first image wirelessly to the remote computing device;
   displaying, via the remote computing device, the first image;
   selecting, via the remote computing device, a first detection zone within the first image;
   detecting, via the camera, a first indication of the first visitor;
   determining that the first indication is located outside the first detection zone, and refraining from sending a first alert to the remote computing device in response to determining that the first indication is located outside the first detection zone;
   displaying, via the remote computing device, a grid pattern on the first image such that the first image is divided into a plurality of sections by lines that cross each other; and
   selecting the first detection zone within the first image by touching at least a first subset of the sections on the electronic display of the remote computing device.

2. The method of claim 1, wherein touching the first subset causes the first subset to be included in the first detection zone.

3. The method of claim 1, wherein touching the first subset causes the first subset to be excluded from the first detection zone.

4. The method of claim 1, wherein the first detection zone comprises an area of the first image that includes the pool of water.

5. The method of claim 1, wherein the monitoring system comprises a speaker, the method further comprising emitting a notification sound from the speaker while the camera is mounted such that the field of view includes at least the portion of the pool of water, wherein the monitoring system emits the notification sound in response to the first visitor entering the first detection zone as defined using the first image.

6. The method of claim 1, further comprising:
   detecting, via the camera, a second indication of the first visitor, wherein the second indication is located inside the field of view;
   determining that the second indication is located inside the first detection zone as defined using the first image; and
   sending the first alert wirelessly to the remote computing device in response to determining that the second indication is located inside the first detection zone.

7. The method of claim 6, wherein the monitoring system comprises a speaker, the method further comprising sending the first alert wirelessly to the remote computing device while emitting a notification sound from the speaker in response to the first visitor entering the first detection zone.

8. The method of claim 6, wherein the monitoring system comprises a motion detector, the first indication is a first motion indication, and the second indication is a second motion indication.

9. The method of claim 6, further comprising:
   capturing, via the camera, a second image of at least the portion of the pool of water, and then the monitoring system analyzing the second image to detect the first indication; and
   capturing, via the camera, a third image of at least the portion of the pool of water, and then the monitoring system analyzing the third image to detect the second indication.

10. The method of claim 6, further comprising preventing the sending of the first alert to the remote computing device until after detecting the second indication in at least two of the sections.

11. The method of claim 6, further comprising causing a second subset of the sections to be included in the first detection zone in response to the first subset comprising an outer perimeter that surrounds the second subset.

12. The method of claim 6, further comprising:
selecting the first detection zone by displaying the first image on the electronic display, and then recording which areas of the first image a user indicates to include in the first detection zone by touching the electronic display;
calculating a percentage of the first detection zone that includes the second indication; and
sending the first alert to the remote computing device in response to determining that the percentage of the first detection zone exceeds a first threshold.

13. The method of claim 6, further comprising:
selecting the first detection zone by displaying the first image on the electronic display, and then recording which areas of the first image a user indicates to include in the first detection zone by touching the electronic display;
calculating a percentage of the first detection zone that includes the second indication;
calculating a time in which the second indication has been in the first detection zone; and
sending the first alert to the remote computing device in response to the percentage of the first detection zone and the time.

14. The method of claim 6, further comprising sending the first image directly from the monitoring system to the remote computing device without using an intermediary server.

15. A method for using a monitoring system to detect a first visitor, wherein the monitoring system comprises a camera and a remote computing device, the method comprising:
capturing, via the camera, a first image of at least a portion of a pool of water and sending the first image wirelessly to the remote computing device;
displaying, via the remote computing device, the first image;
selecting, via the remote computing device, a first detection zone within the first image;
detecting, via the camera, a first indication of the first visitor;
determining that the first indication is located inside the first detection zone, and sending a first alert to the remote computing device in response to determining that the first indication is located inside the first detection zone;
displaying, via the remote computing device, a grid pattern on the first image such that the first image is divided into a plurality of sections by lines that cross each other; and
selecting the first detection zone within the first image by touching at least a first subset of the sections on the electronic display of the remote computing device.

16. The method of claim 15, wherein the first image is divided into at least six sections.

17. The method of claim 15, further comprising calculating a percentage of the first detection zone that includes the first indication.

18. The method of claim 17, further comprising sending the first alert to the remote computing device in response to determining that the percentage of the first detection zone exceeds a first threshold.

19. The method of claim 1, wherein the plurality of sections comprises at least six sections.

20. The method of claim 15, wherein the plurality of sections comprises at least six sections.

* * * * *